US012690066B2

(12) United States Patent
Kim et al.

(10) Patent No.: US 12,690,066 B2
(45) Date of Patent: Jul. 21, 2026

(54) WIRELESS COMMUNICATION METHOD USING LIMITED TWT AND WIRELESS COMMUNICATION TERMINAL USING SAME

(71) Applicant: WILUS INSTITUTE OF STANDARDS AND TECHNOLOGY INC., Gyeonggi-do (KR)

(72) Inventors: Sanghyun Kim, Gyeonggi-do (KR); Geonjung Ko, Gyeonggi-do (KR); Juhyung Son, Gyeonggi-do (KR); Hanseul Hong, Gyeonggi-do (KR); Jinsam Kwak, Gyeonggi-do (KR)

(73) Assignee: WILUS INSTITUTE OF STANDARDS AND TECHNOLOGY INC., Gyeonggi-do (KR)

( * ) Notice: Subject to any disclaimer, the term of this patent is extended or adjusted under 35 U.S.C. 154(b) by 343 days.

(21) Appl. No.: 18/218,328

(22) Filed: Jul. 5, 2023

(65) Prior Publication Data

US 2023/0345535 A1    Oct. 26, 2023

Related U.S. Application Data

(63) Continuation of application No. PCT/KR2022/000668, filed on Jan. 13, 2022.

(30) Foreign Application Priority Data

| | | | |
|---|---|---|---|
| Jan. 13, 2021 | (KR) | ........................ | 10-2021-0004957 |
| Feb. 1, 2021 | (KR) | ........................ | 10-2021-0014361 |
| Mar. 3, 2021 | (KR) | ........................ | 10-2021-0028292 |

(51) Int. Cl.
*H04W 74/0816* (2024.01)
*H04W 74/08* (2024.01)

(52) U.S. Cl.
CPC ... *H04W 74/0816* (2013.01); *H04W 74/0866* (2013.01)

(58) Field of Classification Search
CPC ............ H04L 1/1614; H04W 74/0816; H04W 74/0866; H04W 76/15; H04W 84/12
See application file for complete search history.

(56) References Cited

U.S. PATENT DOCUMENTS

| | | |
|---|---|---|
| 7,916,746 B2 | 3/2011 | Yonge, III et al. |
| 2017/0273100 A1 | 9/2017 | Huang et al. |

(Continued)

FOREIGN PATENT DOCUMENTS

| | | |
|---|---|---|
| CN | 107864698 A | 6/2016 |
| CN | 105813094 A | 7/2016 |

(Continued)

OTHER PUBLICATIONS

International Search Report for PCT/KR2022/000668 mailed on Apr. 25, 2022 and its English translation from WIPO (now published as WO 2022/154534).

(Continued)

*Primary Examiner* — Kashif Siddiqui
(74) *Attorney, Agent, or Firm* — EIP US LLP

(57) ABSTRACT

Disclosed is a wireless communication terminal wirelessly communicating with a base wireless communication terminal. The wireless communication terminal comprises: a transceiver; and a processor. The processor transmits low latency traffic configured as traffic for low latency transmission in a limited service period, or a response to the low latency traffic, and in the limited service period, transmission except for the transmission of the low latency traffic and the transmission of the response to the low latency traffic is limited.

14 Claims, 26 Drawing Sheets

(56)          References Cited

U.S. PATENT DOCUMENTS

| | | | |
|---|---|---|---|
| 2019/0253968 A1 | 8/2019 | Xiao et al. | |
| 2021/0289564 A1 | 9/2021 | Hu | |
| 2022/0078844 A1* | 3/2022 | Cherian | H04W 74/08 |
| 2022/0132419 A1* | 4/2022 | Kwon | H04W 48/12 |
| 2023/0026249 A1 | 1/2023 | Chu et al. | |
| 2023/0199641 A1* | 6/2023 | Naik | H04W 52/0206 |
| | | | 370/318 |
| 2023/0345537 A1* | 10/2023 | Guo | H04W 74/0816 |

FOREIGN PATENT DOCUMENTS

| | | | |
|---|---|---|---|
| CN | 108886712 A | 11/2018 | |
| CN | 109076614 A | 12/2018 | |
| CN | 109792776 A | 5/2019 | |
| CN | 110169187 A | 8/2019 | |
| CN | 110574441 A | 12/2019 | |
| EP | 1374496 A1 | 1/2004 | |
| GB | 2567813 A | 5/2019 | |
| GB | 2600393 A | 5/2022 | |
| KR | 20080048801 A | 6/2008 | |
| WO | 2018/174978 | 9/2018 | |
| WO | 2020/013874 | 1/2020 | |
| WO | 2022/103169 | 5/2022 | |
| WO | 2022/154534 | 7/2022 | |

OTHER PUBLICATIONS

Written Opinion of the International Searching Authority for PCT/KR2022/000668 mailed on Apr. 25, 2022 and its English translation by Google Translate (now published as WO 2022/154534).

Patrice Nezou (Canon) et al.: "Low-Latency Triggered TWT", doc.: IEEE 802.11-20/1843r2, Dec. 17, 2020, slides 1-14.

Dave Cavalcanti, Intel Corporation et al.: "Enhancements for QoS and low latency in 802.11be R1", doc.: IEEE 802.11-20/1350r7, Jan. 11, 2021, slides 1-16.

Arik Klein, Huawei: "CC36-CR-for-Clause-35.7.2", doc.: IEEE 802.11-22/0683r1, May 11, 2022, pp. 1-4.

Abdel Karim Ajami, Qualcomm Inc.: "CC36 Resolution for CIDs in Clause 35.7.4 (Random Backoff for EHT STAs before Restricted TWT Service Period)", doc.: IEEE 802.11-21/1699r1, Oct. 19, 2021, pp. 1-3.

Extended European Search Report dated Apr. 15, 2024 for European Patent Application No. 22739727.0.

Chunyu Hu (Facebook Inc) et al.: "Protected TWT Enhancement for Latency Sensitive Traffic", IEEE 802.11-20/1046r12, Aug. 2020, slides 1-22.

Liwen Chu et al.: "Low Latency Support", Doc.: IEEE 802.11-20/1058r1, Sep. 2, 2020, slides 1-10.

Thomas Handte et al.: "TXOP rules to reduce worst-case latency", doc.: IEEE 802.11-20/1691r1, Dec. 2020, slides 1-18.

Office Action dated Aug. 13, 2024 for Japanese Patent Application No. 2023-542762 and its English translation provided by Applicant's foreign counsel.

Office Action (1st) dated Jan. 28, 2025 for Indian Patent Application No. 202327045318.

Office Action (1st) dated Jan. 20, 2025 for European Patent Application No. 22739727.0.

Office Action (2nd) dated Jun. 24, 2025 for European Patent Application No. 22 739 727.0.

European Office Action issued in 22739727.0 on Oct. 13, 2025, 9 pgs.

Chinese First Office Action in CN Appln. No. 202280008979, dated Apr. 18, 2026, 25 pages with English Translation.

India Hearing Notice in IN Appln. No. 202327045318, dated May 12, 2026, 2 pages.

* cited by examiner

```
         ┌──────────┐        ┌──────────┐        ┌──────────┐
         │   STA    │        │    AP    │        │    AS    │
         │  (100)   │        │  (200)   │        │  (300)   │
         └──────────┘        └──────────┘        └──────────┘
```

*Passive Scanning*          Beacon
                            (S101)

*Active Scanning*          Probe request
                             (S103)
                           Probe response
                             (S105)

*Authentication*        Authentication request
                            (S107a)
                        Authentication response
                            (S107b)

*Association*            Association request
                            (S109a)
                        Association response
                            (S109b)

802.1X Authentication (optional) (S111)

DHCP/IP Establishment (optional) (S113)

FIG. 5

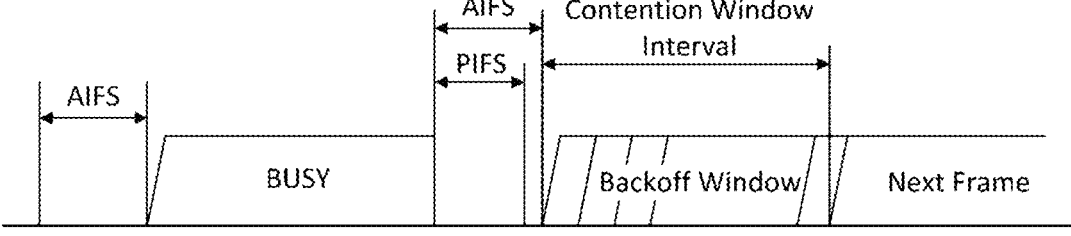

(a) EHT SU PPDU (b) EHT TB PPDU (c) EHT MU PPDU (d) EHT ER SU PPDU

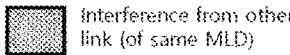
Interference from other
link (of same MLD)
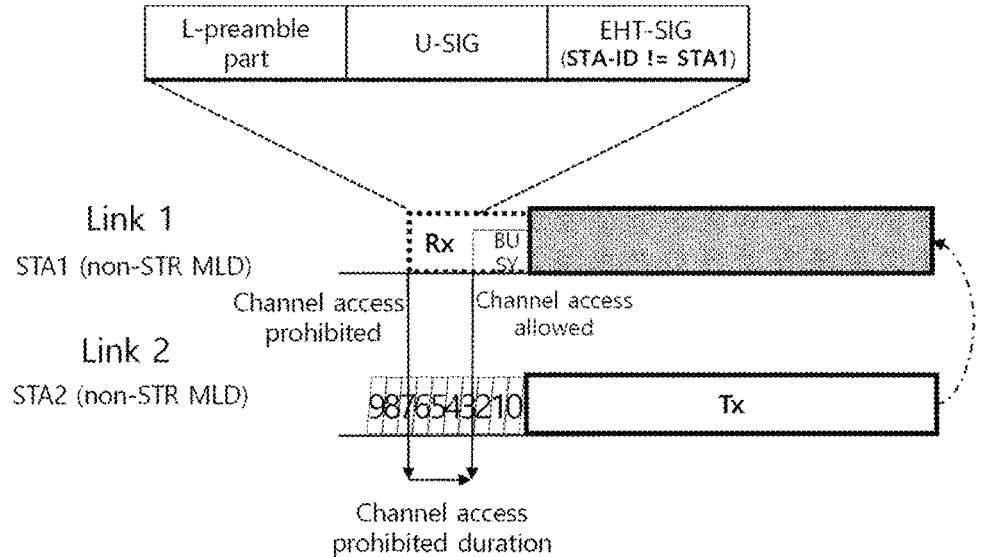
(a) Continuous backoff
counting
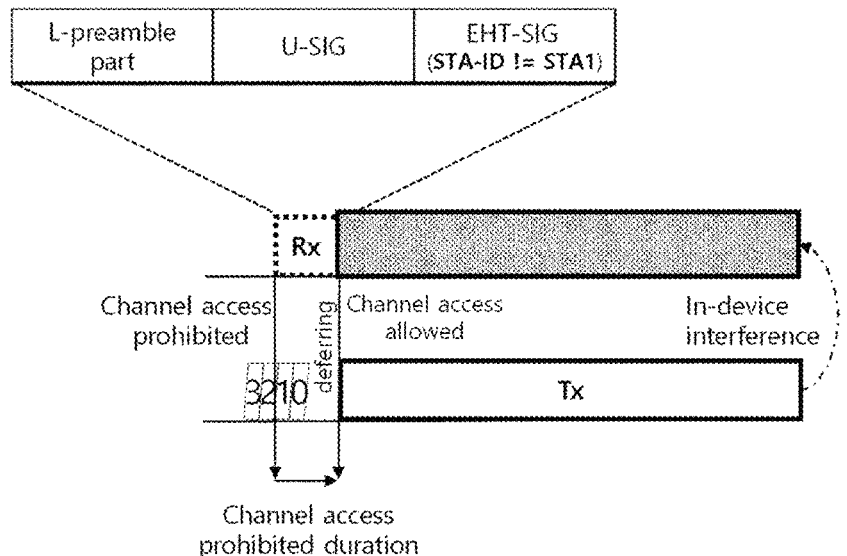
(b) Continuous backoff
counting + Tx deferring
*FIG. 14*

(a) Mandatory RTS / CTS exchange (b) Short Tx of initial deferred Tx (a) Inter-link collision
(simultaneous Tx on AP1 &STA2 )

(b) Inter-link collision
(non-simultaneous Tx on AP1 &STA2 )

| Protocol Version | Type (=1) | Subtype (!=6) (e.g., =11) | To DS (=0) | From DS (=0) | More Frag- ments(=0) | Retry (=0) | Power Manage ment | More Data (=0) | Protected Frame (=0) | +HTC |
|---|---|---|---|---|---|---|---|---|---|---|
| Bits: 2 | 2 | 4 | 1 | 1 | 1 | 1 | 1 | 1 | 1 | 1 |

(a) No Traffic info. Frame Control field of RTS frame

| Protocol Version | Type | Subtype | TID(or Priority) info. (0~15) | Power Management | Low latency indication (0 or 1) | Traffic info. Flag (=1) | +HTC |
|---|---|---|---|---|---|---|---|
| Bits: 2 | 2 | 4 | 4 | 1 | 1 | 1 | 1 |

(b) Traffic info. Frame Control field of RTS frame (a) No Traffic info. User Info field of MU-RTS frame (b) Traffic info. User Info field of MU-RTS frame

| Protocol Version | Type | Subtype | TID(or Priority) info. (0~15) | Power Management | Low latency indication (0 or 1) | UL Request (=1) | +HTC |
|---|---|---|---|---|---|---|---|
| 2 | 2 | 4 | 4 | 1 | 1 | 1 | 1 |

Bits:

UL request Frame Control field of CTS frame

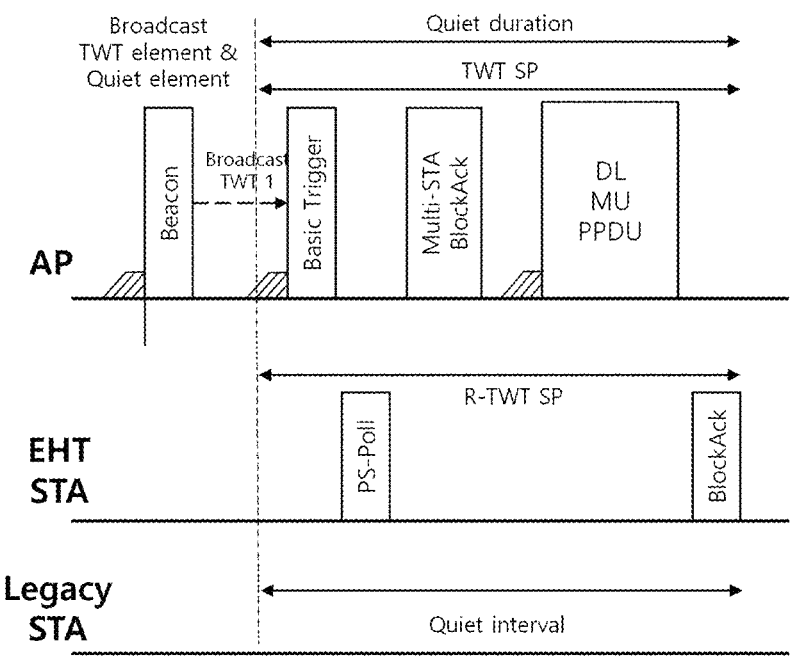
(a) R-TWT SP == Quiet duration
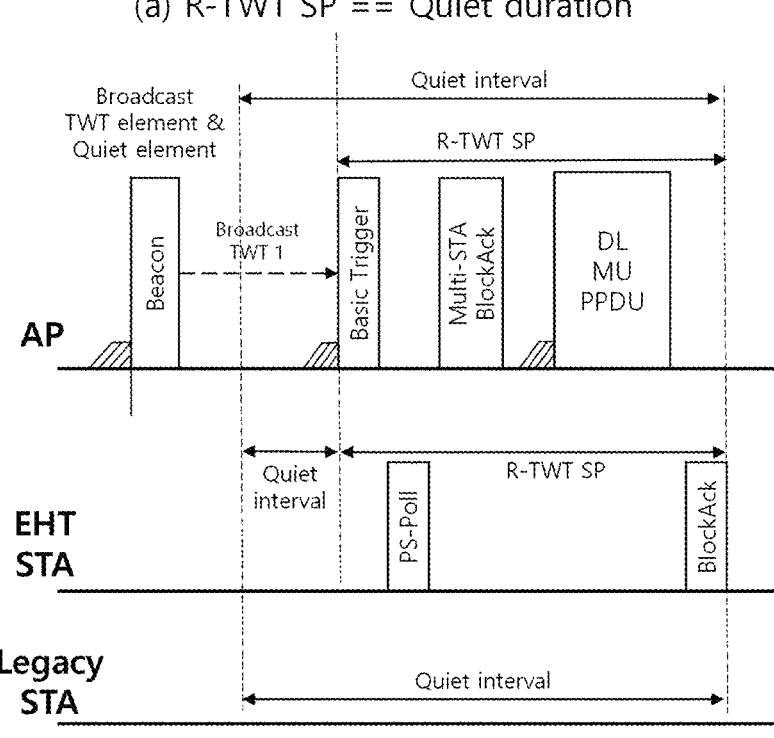
(b) R-TWT SP < Quiet duration
*FIG. 26*

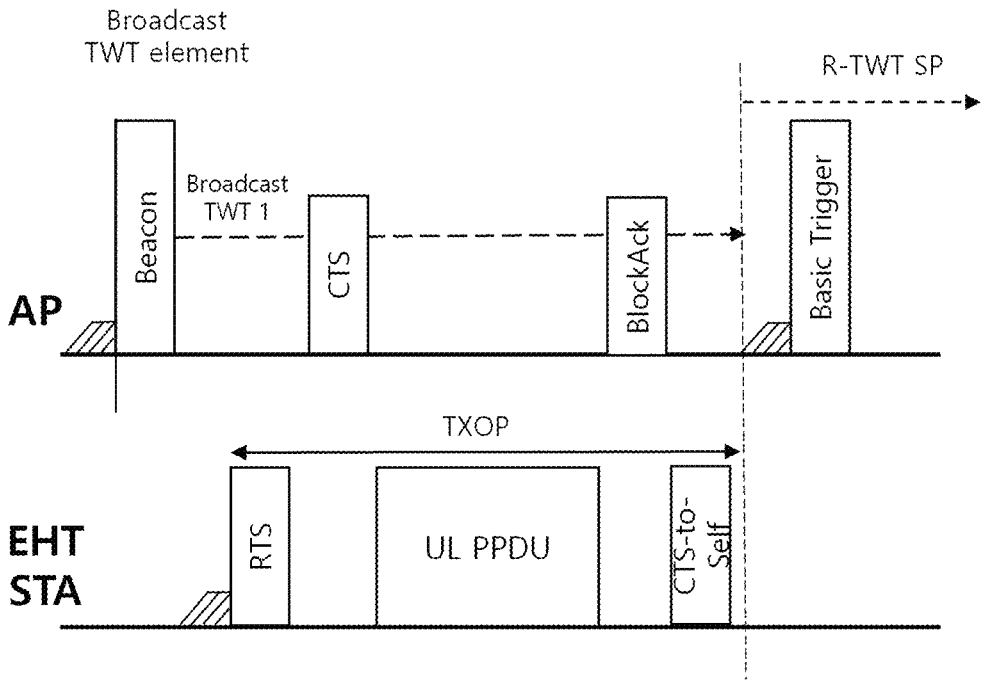
(a) Short TXOP
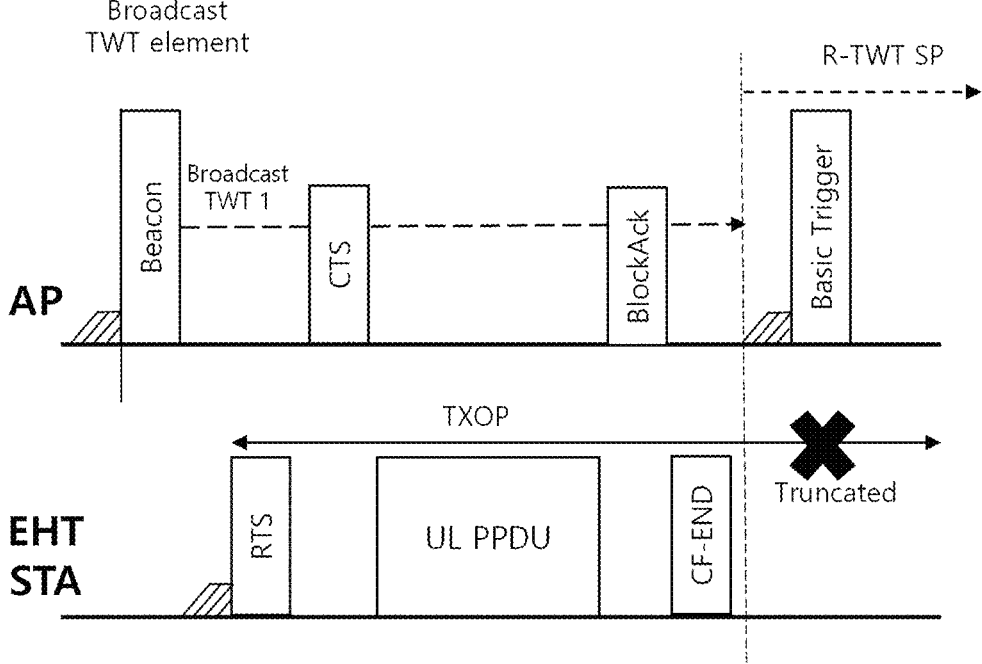
(b) TXOP truncation
*FIG. 27*

R-TWT SP termination(truncation)

WIRELESS COMMUNICATION METHOD USING LIMITED TWT AND WIRELESS COMMUNICATION TERMINAL USING SAME

CROSS-REFERENCE TO RELATED APPLICATIONS

This application is a continuation of International Patent Application No. PCT/KR2022/000668 filed on Jan. 13, 2022, which claims the priority to Korean Patent Application No. 10-2021-0004957 filed in the Korean Intellectual Property Office on Jan. 13, 2021, Korean Patent Application No. 10-2021-0014361 filed in the Korean Intellectual Property Office on Feb. 1, 2021, and Korean Patent Application No. 10-2021-0028292 filed in the Korean Intellectual Property Office on Mar. 3, 2021, the entire contents of which are incorporated herein by reference.

TECHNICAL FIELD

The disclosure relates to a wireless communication method using a restricted TWT, and a wireless communication terminal using same.

BACKGROUND ART

In recent years, with supply expansion of mobile apparatuses, a wireless LAN technology that can provide a rapid wireless Internet service to the mobile apparatuses has been significantly spotlighted. The wireless LAN technology allows mobile apparatuses including a smart phone, a smart pad, a laptop computer, a portable multimedia player, an embedded apparatus, and the like to wirelessly access the Internet in home or a company or a specific service providing area based on a wireless communication technology in a short range.

Institute of Electrical and Electronics Engineers (IEEE) 802.11 has commercialized or developed various technological standards since an initial wireless LAN technology is supported using frequencies of 2.4 GHz. First, the IEEE 802.11b supports a communication speed of a maximum of 11 Mbps while using frequencies of a 2.4 GHz band. IEEE 802.11a which is commercialized after the IEEE 802.11b uses frequencies of not the 2.4 GHz band but a 5 GHz band to reduce an influence by interference as compared with the frequencies of the 2.4 GHz band which are significantly congested and improves the communication speed up to a maximum of 54 Mbps by using an OFDM technology. However, the IEEE 802.11a has a disadvantage in that a communication distance is shorter than the IEEE 802.11b. In addition, IEEE 802.11g uses the frequencies of the 2.4 GHz band similarly to the IEEE 802.11b to implement the communication speed of a maximum of 54 Mbps and satisfies backward compatibility to significantly come into the spotlight and further, is superior to the IEEE 802.11a in terms of the communication distance.

Moreover, as a technology standard established to overcome a limitation of the communication speed which is pointed out as a weak point in a wireless LAN, IEEE 802.11n has been provided. The IEEE 802.11n aims at increasing the speed and reliability of a network and extending an operating distance of a wireless network. In more detail, the IEEE 802.11n supports a high throughput (HT) in which a data processing speed is a maximum of 540 Mbps or more and further, is based on a multiple inputs and multiple outputs (MIMO) technology in which multiple antennas are used at both sides of a transmitting unit and a receiving unit in order to minimize a transmission error and optimize a data speed. Further, the standard can use a coding scheme that transmits multiple copies which overlap with each other in order to increase data reliability.

As the supply of the wireless LAN is activated and further, applications using the wireless LAN are diversified, the need for new wireless LAN systems for supporting a higher throughput (very high throughput (VHT)) than the data processing speed supported by the IEEE 802.11n has come into the spotlight. Among them, IEEE 802.11ac supports a wide bandwidth (80 to 160 MHz) in the 5 GHz frequencies. The IEEE 802.11ac standard is defined only in the 5 GHz band, but initial 11ac chipsets will support even operations in the 2.4 GHz band for the backward compatibility with the existing 2.4 GHz band products. Theoretically, according to the standard, wireless LAN speeds of multiple stations are enabled up to a minimum of 1 Gbps and a maximum single link speed is enabled up to a minimum of 500 Mbps. This is achieved by extending concepts of a wireless interface accepted by 802.11n, such as a wider wireless frequency bandwidth (a maximum of 160 MHz), more MIMO spatial streams (a maximum of 8), multi-user MIMO, and high-density modulation (a maximum of 256 QAM). Further, as a scheme that transmits data by using a 60 GHz band instead of the existing 2.4 GHz/5 GHz, IEEE 802.11ad has been provided. The IEEE 802.11ad is a transmission standard that provides a speed of a maximum of 7 Gbps by using a beamforming technology and is suitable for high bit rate moving picture streaming such as massive data or non-compression HD video. However, since it is difficult for the 60 GHz frequency band to pass through an obstacle, it is disadvantageous in that the 60 GHz frequency band can be used only among devices in a short-distance space.

As a wireless LAN standard after 802.11ac and 802.11ad, the IEEE 802.11ax (high efficiency WLAN, HEW) standard for providing a high-efficiency and high-performance wireless LAN communication technology in a high-density environment, in which APs and terminals are concentrated, is in the development completion stage. In an 802.11ax-based wireless LAN environment, communication with high frequency efficiency should be provided indoors/outdoors in the presence of high-density stations and access points (APs), and various technologies have been developed to implement the same.

In order to support new multimedia applications, such as high-definition video and real-time games, the development of a new wireless LAN standard has begun to increase a maximum transmission rate. In IEEE 802.11be (extremely high throughput, EHT), which is a 7th generation wireless LAN standard, development of standards is underway aiming at supporting a transmission rate of up to 30 Gbps via a wider bandwidth, an increased spatial stream, multi-AP cooperation, and the like in a 2.4/5/6 GHz band.

DISCLOSURE OF INVENTION

Technical Problem

An embodiment of the present invention is for providing a wireless communication method using a multi-link and a wireless communication terminal using the same.

Solution to Problem

In an embodiment of the disclosure, a wireless communication terminal for wirelessly communicating with a base wireless communication terminal includes a transceiver and a processor. The processor transmits low latency traffic configured as traffic for low latency transmission or a response to the low latency traffic within a restricted service period. In this case, transmission except for transmission of the low latency traffic and transmission of the low latency traffic is restricted within the restricted service period.

The processor may terminate a TXOP for transmission of traffic other than the low latency traffic before a start of the restricted service period.

The processor may obtain a random integer within a contention window, perform a channel access based on the obtained random integer, and perform the channel access again when the channel access is completed before a start of the restricted service period and abandoning transmission upon determination that a frame exchange fails to be completed before the start of the restricted service period.

The processor may maintain a size of the contention window used for the completed channel access without change when the wireless communication terminal performs the channel access again.

The processor may maintain a retransmission count of the completed channel access without change when the wireless communication terminal performs the channel access again.

A quiet interval corresponding to the restricted service period may be configured, and all transmissions may not be allowed in the quiet interval. The processor may transmit the low latency traffic or the response to the low latency traffic within the restricted service period by ignoring the quiet interval corresponding to the restricted service period, and refrain from transmitting a CF-End frame within the restricted service period.

A quiet interval corresponding to the restricted service period may be configured, and all transmissions may not be allowed in the quiet interval. In this case, the processor may determine whether to ignore the quiet interval based on a start time point of the restricted service period and a start time point of the quiet interval, and may, when determining to ignore the quiet interval, transmit the low latency traffic or the response to the low latency traffic within the restricted service period by ignoring the quiet interval corresponding to the restricted service period.

The processor may ignore the quiet interval when a condition determined based on the start time point of the restricted service period and the start time point of the quiet interval is satisfied, and may refrain from performing all transmissions when the condition determined based on the start time point of the restricted service period and the start time point of the quiet interval fails to be satisfied.

The condition determined based on the start time point of the restricted service period and the start time point of the quiet interval may be that the start time point of the quiet interval and the start time point of the restricted service period are within a predetermined time interval.

An operation method of a wireless communication terminal for wirelessly communicating with a base wireless communication terminal according to an embodiment of the disclosure includes transmitting low latency traffic configured as traffic for low latency transmission or a response to the low latency traffic within a restricted service period. In this case, transmission except for transmission of the low latency traffic and transmission of the response to the low latency traffic may be restricted within the restricted service period.

The operation method may further include terminating a TXOP for transmission of traffic other than the low latency traffic before a start of the restricted service period.

The operation method may include: acquiring a random integer within a contention window; performing a channel access based on the obtained random integer; and performing the channel access again when a channel access is completed before a start of the restricted service period and abandoning transmission upon determination that a frame exchange fails to be completed before the start of the restricted service period.

The performing the channel access again may include maintaining a size of the contention window used for the completed channel access without change when the wireless communication terminal performs the channel access again.

The performing the channel access again may include maintaining a retransmission count of the completed channel access without change when the wireless communication terminal performs the channel access again.

A quiet interval corresponding to the restricted service period may be configured, and all transmissions may not be allowed in the quiet interval. In this case, the transmitting the low latency traffic or the response to the low latency traffic within the restricted service period may include: transmitting the low latency traffic or the response to the low latency traffic within the restricted service period by ignoring the quiet interval corresponding to the restricted service period; and refraining from transmitting a CF-End frame within the restricted service period.

A quiet interval corresponding to the restricted service period may be configured, and all transmissions may not be allowed in the quiet interval. In this case, the transmitting the low latency traffic or the response to the low latency traffic within the restricted service period may include: determining whether to ignore the quiet interval based on a start time point of the restricted service period and a start time point of the quiet interval; and when determining to ignore the quiet interval, transmitting the low latency traffic or the response to the low latency traffic within the restricted service period by ignoring the quiet interval corresponding to the restricted service period.

The determining whether to ignore the quiet interval based on the start time point of the restricted service period and the start time point of the quiet interval may include: ignoring the quiet interval when a condition determined based on the start time point of the restricted service period and the start time point of the quiet interval is satisfied; and refraining from performing all transmissions when the condition determined based on the start time point of the restricted service period and the start time point of the quiet interval fails to be satisfied.

The condition determined based on the start time point of the restricted service period and the start time point of the quiet interval may be that the start time point of the quiet interval and a start time point of a service period are within a predetermined time interval.

Advantageous Effects of Invention

An embodiment of the disclosure provides a wireless communication method for providing a restricted TWT function and a wireless communication terminal using same.

BRIEF DESCRIPTION OF DRAWINGS

FIG. 5 schematically illustrates a process in which a STA and an AP set a link.

FIG. 6 illustrates a carrier sense multiple access (CSMA)/collision avoidance (CA) method used in wireless LAN communication.

FIG. 8 illustrates an example of various extremely high throughput (EHT) physical protocol data unit (PPDU) formats and a method for indicating the same according to an embodiment of the present invention.

FIG. 14 illustrates the performance of channel access by the station after channel access prohibition is released according to an embodiment of the disclosure.

FIG. 26 illustrates configuring a quiet interval by an AP according to an embodiment of the disclosure.

FIG. 27 illustrates a method of configuring a TXOP by a station in consideration of a restricted service period according to an embodiment of the disclosure.

BEST MODE FOR CARRYING OUT THE INVENTION

Terms used in the specification adopt general terms which are currently widely used by considering functions in the present invention, but the terms may be changed depending on an intention of those skilled in the art, customs, and emergence of new technology. Further, in a specific case, there is a term arbitrarily selected by an applicant and in this case, a meaning thereof will be described in a corresponding description part of the invention. Accordingly, it should be revealed that a term used in the specification should be analyzed based on not just a name of the term but a substantial meaning of the term and contents throughout the specification.

Throughout this specification and the claims that follow, when it is described that an element is "coupled" to another element, the element may be "directly coupled" to the other element or "electrically coupled" to the other element through a third element. Further, unless explicitly described to the contrary, the word "comprise" and variations such as "comprises" or "comprising", will be understood to imply the inclusion of stated elements but not the exclusion of any other elements. Moreover, limitations such as "or more" or "or less" based on a specific threshold may be appropriately substituted with "more than" or "less than", respectively.

Hereinafter, in the present invention, a field and a subfield may be interchangeably used.

Figure 1:
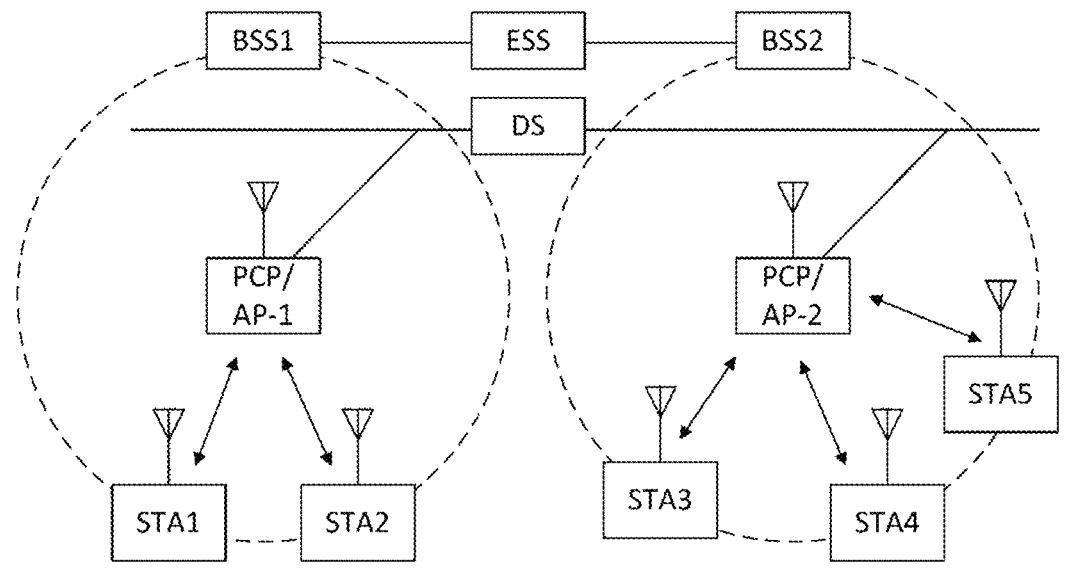
FIG. 1 illustrates a wireless LAN system according to an embodiment of the present invention.

FIG. 1 illustrates a wireless LAN system according to an embodiment of the present invention.

FIG. 1 is a diagram illustrating a wireless LAN system according to an embodiment of the present invention. The wireless LAN system includes one or more basic service sets (BSS) and the BSS represents a set of apparatuses which are successfully synchronized with each other to communicate with each other. In general, the BSS may be classified into an infrastructure BSS and an independent BSS (IBSS) and FIG. 1 illustrates the infrastructure BSS between them.

As illustrated in FIG. 1, the infrastructure BSS (BSS1 and BSS2) includes one or more stations STA1, STA2, STA3, STA4, and STA5, access points AP-1 and AP-2 which are stations providing a distribution service, and a distribution system (DS) connecting the multiple access points AP-1 and AP-2.

The station (STA) is a predetermined device including medium access control (MAC) following a regulation of an IEEE 802.11 standard and a physical layer interface for a wireless medium, and includes both a non-access point (non-AP) station and an access point (AP) in a broad sense. Further, in the present specification, a term 'terminal' may be used to refer to a non-AP STA, or an AP, or to both terms. A station for wireless communication includes a processor and a communication unit and according to the embodiment, may further include a user interface unit and a display unit. The processor may generate a frame to be transmitted through a wireless network or process a frame received through the wireless network and besides, perform various processing for controlling the station. In addition, the communication unit is functionally connected with the processor and transmits and receives frames through the wireless network for the station. According to the present invention, a terminal may be used as a term which includes user equipment (UE).

The access point (AP) is an entity that provides access to the distribution system (DS) via wireless medium for the station associated therewith. In the infrastructure BSS, communication among non-AP stations is, in principle, performed via the AP, but when a direct link is configured, direct communication is enabled even among the non-AP stations. Meanwhile, in the present invention, the AP is used as a concept including a personal BSS coordination point (PCP) and may include concepts including a centralized controller, a base station (BS), a node-B, a base transceiver system (BTS), and a site controller in a broad sense. In the present invention, an AP may also be referred to as a base wireless communication terminal. The base wireless communication terminal may be used as a term which includes an AP, a base station, an eNB (i.e. eNodeB) and a transmission point (TP) in a broad sense. In addition, the base wireless communication terminal may include various types of wireless communication terminals that allocate medium resources and perform scheduling in communication with a plurality of wireless communication terminals.

A plurality of infrastructure BSSs may be connected with each other through the distribution system (DS). In this case, a plurality of BSSs connected through the distribution system is referred to as an extended service set (ESS).

Figure 2:
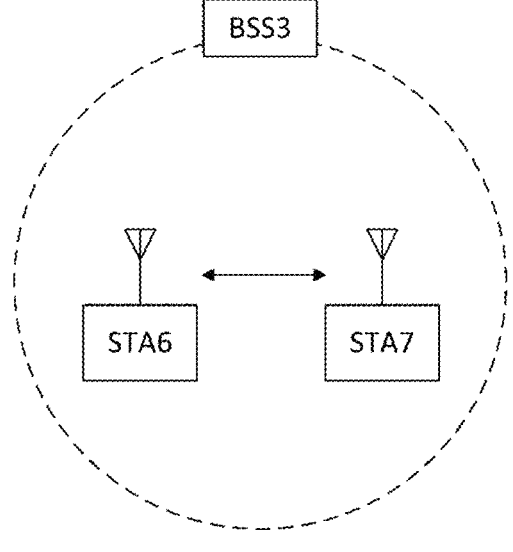
FIG. 2 illustrates a wireless LAN system according to another embodiment of the present invention.

FIG. 2 illustrates an independent BSS which is a wireless LAN system according to another embodiment of the present invention. In the embodiment of FIG. 2, duplicative description of parts, which are the same as or correspond to the embodiment of FIG. 1, will be omitted.

Since a BSS3 illustrated in FIG. 2 is the independent BSS and does not include the AP, all stations STA6 and STA7 are not connected with the AP. The independent BSS is not permitted to access the distribution system and forms a self-contained network. In the independent BSS, the respective stations STA6 and STA7 may be directly connected with each other.

Figure 3:
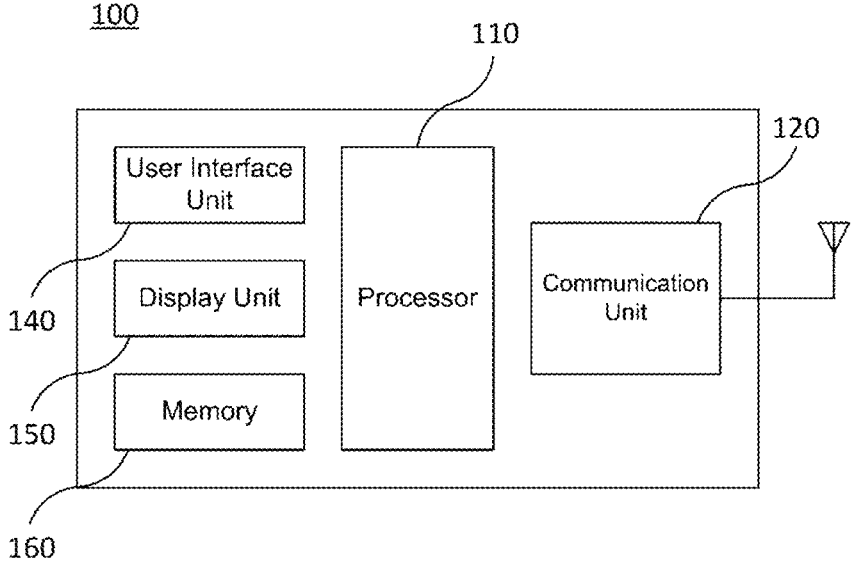
FIG. 3 illustrates a configuration of a station according to an embodiment of the present invention.

FIG. 3 is a block diagram illustrating a configuration of a station 100 according to an embodiment of the present invention. As illustrated in FIG. 3, the station 100 according to the embodiment of the present invention may include a processor 110, a communication unit 120, a user interface unit 140, a display unit 150, and a memory 160.

First, the communication unit 120 transmits and receives a wireless signal such as a wireless LAN packet, or the like and may be embedded in the station 100 or provided as an exterior. According to the embodiment, the communication unit 120 may include at least one communication module using different frequency bands. For example, the communication unit 120 may include communication modules having different frequency bands such as 2.4 GHz, 5 GHz, 6 GHz and 60 GHz. According to an embodiment, the station 100 may include a communication module using a frequency band of 7.125 GHz or more and a communication module using a frequency band of 7.125 GHz or less. The respective communication modules may perform wireless communication with the AP or an external station according to a wireless LAN standard of a frequency band supported by the corresponding communication module. The communication unit 120 may operate only one communication module at a time or simultaneously operate multiple communication modules together according to the performance and requirements of the station 100. When the station 100 includes a plurality of communication modules, each communication module may be implemented by independent elements or a plurality of modules may be integrated into one chip. In an embodiment of the present invention, the communication unit 120 may represent a radio frequency (RF) communication module for processing an RF signal.

Next, the user interface unit 140 includes various types of input/output means provided in the station 100. That is, the user interface unit 140 may receive a user input by using various input means and the processor 110 may control the station 100 based on the received user input. Further, the user interface unit 140 may perform output based on a command of the processor 110 by using various output means.

Next, the display unit 150 outputs an image on a display screen. The display unit 150 may output various display objects such as contents executed by the processor 110 or a user interface based on a control command of the processor 110, and the like. Further, the memory 160 stores a control program used in the station 100 and various resulting data. The control program may include an access program required for the station 100 to access the AP or the external station.

The processor 110 of the present invention may execute various commands or programs and process data in the station 100. Further, the processor 110 may control the respective units of the station 100 and control data transmission/reception among the units. According to the embodiment of the present invention, the processor 110 may execute the program for accessing the AP stored in the memory 160 and receive a communication configuration message transmitted by the AP. Further, the processor 110 may read information on a priority condition of the station 100 included in the communication configuration message and request the access to the AP based on the information on the priority condition of the station 100. The processor 110 of the present invention may represent a main control unit of the station 100 and according to the embodiment, the processor 110 may represent a control unit for individually controlling some component of the station 100, for example, the communication unit 120, and the like. That is, the processor 110 may be a modem or a modulator/demodulator for modulating and demodulating wireless signals transmitted to and received from the communication unit 120. The processor 110 controls various operations of wireless signal transmission/reception of the station 100 according to the embodiment of the present invention. A detailed embodiment thereof will be described below.

The station 100 illustrated in FIG. 3 is a block diagram according to an embodiment of the present invention, where separate blocks are illustrated as logically distinguished elements of the device. Accordingly, the elements of the device may be mounted in a single chip or multiple chips depending on design of the device. For example, the processor 110 and the communication unit 120 may be implemented while being integrated into a single chip or implemented as a separate chip. Further, in the embodiment of the present invention, some components of the station 100, for example, the user interface unit 140 and the display unit 150 may be optionally provided in the station 100.

Figure 4:
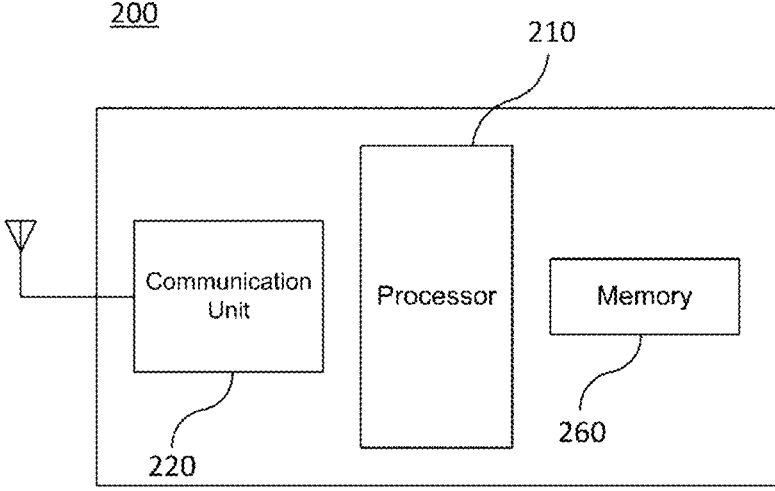
FIG. 4 illustrates a configuration of an access point according to an embodiment of the present invention.

FIG. 4 is a block diagram illustrating a configuration of an AP 200 according to an embodiment of the present invention. As illustrated in FIG. 4, the AP 200 according to the embodiment of the present invention may include a processor 210, a communication unit 220, and a memory 260. In FIG. 4, among the components of the AP 200, duplicative description of parts which are the same as or correspond to the components of the station 100 of FIG. 2 will be omitted.

Referring to FIG. 4, the AP 200 according to the present invention includes the communication unit 220 for operating the BSS in at least one frequency band. As described in the embodiment of FIG. 3, the communication unit 220 of the AP 200 may also include a plurality of communication modules using different frequency bands. That is, the AP 200 according to the embodiment of the present invention may include two or more communication modules among different frequency bands, for example, 2.4 GHz, 5 GHz, 6 GHz and 60 GHz together. Preferably, the AP 200 may include a communication module using a frequency band of 7.125 GHz or more and a communication module using a frequency band of 7.125 GHz or less. The respective communication modules may perform wireless communication with the station according to a wireless LAN standard of a frequency band supported by the corresponding communication module. The communication unit 220 may operate only one communication module at a time or simultaneously operate multiple communication modules together according to the performance and requirements of the AP 200. In an embodiment of the present invention, the communication unit 220 may represent a radio frequency (RF) communication module for processing an RF signal.

Next, the memory 260 stores a control program used in the AP 200 and various resulting data. The control program may include an access program for managing the access of the station. Further, the processor 210 may control the respective units of the AP 200 and control data transmission/reception among the units. According to the embodiment of the present invention, the processor 210 may execute the program for accessing the station stored in the memory 260 and transmit communication configuration messages for one or more stations. In this case, the communication configuration messages may include information about access priority conditions of the respective stations. Further, the processor 210 performs an access configuration according to an access request of the station. According to an embodiment, the processor 210 may be a modem or a modulator/demodulator for modulating and demodulating wireless signals transmitted to and received from the communication unit 220. The processor 210 controls various operations such as wireless signal transmission/reception of the AP 200 according to the embodiment of the present invention. A detailed embodiment thereof will be described below.

FIG. 5 is a diagram schematically illustrating a process in which a STA sets a link with an AP.

Referring to FIG. 5, the link between the STA 100 and the AP 200 is set through three steps of scanning, authentication, and association in a broad way. First, the scanning step is a step in which the STA 100 obtains access information of BSS operated by the AP 200. A method for performing the scanning includes a passive scanning method in which the AP 200 obtains information by using a beacon message (S101) which is periodically transmitted and an active scanning method in which the STA 100 transmits a probe request to the AP (S103) and obtains access information by receiving a probe response from the AP (S105).

The STA 100 that successfully receives wireless access information in the scanning step performs the authentication step by transmitting an authentication request (S107a) and receiving an authentication response from the AP 200 (S107b). After the authentication step is performed, the STA 100 performs the association step by transmitting an association request (S109a) and receiving an association response from the AP 200 (S109b). In this specification, an association basically means a wireless association, but the present invention is not limited thereto, and the association may include both the wireless association and a wired association in a broad sense.

Meanwhile, an 802.1X based authentication step (S111) and an IP address obtaining step (S113) through DHCP may be additionally performed. In FIG. 5, the authentication server 300 is a server that processes 802.1X based authentication with the STA 100 and may be present in physical association with the AP 200 or present as a separate server.

FIG. 6 is a diagram illustrating a carrier sense multiple access (CSMA)/collision avoidance (CA) method used in wireless LAN communication.

A terminal that performs a wireless LAN communication checks whether a channel is busy by performing carrier sensing before transmitting data. When a wireless signal having a predetermined strength or more is sensed, it is determined that the corresponding channel is busy and the terminal delays the access to the corresponding channel. Such a process is referred to as clear channel assessment (CCA) and a level to decide whether the corresponding signal is sensed is referred to as a CCA threshold. When a wireless signal having the CCA threshold or more, which is received by the terminal, indicates the corresponding terminal as a receiver, the terminal processes the received wireless signal. Meanwhile, when a wireless signal is not sensed in the corresponding channel or a wireless signal having a strength smaller than the CCA threshold is sensed, it is determined that the channel is idle.

When it is determined that the channel is idle, each terminal having data to be transmitted performs a backoff procedure after an inter frame space (IFS) time depending on a situation of each terminal, for instance, an arbitration IFS (AIFS), a PCF IFS (PIFS), or the like elapses. According to the embodiment, the AIFS may be used as a component which substitutes for the existing DCF IFS (DIFS). Each terminal stands by while decreasing slot time(s) as long as a random number determined by the corresponding terminal during an interval of an idle state of the channel and a terminal that completely exhausts the slot time(s) attempts to access the corresponding channel. As such, an interval in which each terminal performs the backoff procedure is referred to as a contention window interval. In this instance, a random number is referred to as a backoff counter. That is, the initial value of the backoff counter may be set by an integer number which is a random number that a UE obtains. In the case that the UE detects that a channel is idle during a slot time, the UE may decrease the backoff counter by 1. In addition, in the case that the backoff counter reaches 0, the UE may be allowed to perform channel access in a corresponding channel. Therefore, in the case that a channel is idle during an AIFS time and the slot time of the backoff counter, transmission by the UE may be allowed.

When a specific terminal successfully accesses the channel, the corresponding terminal may transmit data through the channel. However, when the terminal which attempts the access collides with another terminal, the terminals which collide with each other are assigned with new random numbers, respectively to perform the backoff procedure again. According to an embodiment, a random number newly assigned to each terminal may be decided within a range (2*CW) which is twice larger than a range (a contention window, CW) of a random number which the corresponding terminal is previously assigned. Meanwhile, each terminal attempts the access by performing the backoff procedure again in a next contention window interval and in this case, each terminal performs the backoff procedure from slot time(s) which remained in the previous contention window interval. By such a method, the respective terminals that perform the wireless LAN communication may avoid a mutual collision for a specific channel.

<Examples of Various PPDU Formats>

Figure 7:
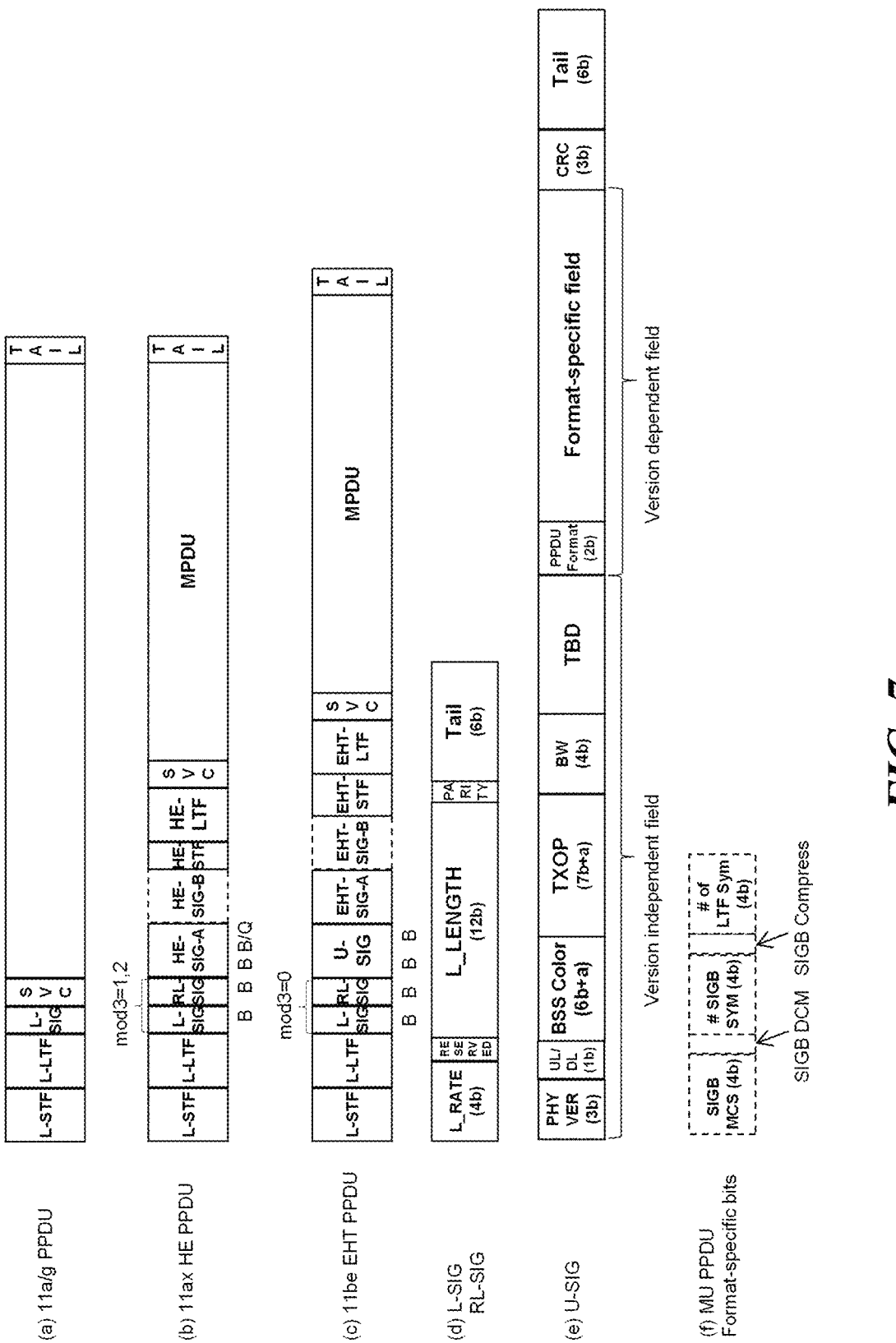
FIG. 7 illustrates an example of a format of a PLCP Protocol data unit (PPDU) for each of various standard generations.

FIG. 7 illustrates an example of a format of a PLCP Protocol data unit (PPDU) for each of various standard generations. More specifically, FIG. 7(a) illustrates an embodiment of a legacy PPDU format based on 802.11a/g, FIG. 7(b) illustrates an embodiment of an HE PPDU format based on 802.11ax, and FIG. 7(c) illustrates an embodiment of a non-legacy PPDU (i.e., EHT PPDU) format based on 802.11be. FIG. 7(d) illustrates detailed field configurations of RL-SIG and L-SIG commonly used in the PPDU formats.

Referring to FIG. 7(a), a preamble of the legacy PPDU includes a legacy short training field (L-STF), a legacy long training field (L-LTF), and a legacy signal field (L-SIG). In an embodiment of the present invention, the L-STF, the L-LTF, and the L-SIG may be referred to as a legacy preamble.

Referring to FIG. 7(b), a preamble of the HE PPDU additionally includes, in the legacy preamble, a repeated legacy short training field (RL-SIG), a high efficiency signal A field (HE-SIG-A), a high efficiency signal B field (HE-SIG-B), a high efficiency short training field (HE-STF), and a high efficiency long training field (HE-LTF). In an embodiment of the present invention, the RL-SIG, HE-SIG-A, the HE-SIG-B, the HE-STF and the HE-LTF may be referred to as an HE preamble. A specific configuration of the HE preamble may be modified according to an HE PPDU format. For example, HE-SIG-B may be used only in an HE MU PPDU format.

Referring to FIG. 7(c), a preamble of the EHT PPDU additionally includes, in the legacy preamble, a repeated legacy short training field (RL-SIG), a universal signal field (U-SIG), and an extremely high throughput signal A field (EHT-SIG-A), an extremely high throughput signal B field (EHT-SIG-B), an extremely high throughput short training field (EHT-STF), and an extremely high throughput long training field (EHT-LTF). In an embodiment of the present invention, the RL-SIG, EHT-SIG-A, the EHT-SIG-B, the EHT-STF and the EHT-LTF may be referred to as an EHT preamble. A specific configuration of a non-legacy preamble may be modified according to an EHT PPDU format. For example, EHT-SIG-A and EHT-SIG-B may be used only in a part of the EHT PPDU format. 64-FFT OFDM is applied in an L-SIG field included in the preamble of the PPDU, and the L-SIG field includes a total of 64 subcarriers. Among 64 subcarriers, 48 subcarriers excluding a guard subcarrier, a DC subcarrier, and a pilot subcarrier are used for transmission of L-SIG data. BPSK and a modulation and coding scheme (MCS) of rate=1/2 are applied in L-SIG, and therefore the L-SIG may include a total of 24 bits of information. FIG. 7(d) illustrates a 24-bit information configuration of L-SIG.

Referring to FIG. 7(d), the L-SIG includes an L_RATE field and an L_LENGTH field. The L_RATE field includes 4 bits and indicates an MCS used for data transmission. Specifically, the L_RATE field indicates one value among transmission rates of 6/9/12/18/24/36/48/54 Mbps obtained by combining a modulation scheme of BPSK/QPSK/16-QAM/64-QAM, etc. and an inefficiency of 1/2, 2/3, 3/4, etc. A total length of a corresponding PPDU may be indicated by combining information of the L_RATE field and information of the L_LENGTH field. In a non-legacy PPDU format, the L_RATE field is configured to a minimum rate of 6 Mbps.

A unit of the L_LENGTH field is a byte and a total of 12 bits are allocated to signal up to 4095, and a length of the PPDU may be indicated in combination with the L_RATE field. A legacy terminal and a non-legacy terminal may interpret the L_LENGTH field in different ways.

First, a method of interpreting the length of a PPDU using a L_LENGTH field by a legacy terminal or a non-legacy terminal is as follows. When the L_RATE field is set to 6 Mbps, 3 bytes (i.e., 24 bits) can be transmitted for 4 us, which is one symbol duration of 64 FFT. Therefore, by adding 3 bytes corresponding to the SVC field and the Tail field to the value of the L_LENGTH field and dividing it by 3 bytes, which is the transmission amount of one symbol, the number of symbols after the L-SIG is obtained on the 64FFT basis. The length of the corresponding PPDU, that is, the reception time (i.e., RXTIME) is obtained by multiplying the obtained number of symbols by 4 us, which is one symbol duration, and then adding a 20 us which is for transmitting L-STF, L-LTF and L-SIG. This can be expressed by the following Equation 1.

$$RXTIME(us) = \left( \left\lceil \frac{L\_LENGTH + 3}{3} \right\rceil \right) \times 4 + 20 \qquad \text{[Equation 1]}$$

In this case, denotes the smallest natural number greater than or equal to x. Since the maximum value of the L_LENGTH field is 4095, the length of the PPDU can be set up to 5.464 ms. The non-legacy terminal transmitting the PPDU should set the L_LENGTH field as shown in Equation 2 below.

$$L\_LENGTH(byte) = \left( \left\lceil \frac{TXTIME - 20}{4} \right\rceil \right) \times 3 - 3 \qquad \text{[Equation 2]}$$

Herein, TXTIME is the total transmission time constituting the corresponding PPDU, and is expressed by Equation 3 below. In this case, TX represents the transmission time of X.

$$TXTIME\ (\mu s) = T_{L\text{-}STF} + T_{L\text{-}LTF} + T_{L\text{-}SIG} + T_{RL\text{-}SIG} +$$
$$T_{U\text{-}SIG} + (T_{EHT\text{-}SIG\text{-}A}) + (T_{EHT\text{-}SIG\text{-}B}) + T_{EHT\text{-}STF} +$$
$$N_{EHT\text{-}LTF} \cdot T_{EHT\text{-}LTF} + T_{DATA} \qquad \text{[Equation 3]}$$

Referring to the above equations, the length of the PPDU is calculated based on a rounded up value of L_LENGTH/3. Therefore, for a random value of k, three different values of L_LENGTH={3k+1, 3k+2, 3(k+1)} indicate the same PPDU length.

Referring to FIG. 7(e), a universal SIG (U-SIG) field continues to exist in an EHT PPDU and a WLAN PPDU of a subsequent generation, and serves to classify a generation of a PPDU, which includes 11be. U-SIG is a 64 FFT-based OFDM 2 symbol and may transfer a total of 52 bits of information. In 52 bits, 43 bits excluding 9 bits for CRC/Tail are largely divided into a version independent (VI) field and a version dependent (VD) field.

A VI bit enables a current bit configuration to be maintained even later on, so that even if a PPDU of a subsequent generation is defined, current 11be terminals may obtain information on the PPDU via the VI fields of the PPDU. To this end, the VI field includes PHY version, UL/DL, BSS color, TXOP, and reserved fields. The PHY version field is 3 bits, and serves to sequentially classify 11be and subsequent generation wireless LAN standards into versions. 11be has a value of 000b. The UL/DL field identifies whether the PPDU is an uplink/downlink PPDU. BSS color indicates an identifier for each BSS defined in 11ax, and has a value of 6 bits or more. TXOP indicates transmit opportunity duration transmitted in a MAC header, wherein, by adding the TXOP to a PHY header, the PPDU may infer a length of the TXOP included therein without having to decode an MPDU, and the TXOP has a value of 7 bits or more.

The VD field is signaling information useful only for an 11be version of the PPDU, and may include a field commonly used in any PPDU format, such as PPDU format and BW, and a field defined differently for each PPDU format. The PPDU format is a classifier that classifies EHT single user (SU), EHT multiple user (MU), EHT trigger-based (TB), EHT extended range (ER) PPDU, etc. The BW field signals five basic PPDU BW options (BW, which is expressible in the form of an exponential power of 20*2, may be referred to as basic BW) of 20, 40, 80, 160 (80+80), and 320 (160+160) MHz and various remaining PPDU BWs configured via preamble puncturing. After being signaled at 320 MHz, signaling may be performed in a form in which some 80 MHz is punctured. A punctured and modified channel type may be signaled directly in the BW field, or may be signaled using the BW field with a field (e.g., a field within the EHT-SIG field) appearing after the BW field. If the BW field is configured to 3 bits, a total of 8 BW signaling may be performed, and therefore only up to 3 signaling may be performed in a puncturing mode. If the BW field is configured to 4 bits, a total of 16 BW signaling may be performed, and therefore up to 11 signaling may be performed in the puncturing mode.

A field located after the BW field varies depending on the type and format of the PPDU, an MU PPDU and an SU PPDU may be signaled in the same PPDU format, a field for classification between the MU PPDU and the SU PPDU may be located before an EHT-SIG field, and additional signaling may be performed for the same. Both the SU PPDU and the MU PPDU include the EHT-SIG field, but some fields that are not required in the SU PPDU may be compressed. Information on the field to which the compression has been applied may be omitted or may have a size smaller than a size of an original field included in the MU PPDU. For example, in a case of the SU PPDU, a common field of the EHT-SIG may be omitted or replaced, or the SU PPDU may have a different configuration in which a user specific field is replaced, reduced to one, or the like.

Alternatively, the SU PPDU may further include a compression field indicating whether compression is performed, and a part of field (e.g., RA fields, etc.) may be omitted according to a value of the compressed field.

If a part of the EHT-SIG field of the SU PPDU is compressed, information to be included in the compressed field may be signaled also in an uncompressed field (e.g., the common field, etc.). The MU PPDU corresponds to a PPDU format for concurrent reception by multiple users, and therefore the EHT-SIG field is required to be transmitted subsequently to the U-SIG field, and the amount of signaled information may vary. That is, a plurality of MU PPDUs are transmitted to a plurality of STAs, so that the respective STAs should recognize locations of RUs, at which the MU PPDUs are transmitted, the STAs to which the RUs have been allocated respectively, and whether the transmitted MU PPDUs have been transmitted to the STAs themselves. Therefore, an AP should transmit information described above, by including the same in the EHT-SIG field. To this end, information for efficient transmission of the EHT-SIG field is signaled in the U-SIG field, and this may correspond to an MCS that is a modulation method and/or the number of symbols in the EHT-SIG field. The EHT-SIG field may include information on a size and location of an RU allocated to each user.

In the case of the SU PPDU, a plurality of RUs may be allocated to an STA, and the plurality of RUs may be continuous or discontinuous. If the RUs allocated to the STA are discontinuous, the STA should recognize a punctured RU in the middle in order to efficiently receive the SU PPDU. Accordingly, the AP may transmit the SU PPDU including information (e.g., a puncturing pattern of the RUs, etc.) of punctured RUs among the RUs allocated to the STA. That is, in the case of the SU PPDU, a puncturing mode field, which includes information indicating, in a bitmap format, etc., a puncturing pattern and whether the puncturing mode is applied, may be included in the EHT-SIG field, and the puncturing mode field may signal a discontinuous channel type appearing within a bandwidth.

The signaled discontinuous channel type is limited, and indicates discontinuous channel information and BW of the SU PPDU in combination with a value of the BW field. For example, the SU PPDU is a PPDU transmitted only to a single terminal, so that the STA may recognize a bandwidth allocated to itself via the BW field included in the PPDU, and the SU PPDU may recognize a punctured resource in the allocated bandwidth via the puncturing mode field of the EHT-SIG field or the U-SIG field included in the PPDU. In this case, the terminal may receive the PPDU in resource units remaining after excluding a specific channel of the punctured resource unit. The plurality of RUs allocated to the STA may be configured by different frequency bands or tones.

Only a limited discontinuous channel type is signaled in order to reduce signaling overhead of the SU PPDU. Puncturing may be performed for each 20 MHz sub-channel, so that if puncturing is performed for BW having a large number of 20 MHz sub-channels, such as 80, 160, and 320 MHz, a discontinuous channel (if puncturing of only edge 20

MHz is considered to be discontinuous) type should be signaled in the case of 320 MHz by expressing whether each of 15 20 MHz sub-channels remaining after excluding a primary channel is used. As such, allocating 15 bits to signal a discontinuous channel type of single user transmission may act as excessively large signaling overhead in consideration of a low transmission rate of a signaling part.

The present invention proposes a technique for signaling a discontinuous channel type of an SU PPDU, and illustrates a discontinuous channel type determined according to the proposed technique. The present invention also proposes a technique for signaling each of puncturing types of primary 160 MHz and secondary 160 MHz in a 320 MHz BW configuration of an SU PPDU.

An embodiment of the present invention proposes a technique for differently configuring a PPDU indicated by preamble puncturing BW values according to a PPDU format signaled in a PPDU format field. It is assumed that a BW field is 4 bits, and in a case of an EHT SU PPDU or a TB PPDU, EHT-SIG-A of 1 symbol may be additionally signaled after U-SIG, or EHT-SIG-A may not be signaled at all, so that, in consideration of this, it is necessary to completely signal up to 11 puncturing modes via only the BW field of U-SIG. However, in a case of an EHT MU PPDU, EHT-SIG-B is additionally signaled after U-SIG, so that up to 11 puncturing modes may be signaled in a method different from that of the SU PPDU. In a case of an EHT ER PPDU, a BW field may be configured to 1 bit to signal whether the EHT ER PPDU is a PPDU using a 20 MHz or 10 MHz band.

FIG. 7(f) illustrates a configuration of a format-specific field of a VD field when the EHT MU PPDU is indicated in the PPDU format field of U-SIG. In the case of the MU PPDU, SIG-B, which is a signaling field for concurrent reception by multiple users, is essentially required, and SIG-B may be transmitted without separate SIG-A after U-SIG. To this end, information for decoding of SIG-B should be signaled in U-SIG. These fields include SIG-B MCS, SIG-B DCM, Number of SIG-B Symbols, SIG-B Compression, and Number of EHT-LTF Symbols.

Figure 8:
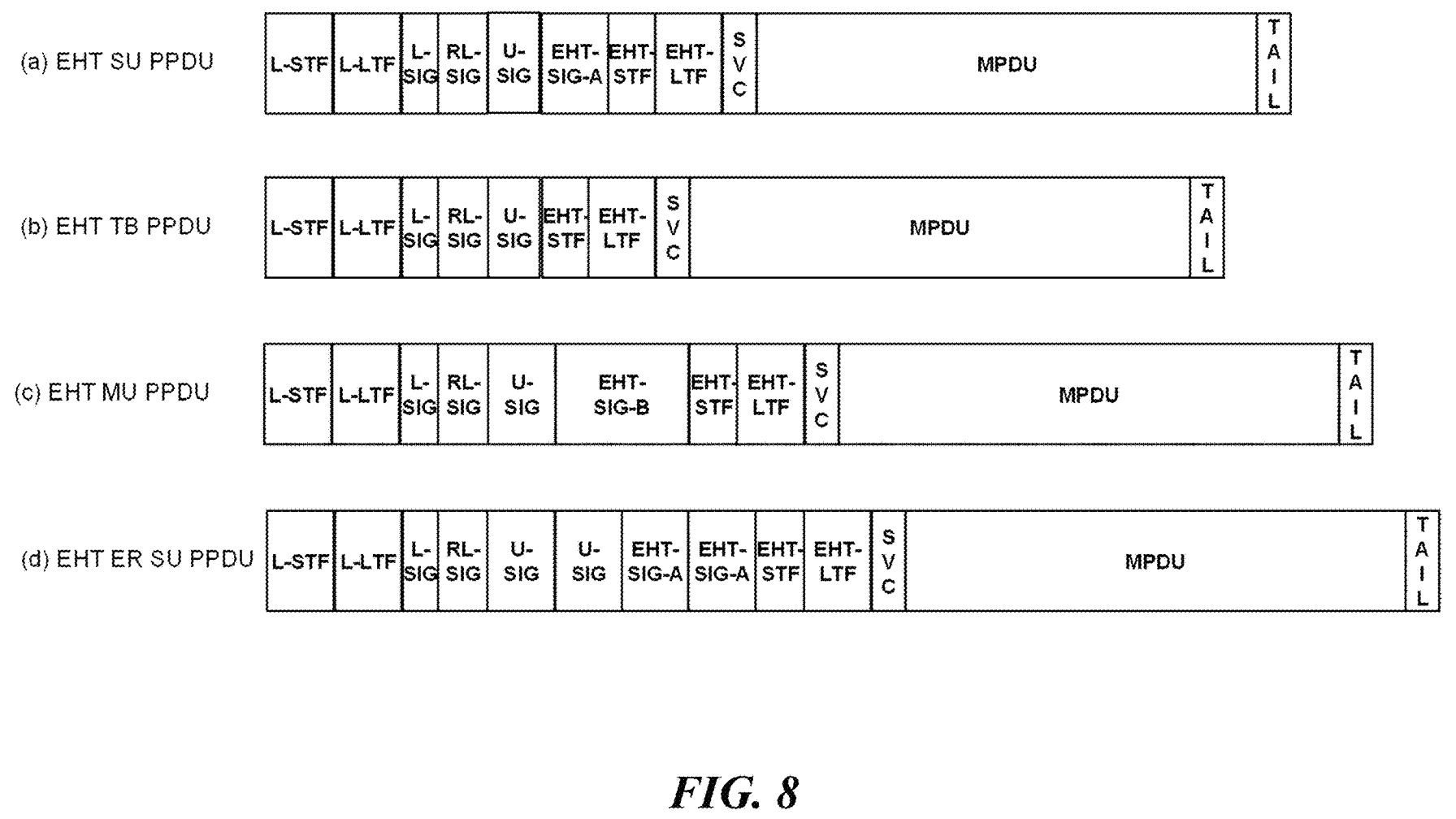

FIG. 8 illustrates an example of various extremely high throughput (EHT) physical protocol data unit (PPDU) formats and a method for indicating the same according to an embodiment of the present invention.

Referring to FIG. 8, a PPDU may include a preamble and a data part, and an EHT PPDU format, that is a PPDU type, may be classified according to a U-SIG field included in the preamble. Specifically, based on a PPDU format field included in the U-SIG field, whether the format of the PPDU is an EHT PPDU may be indicated.

FIG. 8(a) shows an example of an EHT SU PPDU format for a single STA. An EHT SU PPDU is a PPDU used for single user (SU) transmission between an AP and a single STA, and an EHT-SIG-A field for additional signaling may be located after the U-SIG field.

FIG. 8(b) shows an example of an EHT trigger-based PPDU format which corresponds to an EHT PPDU transmitted based on a trigger frame. An EHT Trigger-based PPDU is an EHT PPDU transmitted based on a trigger frame and is an uplink PPDU used for a response to the trigger frame. Unlike in the EHT SU PPDU, an EHT-SIG-A field is not located after a U-SIG field in the EHT PPDU.

FIG. 8(c) shows an example of an EHT MU PPDU format which corresponds to an EHT PPDU for multiple users. An EHT MU PPDU is a PPDU used to transmit the PPDU to one or more STAs. In the EHT MU PPDU format, an HE-SIG-B field may be located after a U-SIG field.

FIG. 8(d) shows an example of an EHT ER SU PPDU format used for single user transmission with an STA in an extended range. An EHT ER SU PPDU may be used for single user transmission with an STA of a wider range compared to the EHT SU PPDU described in FIG. 8(a), and a U-SIG field may be repeatedly located on a time axis.

The EHT MU PPDU described in FIG. 8(c) may be used by an AP to perform downlink transmission to a plurality of STAs. Here, the EHT MU PPDU may include scheduling information so that the plurality of STAs may concurrently receive the PPDU transmitted from the AP. The EHT MU PPDU may transfer, to the STAs, AID information of a transmitter and/or a receiver of the PPDU transmitted via a user specific field of EHT-SIG-B. Accordingly, the plurality of terminals having received the EHT MU PPDU may perform a spatial reuse operation based on the AID information of the user specific field included in a preamble of the received PPDU.

Specifically, a resource unit allocation (RA) field of the HE-SIG-B field included in the HE MU PPDU may include information on a configuration of a resource unit (e.g., a division form of the resource unit) in a specific bandwidth (e.g., 20 MHz, etc.) of a frequency axis. That is, the RA field may indicate configurations of resource units segmented in a bandwidth for transmission of the HE MU PPDU, in order for the STA to receive the PPDU. Information on the STA allocated (or designated) to each segmented resource unit may be included in the user specific field of EHT-SIG-B so as to be transmitted to the STA. That is, the user specific field may include one or more user fields corresponding to the respective segmented resource units.

For example, a user field corresponding to at least one resource unit used for data transmission among the plurality of segmented resource units may include an AID of a receiver or a transmitter, and a user field corresponding to the remaining resource unit(s) which is not used for data transmission may include a preconfigured null STA ID.

For convenience of description, in this specification, a frame or a MAC frame may be used interchangeably with an MPDU.

When one wireless communication device communicates by using a plurality of links, the communication efficiency of the wireless communication device may be increased. In this case, the link may be a physical path, and may consist of one wireless medium that may be used to deliver a MAC service data unit (MSDU). For example, in a case where frequency band of one of the links is in use by another wireless communication device, the wireless communication device may continue to perform communication through another link. As such, the wireless communication device may usefully use a plurality of channels. In addition, when the wireless communication device performs communication simultaneously by using a plurality of links, the overall throughput may be increased. However, in the existing wireless LAN, it has been stipulated that one wireless communication device uses one link. Therefore, a WLAN operation method for using a plurality of links is required. A wireless communication method of a wireless communication device using a plurality of links will be described through FIGS. 9 to 26. First, a specific form of a wireless communication device using a plurality of links will be described through FIG. 9.

Figure 9:
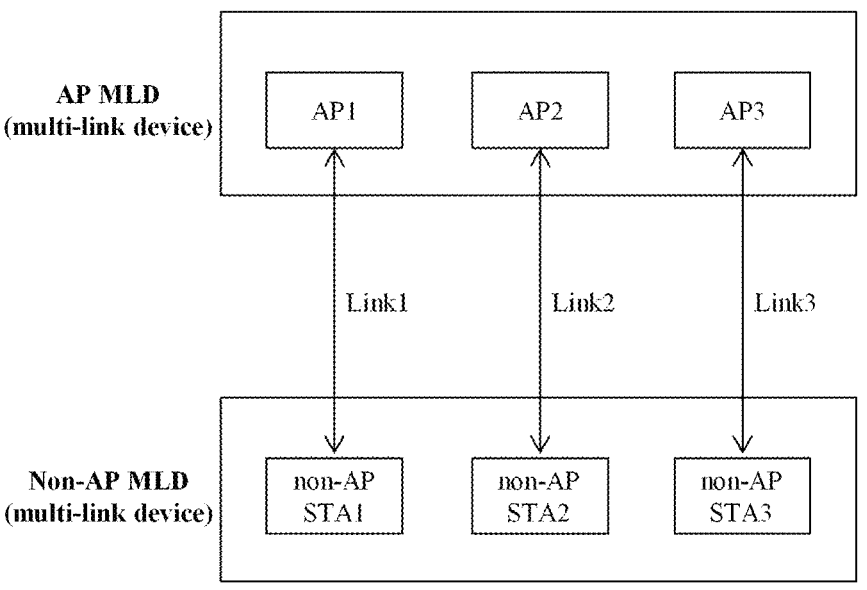
FIG. 9 illustrates a multi-link device according to an embodiment of the disclosure.

FIG. 9 illustrates a multi-link device according to an embodiment of the disclosure.

A multi-link device (MLD) may be defined for a wireless communication method using the plurality of links described above. The multi-link device may represent a device having one or more affiliated stations. According to a specific embodiment, the multi-link device may represent a device having two or more affiliated stations. In addition, the multi-link device may exchange multi-link elements. The multi-link element includes information on one or more stations or one or more links. The multi-link element may include a multi-link setup element, which will be described later. In this case, the multi-link device may be a logical entity. Specifically, the multi-link device may have a plurality of affiliated stations. The multi-link device may be referred to as a multi-link logical entity (MLLE) or a multi-link entity (MLE). The multi-link device may have one medium access control (MAC) service access point (SAP) up to logical link control (LLC). The MLD may also have one MAC data service.

A plurality of stations included in the multi-link device may operate on a plurality of links. In addition, a plurality of stations included in the multi-link device may operate on a plurality of channels. Specifically, the plurality of stations included in the multi-link device may operate on a plurality of different links or on a plurality of different channels. For example, a plurality of stations included in the multi-link device may operate on a plurality of different channels of 2.4 GHz, 5 GHz, and 6 GHz.

The operation of the multi-link device may be referred to as a multi-link operation, an MLD operation, or a multi-band operation. In addition, when the station affiliated with the multi-link device is an AP, the multi-link device may be referred to as the AP MLD. In addition, when the station affiliated with the multi-link device is a non-AP station, the multi-link device may be referred to as a non-AP MLD.

FIG. 9 illustrates an operation in which a non-AP MLD and an AP-MLD communicate. Specifically, the non-AP MLD and the AP-MLD communicate by using three links, respectively. The AP MLD includes a first AP AP1, a second AP AP2, and a third AP AP3. The non-AP MLD includes a first non-AP STA (non-AP STA1), a second non-AP STA (non-AP STA2), and a third non-AP STA (non-AP STA3). The first AP AP1 and the first non-AP STA (non-AP STA1) communicate through a first link Link1. In addition, the second AP AP2 and the second non-AP STA (non-AP STA2) communicate through a second link Link2. In addition, the third AP AP3 and the third non-AP STA (non-AP STA3) communicate through a third link Link3.

The multi-link operation may include a multi-link setup operation. The multi-link setup may correspond to an association operation of the single link operation described above and may be preceded first for frame exchange in the multi-link. The multi-link device may obtain information necessary for the multi-link setup from a multi-link setup element. Specifically, the multi-link setup element may include capability information associated with the multi-link. In this case, the capability information may include information indicating whether any one of the plurality of devices included in the multi-link device performs the transmission and simultaneously, another device may perform the reception. In addition, the capability information may include information on the links available to each station included in the MLD. In addition, the capability information may include information on the channels available to each station included in the MLD.

The multi-link setup may be set up through negotiation between peer stations. Specifically, the multi-link setup may be performed through communication between stations without communication with the AP. In addition, the multi-link setup may be set up through any one link. For example, even if the first link to the third link are set through the multi-link, the multi-link setup may be performed through the first link.

In addition, a mapping between a traffic identifier (TID) and a link may be set up. Specifically, frames corresponding to a TID of a particular value may only be interchanged through a pre-specified link. The mapping between the TID and the link may be set up with directional-based. For example, when a plurality of links is set up between the first multi-link device and the second multi-link device, the first multi-link device may be set to transmit a frame of the first TID to the plurality of first links, and the second multi-link device may be set to transmit a frame of the second TID to the first link. In addition, there may be a default setting for the mapping between the TID and the link. Specifically, in the absence of additional setup in the multi-link setup, the multi-link device may exchange frames corresponding to the TID at each link according to the default setting. In this case, the default setting may be that all the TIDs are exchanged in any one link.

A TID will be described in detail. The TID is an ID for classifying traffic and data in order to support quality of service (QoS). In addition, the TID may be used or allocated in a higher layer than a MAC layer. In addition, the TID may indicate a traffic category (TC) or a traffic stream (TS). In addition, the TID may be classified as 16 types. For example, the TID may be designated as one of the values in the range of 0 to 15. A TID value to be used may be differently designated according to an access policy and a channel access or medium access method. For example, in the case that enhanced distributed channel access (EDCA) or hybrid coordination function contention based channel access (HCAF) is used, the TID may be assigned with a value in the range of 0 to 7. In the case that the EDCA is used, the TID may indicate a user priority (UP). In this instance, the UP may be designated based on a TC or a TS. The UP may be allocated in a higher layer than MAC. In addition, in the case that HCF controlled channel access (HCCA) or SPCA is used, the TID may be assigned with a value in the range of 8 to 15. In the case that the HCCA or SPCA is used, the TID may indicate a TSID. In addition, in the case that the HEMM or the SEMM is used, the TID may be assigned with a value in the range of 8 to 15. In the case that the HEMM or SEMM is used, the TID may indicate a TSID.

A UP and an AC may be mapped. The AC may be a label for providing a QoS in EDCA. The AC may be a label for indicating an EDCA parameter set. An EDCA parameter or an EDCA parameter set may be a parameter used for EDCA channel contention. A QoS station may guarantee a QoS using the AC. In addition, the AC may include AC_BK, AC_BE, AC_VI, and AC_VO. The AC_BK, AC_BE, AC_VI, and AC_VO may indicate a background, a best effort, a video, and a voice, respectively. In addition, each of the AC_BK, AC_BE, AC_VI, and AC_VO may be classified into subordinate ACs. For example, the AC_VI may be subdivided into AC_VI primary and AC_VI alternate. In addition, the AC_VO may be subdivided into AC_VO primary and AC_VO alternate. In addition, a UP or a TID may be mapped to an AC. For example, a UP or TID having a value of 1, 2, 0, 3, 4, 5, 6, and 7 may be mapped to AC_BK, AC_BK, AC_BE, AC_BE, AC_VI, AC_VI, AC_VO, and AC_VO, respectively. In addition, a UP or TID having a value of 1, 2, 0, 3, 4, 5, 6, and 7 may be mapped to AC_BK, AC_BK, AC_BE, AC_BE, AC_VI alternate, AC_VI primary, AC_VO primary, and AC_VO alternate, respectively. In addition, a UP or TID having a value of 1, 2, 0, 3, 4, 5, 6, and 7 may sequentially have a high priority. That is, 1 denotes a low priority and 7 denotes a high priority. Therefore, AC_BK, AC_BE, AC_VI, and AC_VO may have high priorities, sequentially. In addition, AC_BK, AC_BE, AC_VI, and AC_VO may correspond to an AC index (ACI) 0, 1, 2, and 3, respectively. Due to such features of a TID, a mapping between a TID and a link may indicate a mapping between an AC and a link. In addition, a mapping between a link and an AC may indicate a mapping between a TID and a link.

As described above, a TID may be mapped to each of a plurality of links. Mapping may be designating a link in which traffic corresponding to a predetermined TID or AC is capable of being exchanged. In addition, a TID or AC that is transmittable for each transmission direction in a link may be designated. As described above, there may be a default configuration for a mapping between a TID and a link. Specifically, in the case that an additional configuration does not exist for a multi-link configuration, a multi-link device may exchange a frame corresponding to a TID in each link according to the default configuration. In this instance, the default configuration may be exchanging all TIDs in any one link. Any TID or AC at any point in time may be always mapped to at least any one link. A management frame and a control frame may be transmitted in all links.

In the case that a link is mapped to a TID or an AC, only a data frame corresponding to the TID or AC mapped to the corresponding link may be transmitted in the corresponding link. Therefore, in the case that a link is mapped to a TID or an AC, a frame that does not correspond to the TID or AC mapped to the corresponding link may not be transmitted in the corresponding link. In the case that a link is mapped to a TID or an AC, an ACK may also be transmitted based on the link to which the TID or the AC is mapped. For example, a block ACK agreement may be determined based on a mapping between a TID and a link. According to another embodiment, a mapping between a TID and a link may be determined based on a block ACK agreement. Particularly, a block ACK agreement may be set for a TID mapped to a predetermined link.

A QoS may be guaranteed via the above-described mapping between a TID and a link. Specifically, an AC or TID having a high priority may be mapped to a link in which a relatively small number of stations operate or a link having a good channel condition. In addition, via the above-described mapping between a TID and a link, a station may be enabled to maintain a power-saving state during a long period of time.

Figure 10:
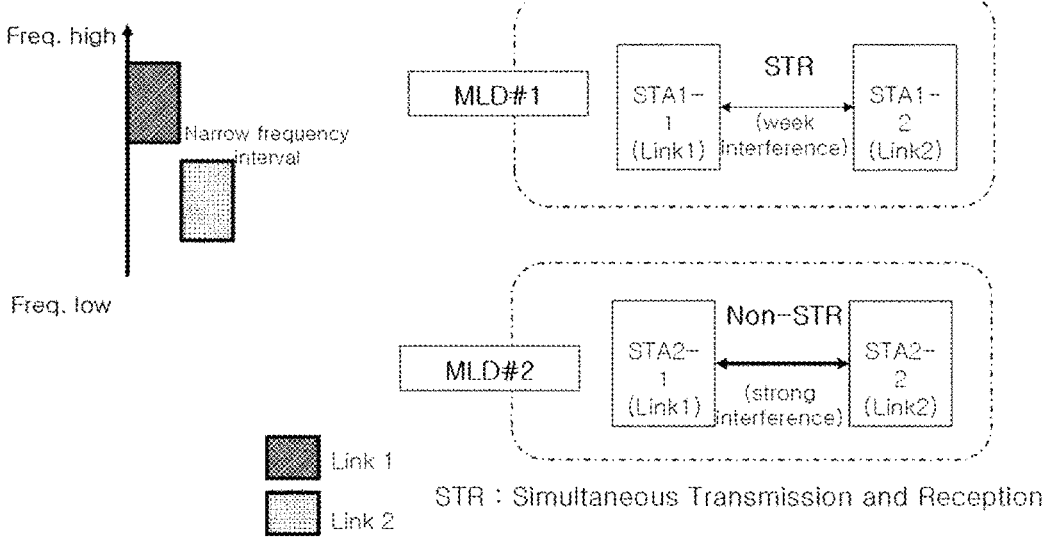
FIG. 10 illustrates simultaneous transmissions in different links in a multi-link operation according to an embodiment of the disclosure.

FIG. 10 illustrates the simultaneous performance of transmission of different links in a multi-link operation according to an embodiment of the disclosure.

According to implementation of a multi-link device, the simultaneous operation may not be supported in the multi-link. For example, simultaneous transmission in a plurality of links, simultaneous reception in a plurality of links, or transmission in one link and reception of another link by the multi-link device may be not supported. This is because reception or transmission performed in one link may influence reception or transmission performed in another link. Specifically, transmission in one link may act as interference to another link. Interference applied from one link to another link by one multi-link device may be referred to as internal leakage. As a frequency interval between links is smaller, internal leakage may become larger. When internal leakage is not very large, transmission may be performed in another link while transmission is performed in one link. When internal leakage is large, transmission cannot be performed in another link while transmission is performed in one link.

As described above, simultaneously performing the operations in a plurality of links by the multi-link device may be referred to as simultaneous transmit and receive or simultaneous transmission and reception (STR). For example, simultaneous transmission in a plurality of links, transmission in one link and reception in another link at the same time, or simultaneous reception in a plurality of links by the multi-link device may be referred to as STR.

As mentioned above, the multi-link device may support STR or support the same only restrictively. Specifically, the multi-link device may support STR in a specific condition. For example, when the multi-link device operates as a single radio device, the multi-link device may not perform STR. Further, when the multi-link device operates as a single antenna, STR of the multi-link device may not be performed. When internal leakage having the size larger than or equal to a predetermined size is detected, the multi-link device may not perform STR.

A station may exchange information on an STR capability of the station with another station. Specifically, the station may exchange information on whether a capability of simultaneously performing transmission in a plurality of links or simultaneously performing reception in a plurality of links by the station is restricted with another station. Specifically, the information on whether the capability of performing transmission or reception in a plurality of links is restricted may indicate whether simultaneous transmission, simultaneous reception, or simultaneous transmission and reception can be performed in a plurality of links. The information on whether the capability of performing transmission or reception in a plurality of links is restricted may be information indicated for each step. Specifically, the information on whether the capability of performing transmission or reception in a plurality of links is restricted may be information indicating a step of representing the size of internal leakage. In a detailed embodiment, the information indicating the step of representing the size of internal leakage may be information indicating a step of representing the size of interference generated due to internal leakage. In another detailed embodiment, the information may be information indicating a step of representing a frequency interval between links that may influence internal leakage. The information indicating the step of representing the size of internal leakage may be information indicating the relation between the frequency interval between links and the size of internal leakage.

In FIG. 10, a first station (STA1) and a second station (STA2) is affiliated with one non-AP multi-link device. A first AP (AP1) and a second AP (AP2) may be affiliated with one non-AP multi-link device. A first link (link 1) is configured between the first AP (AP1) and the first station (STA1), and a second link (link 2) is configured between the second AP (AP2) and the second station (STA2). In FIG. 10, the non-AP multi-link device may restrictively perform STR. When the second station (STA2) performs transmission in the second link (link2), reception of the first station (STA1) in the first link (link1) may be disturbed by transmission performed in the second link (link2). For example, in the following case, reception of the first station (STA1) in the first link (link1) may be interrupted by transmission performed in the second link (link2). The second station (STA2) transmits first data (data 1) in the second link (link 2), and the first AP (AP1) transmits a response (ack for data1) to the first data (data1) to the first station (STA1). The second station (STA2) transmits second data (data2) in the second link (link2). At this time, a transmission time point of the second data (data2) may overlap a transmission time point of the response (ack for data1) to the first data (data1). The first link (link1) may be interfered by transmission to the second station (STA2) in the second link (link 2). Accordingly, the first station (STA1) may not receive the response (ack for data1) to the first data (data1).

An operation in which the multi-link device performs channel access is described. The operation of the multi-link without detailed description may follow the channel access described with reference to FIG. 6.

The multi-link device may independently perform channel access in a plurality of links. At this time, the channel access may be backoff-based channel access. When the multi-link device independently performs the channel access in a plurality of links and a backoff counter reaches 0 in the plurality of links, the multi-link device may simultaneously perform transmission in the plurality of links. In a detailed embodiment, when one of the backoff counters of the multi-link reach 0 and a predetermined condition is satisfied, the multi-link device may perform channel access not only in the link in which the backoff counter reaches 0 but also in another link in which the backoff counter does not reach 0. Specifically, when one of the backoff counters of the multi-link reaches 0, the multi-link device may detect energy in another link in which the backoff counter does not reach 0. At this time, when energy having a predetermined size or larger is not detected, the multi-link device may perform channel access not only in the link in which the backoff counter reaches 0 but also in the link in which energy is detected. Accordingly, the multi-link device may simultaneously perform transmission in the plurality of links. The size of a threshold value used for energy detection may be smaller than the size of a threshold value used for determining whether to reduce the backoff counter. Further, when it is determined whether to reduce the backoff counter, the multi-link device may detect any type of signal as well as a WLAN signal. In the energy detection, the multi-link device may detect any type of signal as well as the WLAN signal. Internal leakage may not be detected by the WLAN signal. In this case, the multi-link device may sense a signal detected due to internal leakage by energy detection. Further, as described above, the size of a threshold value used for energy detection may be smaller than the size of a threshold value used for determining whether to reduce the backoff counter. Accordingly, the multi-link device may reduce the backoff counter in another link even while transmission is performed in one link.

According to a degree of interference between links used by the multi-link device, the multi-link device may determine whether the station operating in each link may independently operate. At this time, the degree of interference between links may be the size of interference detected by, when one station performs transmission in one link, another station of the multi-link device. When transmission by the first station of the multi-link device in the first link gives interference having a predetermined size or larger to the second station of the multi-link device operating in the second link, the operation of the second station may be restricted. Specifically, reception or channel access of the second station may be restricted. This is because, when interference is generated, the second station may fail in decoding of the received signal due to interference. Further, this is because, when interference is generated, the second station may determine that the channel is being used when the second station performs channel access using the backoff.

When transmission by the first station of the multi-link device in the first link gives interference having a size smaller than a predetermined size to the second station of the multi-link device operating in the second link, the first station and the second station may independently operate. Specifically, when transmission by the first station of the multi-link device in the first link gives interference having a size smaller than a predetermined size to the second station of the multi-link device operating in the second link, the first station and the second station may independently perform channel access. Further, when transmission by the first station of the multi-link device gives interference having a size smaller than a predetermined size to the second station of the multi-link device operating in the second link, the first station and the second station may independently perform transmission or reception. This is because, when interference having the size smaller than the predetermined size is generated, the second station may succeed in decoding the received signal even when the interference exists. Further, this is because, when interference having the size smaller than the predetermined size is generated, the second station may determine that the channel is idle when the second station performs channel access using the backoff.

The degree of interference generated between stations of the multi-link device may vary depending on a hardware characteristic of the multi-link device as well as the interval between frequency bands of the links in which the stations operate. For example, internal interference generated in the multi-link device including an expensive radio frequency (RF) device may be smaller than internal interference generated in the multi-link device including a cheap RF device. Accordingly, the degree of interference generated between the stations of the multi-link device may be determined based on a characteristic of the multi-link device.

FIG. 10 illustrates that the size of generated interference varies depending on the interval between frequency bands of the links and the characteristic of the multi-link device. In the embodiment of FIG. 10, a first multi-link device (MLD #1) includes a first station (STA1-1) operating in a first link (link1) and a second station (STA1-2) operating in a second link (link2). A second multi-link device (MLD #2) includes a first station (STA2-1) operating in a first link (link1) and a second station (STA2-2) operating in a second link (link2). A frequency interval between the first link (link1) and the second link (link2) in which the first multi-link device (MLD #1) operates is the same as a frequency interval between the first link (link1) and the second link (link2) in which the second multi-link device (MLD #2) operates. However, the size of generated interference may be different due to difference between a characteristic of the first multi-link device (MLD #1) and a characteristic of the second multi-link device (MLD #2). Specifically, the size of interference generated in the first multi-link device (MLD #1) may be larger than the size of interference generated in the second multi-link device (MLD #2). As described above, the size of generated interference may vary depending on the characteristic of the multi-link device, and it may be required to exchange information on whether STR is supported when it is considered that whether STR is supported is different according to each multi-link device.

The multi-link device may signal information on whether STR is supported by the station included in the multi-link device. Specifically, an AP multi-link device and a non-AP multi-link device may exchange information on whether STR is supported by the AP included in the AP multi-link device and whether STR is supported by the STA included in the non-AP multi-link device. In such embodiments, an element indicating whether STR is supported may be used. The element indicating whether STR is supported may be referred to as an STR support element. The STR support element may indicate whether STR is supported by the station of the multi-link device transmitting the STR support element through 1 bit. Specifically, the STR support element may indicate whether STR is supported by each station included in the multi-link device transmitting the STR support element by 1 bit. At this time, a value of the bit may be 1 when the station supports STR, and the value of the bit may be 0 when the station does not support STR. When the multi-link device transmitting the STR support element includes a first station (STA1), a second station (STA2), and a third station (STA3), the first station (STA1) and the third station (STA3) support STR, and the second station (STA2) does not support STR, the STR support element may include a field having 1011b. It is assumed that stations operating in different frequency bands support STR, and the STR support element may omit signaling indicating whether STR is supported between the stations operating in different frequency bands. For example, the first station (STA1) operates in a first link of 2.4 GHz, and the second station (STA2) and the third station (STA3) operate in a second link and a third link of 5 GHz, respectively. The STR support element may indicate that STR is supported between the second station (STA2) and the third station (STA3) by using 1 bit. Further, the STR support element may include only 1 bit when the number of stations signaled by the STR support element is 2.

In a detailed embodiment, the relation between the link located in 2.4 GHz and the link located in 5 GHz or 6 GHz among the links of the multi-link device may be always determined to STR. Accordingly, signaling for STR of the link located in 2.4 GHz and the link located in 5 GHz or 6 GHz may be omitted.

In the above-described embodiments, the operation described as an operation of a station of a multi-link device may be substituted with an operation of a multi-link device. In addition, in the above-described embodiments, the operation of an AP may be substituted with an operation of a non-AP station, and the operation of a non-AP station may be substituted with an operation of an AP. Accordingly, the operation of an AP of a non-STR multi-link device may be substituted with an operation of a non-AP station of a non-STR multi-link device, and the operation of a non-AP station of an STR multi-link device may be substituted with an operation of an AP of an STR multi-link device. In addition, the operation of a non-AP station of a non-STR multi-link device may be substituted with an operation of an AP of a non-STR multi-link device, and the operation of an AP of an STR multi-link device may be substituted with an operation of a non-AP station of an STR multi-link device.

Figure 11:
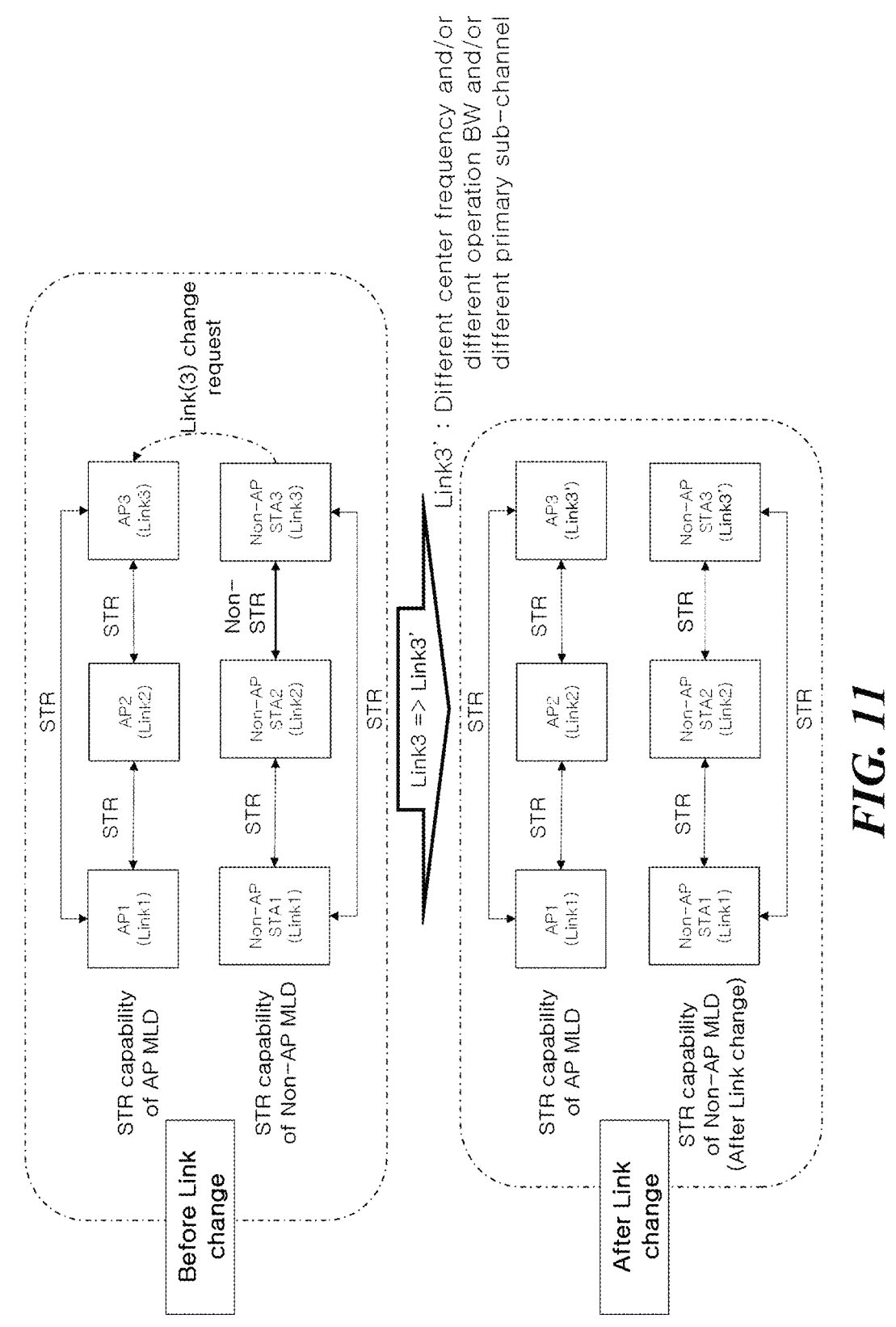
FIG. 11 illustrates an operation of a multi-link device when a link is changed according to an embodiment of the disclosure.

FIG. 11 illustrates an operation of the multi-link device when a link is changed according to an embodiment of the disclosure.

When a frequency band of a link is changed, the STR support element may be changed. As described above, this is because whether STR is supported by the station may vary depending on the distance between frequency bands of the links, and when the frequency band of the link is changed, whether STR is supported by the station may be changed. The change in the frequency band of the link may include at least one of a change in the central frequency, a change in a bandwidth of the frequency band, and a main channel of 200 MHz. The AP and the station may exchange the STR support element through a request and a response. In another detailed embodiment, when the frequency band of the link is changed, the STR support element may be exchanged without any separate request. Further, in the above-described embodiments, the change in the frequency band of the link may include a change in an operating channel of the station.

When the station of the non-AP multi-link device cannot perform STR, the station of the non-AP multi-link device may make a request for changing the link to the AP. Specifically, the station of the non-AP multi-link device may make a request for changing at least one of the central frequency, the bandwidth of the frequency band, and the main channel of 20 MHz. The link change request may be transmitted to the AP through the link requested to be changed. In another detailed embodiment, the link change request may be transmitted to the AP through a link which is not requested to be changed. At this time, the link change request may include information indicating the link requested to be changed. The information indicating the link may be a number for identifying the link. In such embodiments, the change in the link may be a change in an operating channel within one frequency band. Further, the change in the link may include information on a method of changing the link. Specifically, the link change request may indicate whether to move the central frequency of the link to a frequency higher than the current central frequency or move the central frequency of the link to a frequency lower than the current central frequency. In another detailed embodiment, the link change request may implicitly indicate a change to a frequency band farther from an adjacent link. Further, the link change request may indicate a decrease in the bandwidth. The link change request may be a request for changing the location of the main channel. Specifically, the link change request may indicate a change in the location of the main channel to a channel of a frequency band lower than the location of the main channel or a channel of a frequency band higher than the location of the main channel. The AP receiving the link change request may change the link according to the link change request. Further, in a detailed embodiment, the AP receiving the link change request may ignore the link change request.

In the embodiment of FIG. 11, the second station (STA2) and the third station (STA3) of the non-AP multi-link device cannot support STR. The non-AP multi-link device makes a request for changing a third link (link3) to the AP multi-link device. The AP multi-link device receiving the link change request changes the operating link of the third AP (AP3). At this time, the third station (STA3) operating in the third link (link3) to be changed may transmit a change request to the third AP (AP3). In another detailed embodiment, the station which does not operate in the third link (link3) may transmit a change request to the AP which does not operate in the third link (link3).

When the AP changes the link, the AP may broadcast information on the link change through a beacon frame. At this time, the information on the link change may include information on the frequency of the link. The information on the frequency of the link may include at least one of changes in the operating bandwidth and the main channel. Further, the information on the link change may include information on a link change time point. In addition, the link change may be completed when a beacon including the information on the link change is transmitted.

In FIG. 11, the link in which the third station (STA3) operates is changed and thus the third station (STA3) and the second station (STA2) may support STR. As described above, the non-AP multi-link device may transmit the STR support element to the AP multi-link device and signal information indicating a change in supporting of STR.

The link change may not be allowed, or STR may not be supported through the link change. As illustrated in the embodiment of FIG. 11, the AP multi-link device may support STR but the non-AP multi-link device may not support STR. This is because it is common to use a relatively expensive device for the AP multi-link device and use a relatively cheap device for the non-AP multi-link device. Accordingly, in communication between multi-link devices, a method of, even when one multi-link device does not support STR, performing efficient communication is needed. At this time, STR may indicate the simultaneously performance of transmission and reception. This will be described with reference to FIG. 12.

Figure 12:
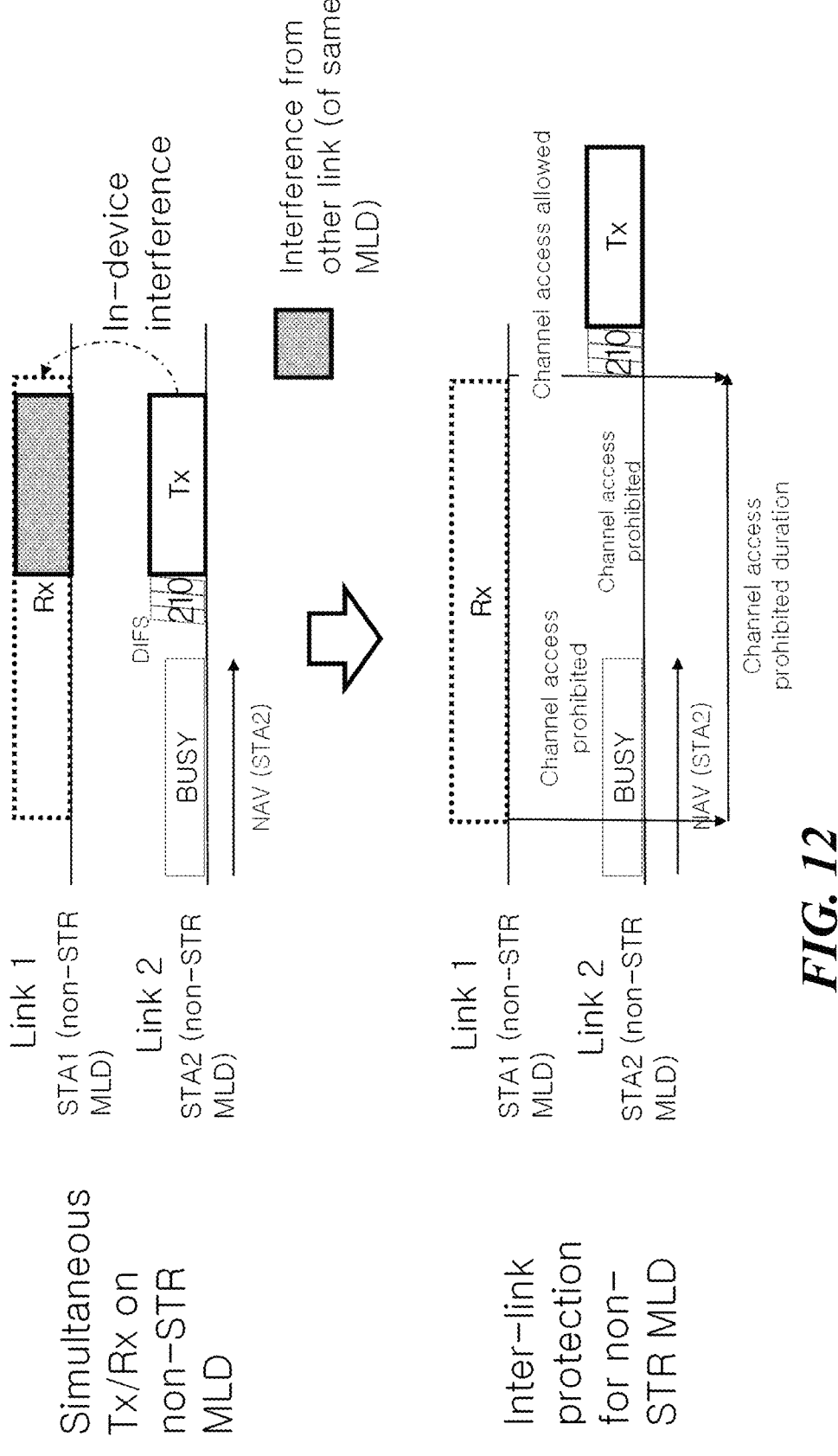
FIG. 12 illustrates prohibition of channel access of another station of a non-STR multi-link device when one station of the non-STR multi-link device performs reception according to an embodiment of the disclosure.

FIG. 12 illustrates that, when reception of one station of the non-STR multi-link device is performed, channel access of another station of the non-STR multi-link device is restricted according to an embodiment of the disclosure.

When transmission by the non-STR multi-link device is performed in one link and reception by the non-STR multi-link device is performed in another link, the reception and the transmission of the non-STR multi-link device may fail. In order to solve the problem, when reception by the non-STR multi-link device is performed in one link, channel access by the non-STR multi-link device in another link may be restricted. Specifically, when reception by the non-STR multi-link device is performed in one link, the backoff of channel access by the non-STR multi-link device in another link may be restricted. Accordingly, when reception by the non-STR multi-link device is performed in one link, the start of transmission by the non-STR multi-link device in another link may be prevented. In a detailed embodiment, when reception by the non-STR multi-link device starts in one link, the backoff of channel access by the non-STR multi-link device in another link may be restricted. It may be configured through a specific bit of the memory such as a channel access restriction flag. Whether to restrict channel access may be shared through the memory within the multi-link device. Through such an embodiment, channel access restriction may be implemented without separate frame exchange. For convenience of description, channel access restriction used in the specification indicates restriction of channel access or transmission in order to protect transmission or reception by the non-STR multi-link device unless there is a separate description.

When channel access is restricted, the station operating in the link in which the channel access is restricted cannot perform a backoff procedure regardless of the NAV and CCA result. Further, when the channel access is restricted, the station operating in the link in which the channel access is restricted cannot perform transmission regardless of the NAV and CCA result. However, even though the channel access is restricted, the station operating in the link in which the channel access is restricted can perform reception. Further, channel access restriction in the second link due to reception performed in the first link may be released based on a time point at which the reception in the first link is completed. Specifically, channel access restriction in the second link due to reception performed in the first link may be released when the reception in the first link is completed. In another detailed embodiment, channel access restriction in the second link due to reception performed in the first link may be released based on a time point at which ACK is transmitted after the reception in the first link is completed. Specifically, channel access restriction in the second link due to reception performed in the first link may be released at the time point at which ACK is transmitted after the reception in the first link is completed. In another detailed embodiment, channel access restriction in the second link due to reception performed in the first link may be released at a time point at which ACK transmission is completed after the reception in the first link is completed. Further, after the channel access restriction is released, the station may immediately reduce the backoff counter without additional sensing. At this time, the additional sensing may indicate sensing performed during a DCF interframe space (DIFS). In another detailed embodiment, when the channel is idle for a predetermined time right before the channel access restriction is released, the station may immediately reduce the backoff counter without additional sensing. At this time, the predetermined time may be one of a PCF interframe space (PIFS), a short interframe space (SIFS), and an arbitration interframe space (AIFS).

In the embodiment of FIG. 12, the non-STR multi-link device includes the first station (STA1) operating in the first link (link1) and the second station (STA2) operating in the second link (link2). When the second station (STA2) performs transmission in the second link (link2) while the first station (STA1) performs reception, intra-device interference is generated. As described above, channel access by the second station (STA2) performed in the second link (link2) is restricted while the first station (STA1) operating in the first link (link1) performs reception. After reception by the first station (STA1) in the first link (link1) is completed, channel access restriction is released. Right after the channel access restriction is released, the second station (STA2) may reduce a value of the previous backoff counter by 1 from 3 to 2 without additional sensing.

For convenience of expression, a single block (Tx solid line, Rx dotted line) is used to express Rx and Tx in the drawing used by FIG. 12, and it may be understood that the single block expresses an operation including Tx/Ack reception and Rx/Ack transmission even though a separate Ack block is not illustrated. This may be equally applied to the following drawings.

When the station identifies that a received PPDU is not a receiver intended by the station, the station may stop reception of the PPDU. In this case, the operation of releasing channel access prohibition by the multi-link device is a problem. The intended receiver in the specification is used to have the same meaning as a destination station.

Figure 13:
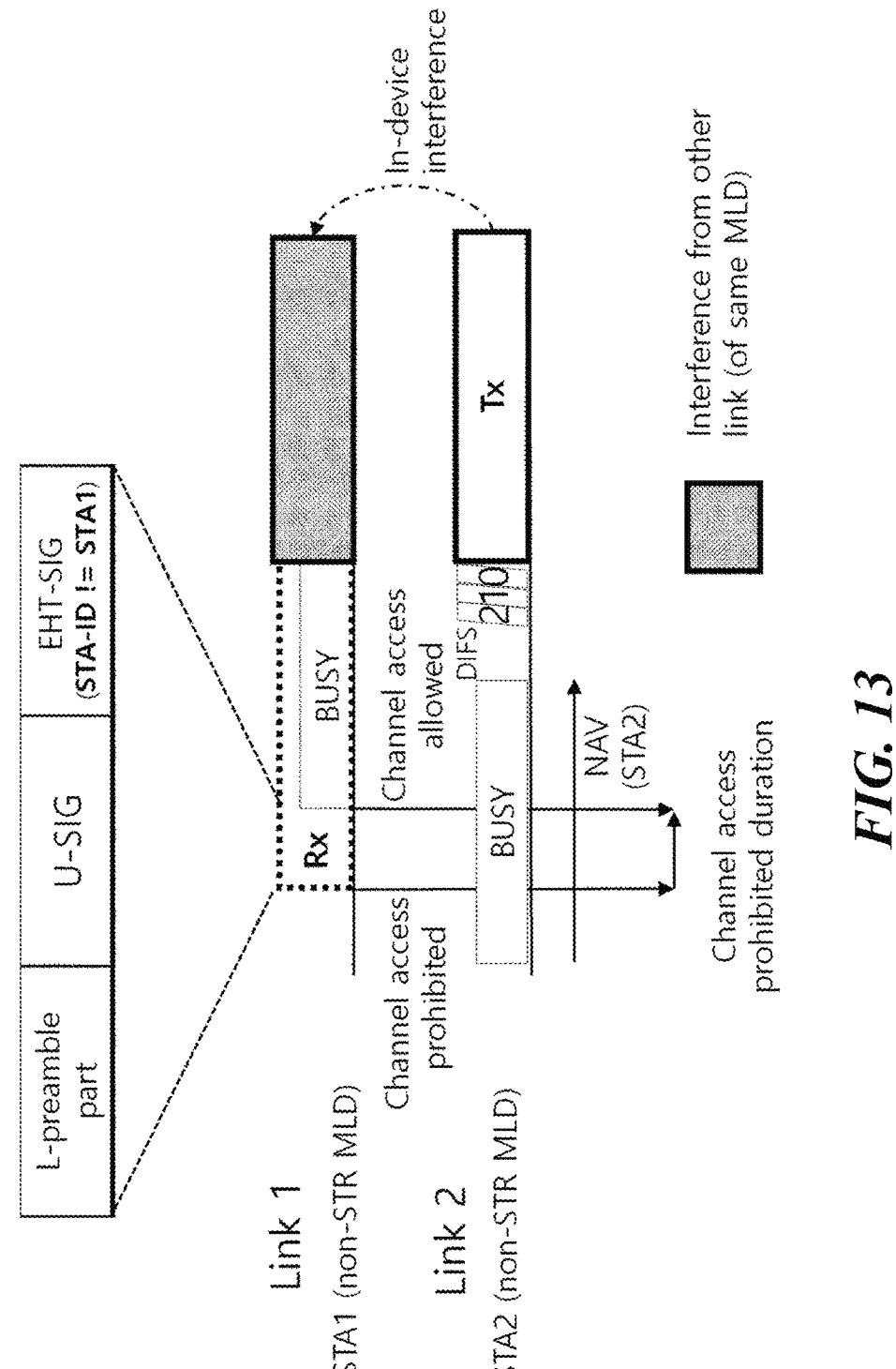
FIG. 13 illustrates an operation of releasing channel access prohibition when it is identified that an intended receiver of a PPDU received by the station of the non-STR multi-link device is not the station.

FIG. 13 illustrates the operation of releasing the channel access prohibition when it is identified that an intended receiver of a PPDU received by the station of the non-STR multi-link device is not the station according to an embodiment of the disclosure.

When the station identifies that the received PPDU is not the receiver intended by the station, the station may release channel access prohibition. The station may determine whether the station is the intended receiver of the PPDU based on information indicating a receiver address of a signaling field of the PPDU. At this time, the information indicating the receiver address of the signaling field of the PPDU may be a value of the STA-ID field of the EHT-SIG field. Specifically, the station may determine whether the STA-ID field of the EHT-SIG field indicates the station. Further, the station may determine whether the station is the intended receiver of the PPDU based on a value of an RA field of a MAC frame included in the PPDU. Specifically, the station may determine whether the RA field of the MAC frame included in the PPDU indicates the station. In FIG. 13, the non-STR multi-link device includes the first station (STA1) operating in the first link (link1) and the second station (STA2) operating in the second link (link2). The first station (STA1) receives the PPDU. The first station (STA1)

determines that the intended receiver of the received PPDU is not the first station (STA1) and stops receiving the PPDU. At this time, the first station (STA1) may release channel access prohibition of the second station (STA2). Even though the channel access prohibition of the second station (STA2) is released, channel access of the second station (STA2) may be delayed according to NAV configured in the second station (STA2).

As illustrated in FIG. 13, even though the channel access prohibition is released, the station included in the non-STR multi-link device may not have the channel access opportunities more frequently than the station which is not included in the multi-link device or the station included in the STR multi-link device.

Accordingly, for fair competition with other stations, a method of guaranteeing the channel access opportunities of the station included in the non-STR multi-link device may be needed. For example, after releasing the channel access prohibition, the station of which channel access is prohibited may be allowed to reduce the backoff counter by 2 or more. This will be described with reference to FIG. 14.

FIG. 14 illustrates the performance of channel access by the station after channel access prohibition is released according to an embodiment of the disclosure.

The station of which channel access prohibition is released may reduce the backoff counter by 2 or more after the channel access prohibition is released. This is to have balance of channel access opportunities with other stations since other stations perform the backoff procedure while the channel access of the station is prohibited.

In another detailed embodiment, the station of which channel access is prohibited may perform a channel access procedure of reducing CCA (CSMA) and the backoff counter while the channel access is prohibited. In FIG. 14, the non-STR multi-link device includes the first station (STA1) operating in the first link (link1) and the second station (STA2) operating in the second link (link2). In FIG. 14, channel access of the second station (STA2) is prohibited while the first station (STA1) performs reception. In FIG. 14(a), the second station (STA2) may perform a channel access procedure of reducing CCA (CSMA) and the backoff counter while the channel access of the second station (STA2) is prohibited. In FIG. 14(a), since the channel of the second link (link2) is idle while the channel access of the second station (STA2) is prohibited, the second station (STA2) reduces the backoff counter.

Further, the station of which channel access is prohibited may delay transmission without starting transmission even though the backoff counter reaches 0 while the channel access is prohibited. At this time, the station may maintain the value of the backoff counter as 0. Further, although the station delays transmission, the station may maintain the value of CW. Accordingly, it is differentiated from doubling of the value of the CW by the station since the channel accessed by the station is busy. This is because the reason of delayed transmission is not the case in which it is determined that the channel is being used. In FIG. 14(b), the second station (STA2) may perform a channel access procedure of reducing CCA (CSMA) and the backoff counter while the channel access of the second station (STA2) is prohibited. In FIG. 14(b), since the channel of the second link (link2) is idle while the channel access of the second station (STA2) is prohibited, the second station (STA2) reduces the backoff counter. The backoff counter of the second station (STA2) reaches 0 while the channel access of the second station (STA2) is prohibited. The second station (STA2) delays transmission and starts transmission after the channel access prohibition is released.

As described above, the channel access prohibition may include prohibition of transmission of the second station when the first station of the non-STR multi-link device performs transmission. Further, the channel access prohibition may include prohibition of transmission of the second station when the first station of the non-STR multi-link device performs reception.

When the number of stations of which channel access is prohibited is plural in embodiments of FIG. 14(b), the probability of attempt of simultaneous release of channel access prohibition of the plurality of stations and simultaneous transmission of the plurality of stations is high. Accordingly, a method of reducing a transmission collision probability is needed. This will be described with reference to FIG. 15.

Figure 15:
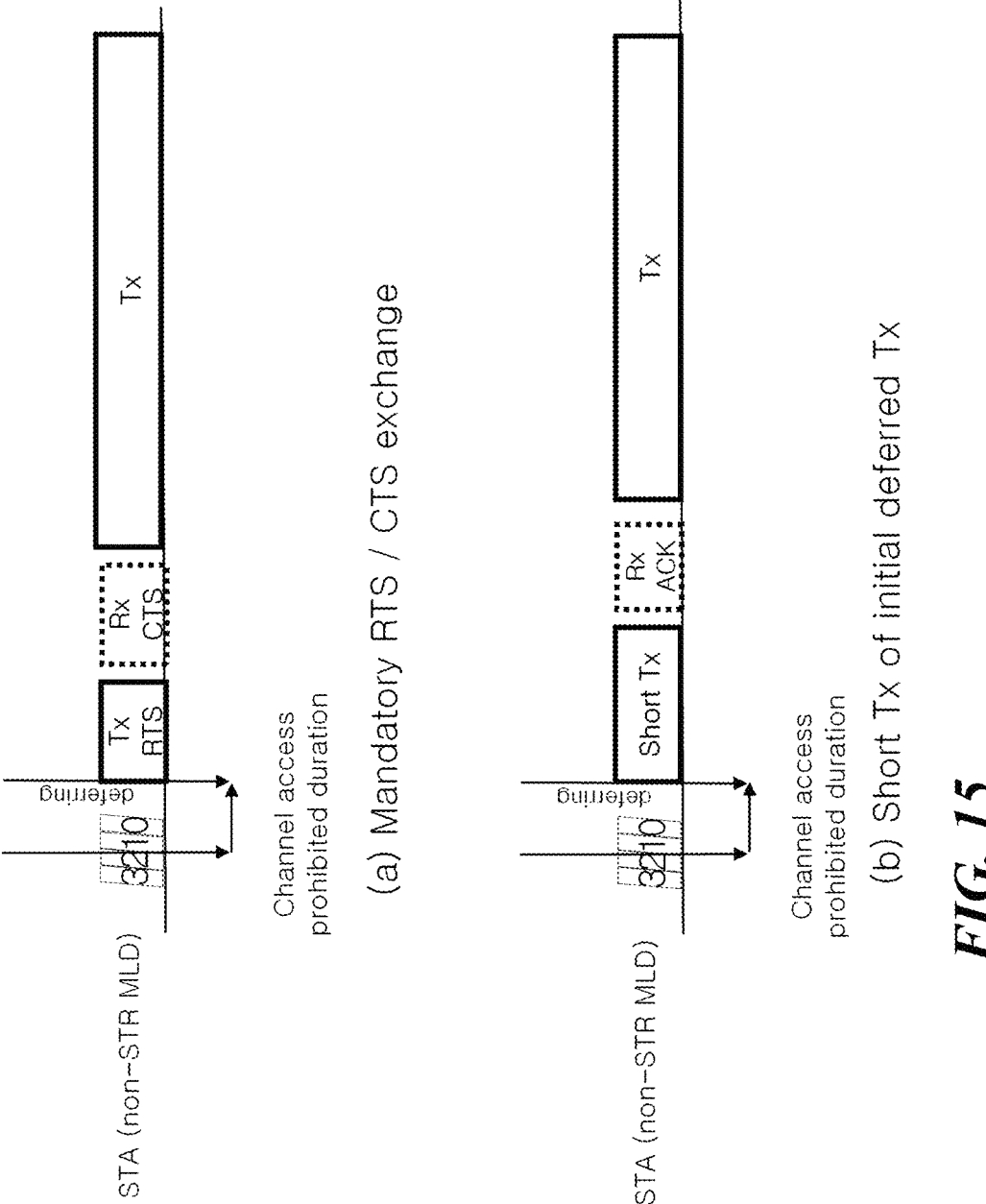
FIG. 15 illustrates an operation in which the station performs transmission after channel access prohibition is released according to an embodiment of the disclosure.

FIG. 15 illustrates an operation in which the station performs transmission after the release of channel access prohibition according to an embodiment of the disclosure.

As described above, transmission is performed in the first link among the plurality of links in which the non-STR multi-link device operates, and thus transmission may be prohibited in the second link. When the corresponding transmission is completed in the first link, transmission in the second link may start by RTS/CTS frame exchange. Accordingly, when transmission is performed in the first link among the plurality of link in which the non-STR multi-link device operates, the non-STR multi-link device may start the RTS/CTS frame exchange in the second link. After the release of channel access prohibition of the station of which transmission is delayed due to channel access prohibition, the station may start request to send (RTS)/clear to send (CTS) frame exchange before starting delayed transmission. At this time, when the station does not receive the CTS frame, the delayed transmission may not start. In the embodiment of FIG. 15(a), the station of which transmission is delayed due to channel access prohibition transmits the RTS frame before starting delayed transmission. The station starts delayed transmission after receiving the CTS frame in response to the RTS frame.

In another detailed embodiment, after channel access prohibition of the station of which transmission is delayed due to channel access prohibition is released, the station may transmit a frame including only some of the delayed transmission. At this time, after receiving a response to the frame including only some of the delayed transmission, for example, ACK, the station may transmit the part of the delayed transmission which has not been transmitted. When the station does not receive the response to the frame including only some of the delayed transmission, the station may not transmit the part of the delayed transmission which has not be transmitted. As described above, the station starts the RTS/CTS exchange or transmits only some of the delayed transmission by the station after the channel access prohibition is released because a collision probability of transmission after the channel access prohibition may be higher than that of general transmission. Accordingly, the above-described embodiment may be mandatorily applied to transmission performed after the release of channel access prohibition. In the conventional WLAN operation, the RTS/CTS frame was used to solve the hidden node problem and could be used based on the size of transmission data. In the above-described embodiments, the RTS/CTS frame is to prevent transmission collision with the station to perform delayed transmission in order to protect transmission or reception of the non-STR multi-link device.

As described above, when one station of the non-STR multi-link device performs reception, transmission of another station of the non-STR multi-link device may be restricted. Further, when one station of the non-STR multi-link device performs transmission, it may be difficult to accurately sense a channel state of a link in which another station of the non-STR multi-link device operates. Specifically, when the first station of the non-STR multi-link device performs transmission, the second station of the non-STR multi-link device may determine that a channel state of a link in which the second station operates is always busy. Accordingly, even though the channel of the link in which the second station operates is idle, the second station may determine that the channel is busy due to intra-device interference. As described above, when the station of which the channel state cannot be determined due to intra-device interference or when one station of the non-STR multi-link device continuously performs transmission, another station of the non-STR multi-link device is in a blind state. Due to the above-described situations, the station in the blind state may have difficulty in attempting transmission through the backoff procedure. Further, due to the above-described situations, the station in the blind state may have difficulty in starting reception of the PPDU or succeeding in decoding. Accordingly, a method of performing transmission in consideration of the station in the blind state is needed. This will be described with reference to FIG. 16.

Figure 16:
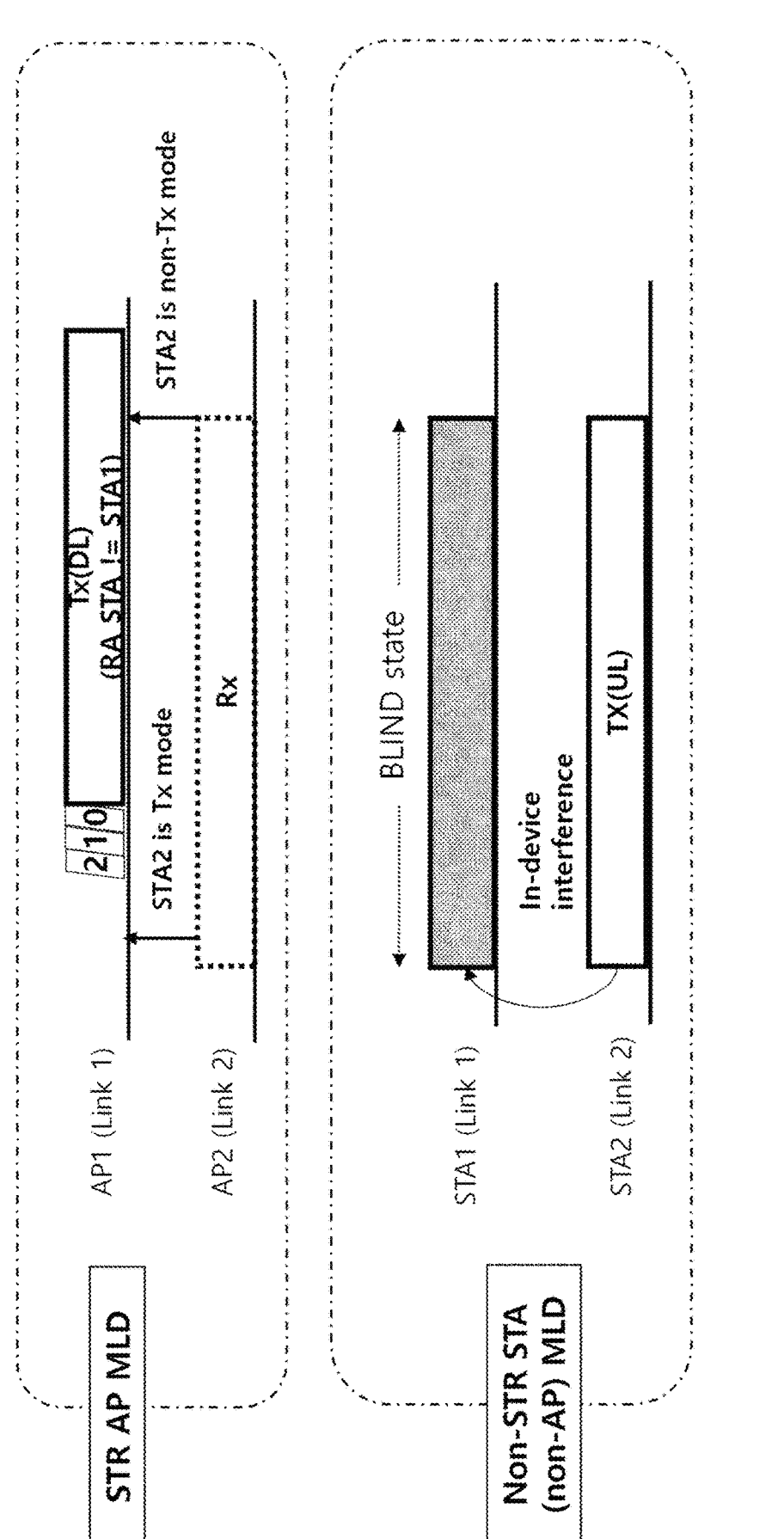
FIG. 16 illustrates transmission performed based on a state of the station within the non-STR multi-link device according to an embodiment of the disclosure.

FIG. 16 illustrates transmission performed based on a state of a station within the non-STR multi-link device according to an embodiment of the disclosure.

The station to perform transmission to the station of the non-STR multi-link device may determine whether to perform transmission according to whether the station of the non-STR multi-link device is in the blind state. At this time, the station to perform transmission to the station of the non-STR multi-link device may be a station included in the STR multi-link device. Further, the station to perform transmission to the station of the non-STR multi-link device may be an AP included in the AP multi-link device, and the non-STR multi-link device may be a non-AP multi-link device The station to perform transmission to the station of the non-STR multi-link device may determine whether the station of the non-STR multi-link device is in the blind state based on the following description. The station to perform transmission may determine whether another station of the multi-link device including the station is performing transmission to the corresponding non-STR multi-link device. When another station of the multi-link device including the station is performing reception from the corresponding non-STR multi-link device, the station may determine that the station of the non-STR multi-link device to receive transmission of the station is in the blind state. In the embodiment of FIG. 16, the STR AP multi-link device includes a first AP (AP1) operating in a first link (link1) and a second AP (AP2) operating in a second link (link2). The non-STR multi-link device includes the first station (STA1) operating in the first link (link1) and the second station (STA2) operating in the second link (link2). The second station (STA2) is performing transmission to the second AP (AP2). Accordingly, the second AP (AP2) may inform the first AP (AP1) that reception is being performed from the second station (STA2). Specifically, the second AP (AP2) may inform the first AP (AP1) that the entity of transmission to the second AP (AP2) is the second station (STA2). In another detailed embodiment, the second AP (AP2) may inform the first AP (AP1) that the second station (STA2) currently performs transmission. At this time, the first AP (AP1) may determine that the first station (STA1) is in the blind state based on the notification.

That station may not perform transmission to the station in the blind state. This is because there is high probability that the station in the blind state cannot start reception or the station in the blind state cannot decode the PPDU even though transmission is performed to the station in the blind state. At this time, the station may cancel transmission to the station in the blind state and may perform transmission to another station.

When the STR multi-link device performs transmission to the non-STR multi-link device, the STR multi-link device may perform transmission to the non-STR multi-link device in a plurality of links. Specifically, when the STR multi-link device performs transmission to the non-STR multi-link device in the first link, the STR multi-link device may start transmission to the non-STR multi-link device in the second link. At this time, the STR multi-link device may determine the length of transmission performed in the second link based on the transmission corresponding to transmission to the non-STR multi-link device. Specifically, the STR multi-link device may determine the length of transmission to the non-STR multi-link device in the second link based on the length of the transmission to the non-STR multi-link device in the first link. In a detailed embodiment, the STR multi-link device may simultaneously end the transmission in the first link and the transmission in the second link. This is to prevent transmission to another station of the non-STR multi-link device while one of the stations of the non-STR multi-link device transmits a response, for example, ACK after transmission to one of the stations of the non-STR multi-link device first ends. Through the above-described embodiment, a plurality of stations of the non-STR multi-link device may simultaneously transmit responses to transmission to the plurality of stations.

The STR multi-link device cannot determine states of the stations included in the non-STR multi-link device in real time. Accordingly, even though the STR multi-link device operates according to the embodiments described with reference to FIG. 16, interference or transmission collision may be generated between links in which the non-STR multi-link device operates. For example, in the embodiment of FIG. 16, the first AP (AP1) may start transmission to the first station (STA1) before recognizing that the second station (STA2) is performing transmission to the second AP (AP2). As described above, a probability of inter-link interference or collision may be higher than a probability of intra-link interference or transmission collision. This will be described in more detail with reference to FIG. 17.

Figure 17:
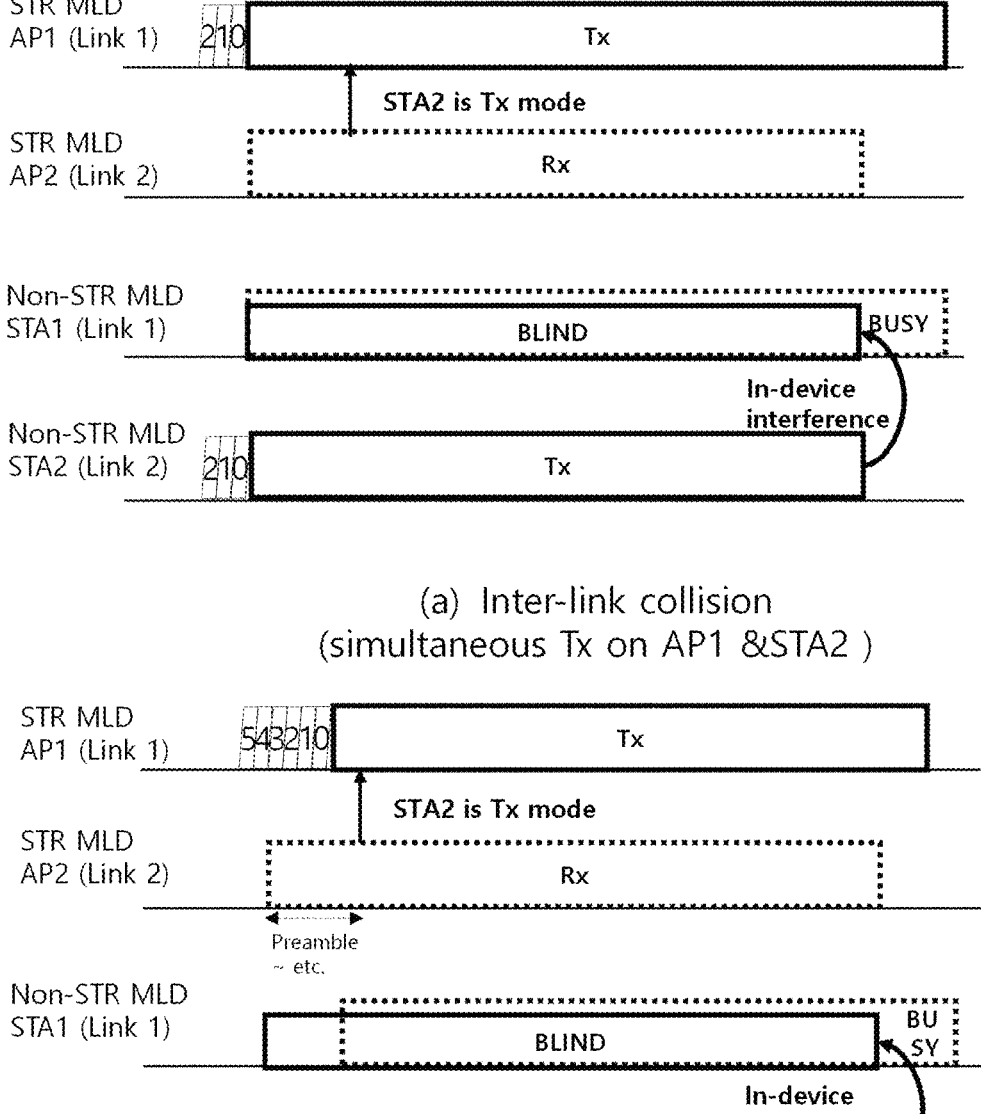
FIG. 17 illustrates a situation in which interference or collision between links may be generated.

FIG. 17 illustrates a situation in which inter-link interference or collision is generated.

When transmission to the second AP of the STR AP multi-link device by the second station of the non-STR station multi-link device and transmission to the first station of the non-STR multi-link device by the first AP of the STR AP multi-link device simultaneously start, transmission collision may be generated between links. FIG. 17(a) illustrates the same. This is because, as described above, the STR multi-link device cannot determine the states of the stations included in the non-STR multi-link device in real time.

Further, even when transmission to the second AP of the STR AP multi-link device by the second station of the non-STR multi-link device starts earlier than transmission to the first station of the non-STR multi-link device by the first AP of the STR-AP multi-link device, transmission collision may be generated between links. FIG. 17(*b*) illustrates the same. This is because it takes time for the second AP (AP2) to inform the first AP (AP1) that the second station (STA2) is performing transmission. As described above, since transmission collision is generated between stations starting transmission at different time points, the probability of inter-link interference or transmission collision may be higher than the probability of intra-link interference or collision. Further, as the time spent for identifying a transmitter of the PPDU received by the AP of the STR multi-link device is delayed, the probability of interference or transmission collision between links may be higher. Accordingly, a method of solving the problem is needed. When one of the stations of the STR multi-link device performs reception, another station of the STR multi-link device may not perform channel access. However, when the channel access is prohibited, the meaning of implementation of the STR function may disappear. Accordingly, an operation method other than the channel access prohibition of the STR multi-link device is required. This will be described with reference to FIG. 18.

As described above, it may be important for a multi-link device to promptly determine a station performing transmission to the multi-link device. A user field of EHT-SIG of an EHT UL PPDU may indicate an identifier (STA-ID) of a station transmitting the EHT UL PPDU. Specifically, when a DL/UL field of a signaling field of an EHT PPDU indicates that the EHT PPDU is a UL PPDU, the user field of EHT-SIG of the EHT PPDU may indicate an identifier of a station transmitting the EHT UL PPDU. A multi-link device receiving the EHT PPDU may identify a station transmitting the EHT PPDU, based on the user field of EHT-SIG of the EHT UL PPDU. Through this, an AP multi-link device may determine the station transmitting the EHT UL PPDU, and the AP multi-link device may determine a transmission destination device. Specifically, the AP multi-link device may determine whether there is high possibility that transmission to be performed fails due to an inter-link conflict. In addition, if there is high possibility that transmission to be performed by the AP multi-link device fails, the AP multi-link device may delay the transmission to be performed, and perform another transmission.

Various services using a wireless LAN are implemented. Specifically, there is an increasing need for low latency service support such as expansion of supply of a wireless virtual reality (VR) device. Accordingly, a wireless LAN operation method for supporting a low latency service is required. For convenience of description, traffic for a low latency service is referred to as low latency traffic. The low latency traffic may be designated by a station. In this case, the station includes an AP. Specifically, traffic corresponding to low latency traffic may be designated in an upper layer than a MAC layer. In addition, specific traffic may be designated as low latency traffic. In addition, the low latency traffic may be traffic having a higher priority than a predetermined priority. In this case, the priority may be determined based on an access category (AC).

In the above-described non-STR multi-link device operation, low latency service support also needs to be considered. This is because transmission of low latency traffic may be delayed due to the characteristics of the non-STR multi-link device operation. For example, while a non-STR multi-link device is performing reception in a first link, transmission in a second link may be restricted to protect transmission of a PPDU transmitted in the first link. Accordingly, transmission of low latency traffic which needs to be transmitted in the second link may be delayed. A method for solving this problem is described through FIG. 18.

Figure 18:
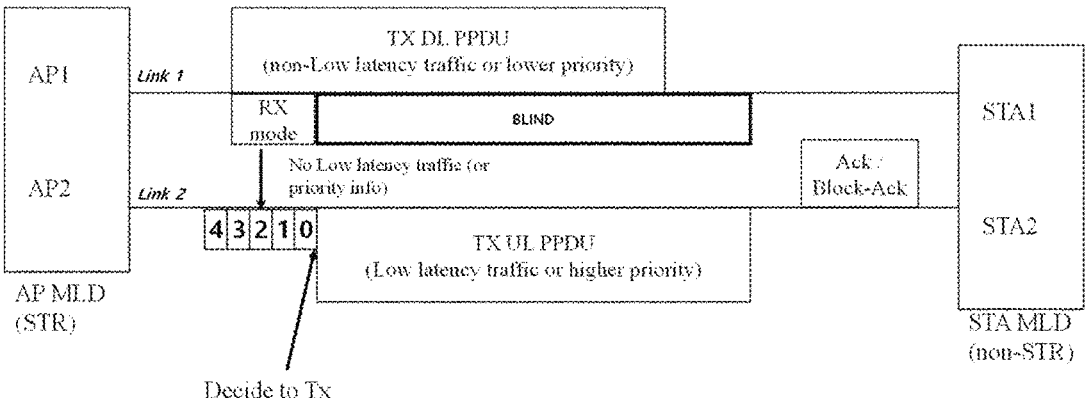
FIG. 18 illustrates that a multi-link device abandons reception of a PPDU that is being received in a first link among a non-STR multi-link pair and attempts transmission of a PPDU in a second link among the non-STR multi-link pair.

FIG. 18 illustrates that a multi-link device abandons reception of a PPDU that is being received in a first link among a non-STR multi-link pair and attempts transmission of a PPDU in a second link among the non-STR multi-link pair.

The multi-link device may perform transmission of low latency traffic in the second link among the non-STR link pair even when performing reception in the first link among the non-STR link pair. The non-STR link pair indicates a link pair in which the non-STR multi-link device performs transmission in any one of two links, and simultaneously cannot perform reception in the other link. In this case, the multi-link device abandons reception in the first link. Specifically, the multi-link device may attempt to perform transmission of a PPDU including low latency traffic in the second link among the non-STR link pair even though reception of a PPDU is being performed in the first link among the non-STR link pair. In this case, the multi-link device may suspend the reception of the PPDU in the first link.

In addition, when the priority of traffic included in the PPDU received in the first link by the multi-link device is higher than the priority of traffic included in the PPDU to be transmitted in the second link, the non-STR multi-link device may attempt to perform transmission of the PPDU including traffic having a higher priority in the second link among the non-STR link pair even though the PPDU is being received in the first link among the non-STR link pair. In this case, the multi-link device may suspend the reception of the PPDU in the first link. In another specific embodiment, the multi-link device may perform the transmission in the second link and ignore a signal received in the first link.

In the above-described embodiments, a condition that the multi-link device can suspend the reception corresponds to a case where the priority of traffic included in the reception that is being performed in the first link is lower than the priority of traffic to be transmitted in the second link. Accordingly, when the priority of traffic included in the reception that is being performed in the first link is higher than the priority of traffic to be transmitted in the second link, the multi-link device cannot suspend the reception in the first link.

However, when low latency traffic is received through a specific link, channel access and transmission (including a response) through another link, which has a non-STR relationship with the specific link, may be restricted.

In the embodiment of FIG. 18, an AP multi-link device includes a first AP (AP 1) and a second AP (AP 2), and a non-AP station multi-link device corresponding to a non-STR multi-link device includes a first station (STA 1) and a second station (STA 2). The first AP (AP 1) and the second station (STA 1) operate in a first link (Link 1). The second AP (AP 2) and the second station (STA 2) operate in a second link (Link 2). In the AP multi-link device, the first AP (AP 1) receives a first PPDU from the second AP (AP 2). In this case, when a first PPDU only includes traffic other than low latency traffic and the low latency traffic needs to be transmitted in the second link (Link 2), the AP multi-link device may abandon the reception of the first PPDU in the first link (Link 1), and attempt to perform transmission of a second PPDU including the low latency traffic in the second link (Link 2). Alternatively, when the priority of traffic included in the first PPDU received in the first link (Link 1) by the AP multi-link device is higher than the priority of traffic included in the second PPDU to be transmitted in the second link (Link 2), the AP multi-link device may suspend the reception of the first PPDU in the first link (Link 1) and attempt to perform the transmission of the second PPDU in the second link (Link 2).

Through such embodiments, the multi-link device may adjust the priority of traffic exchange according to the type or the priority of traffic. In addition, in the above-described embodiments, the priority of traffic may be configured according to a predetermined policy. In addition, as described above, the priority of traffic may be designated in an upper layer than a MAC layer.

Through FIG. 18, an embodiment of preventing latency in low latency traffic transmission in a PPDU reception stage, i.e., in a physical layer level, has been described. Through FIGS. 19 to 22, an embodiment of preventing latency in low latency traffic transmission in a frame exchange stage, i.e., a MAC layer level, is described.

Figure 19:
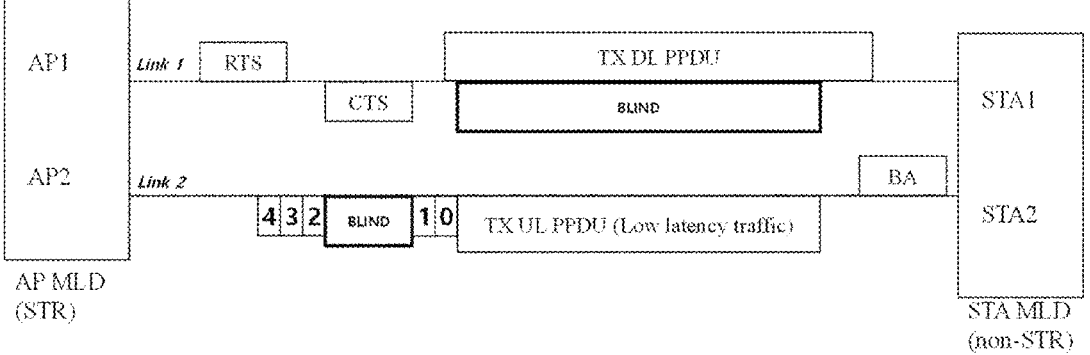
FIG. 19 illustrates a situation in which a multi-link device fails to transmit low latency traffic due to RTS/CTS frame exchange in a non-STR multi-link pair.

FIG. 19 illustrates a situation in which a multi-link device fails to transmit low latency traffic due to RTS/CTS frame exchange in a non-STR multi-link pair.

When a multi-link device performs frame exchange in any one of a non-STA multi-link, transmission of low latency traffic in the other link of the non-STR multi-link pair may be delayed. In an embodiment of FIG. 19, an AP multi-link device includes a first AP (AP 1) and a second AP (AP 2), a non-AP station multi-link device corresponding to a non-STR multi-link device includes a first station (STA 1) and a second station (STA 2). The first AP (AP 1) and the first station (STA 1) operate in a first link (Link 1). The first AP (AP 1) transmits a request to send (RTS) frame to the first station (STA 1). The first station (STA 1) transmits a clear to send (CTS) frame to the first AP (AP 1) as a response to the RTS frame. Due to an RTS frame/CTS frame exchange sequence performed in the first link, frame exchange between the second AP (AP 2) and the second station (STA 2) cannot be performed in the second link (Link 2). In addition, even after the RTS frame/CTS frame exchange is completed, transmission may be restricted for a predetermined time interval, e.g., MediumSyncDelay or NAVSyncDelay, in the second link (Link 2).

In addition, in the conventional wireless LAN operation, a station having received an RTS frame needs to transmit a CTS frame. Accordingly, when the conventional wireless LAN operation is applied the same, low latency traffic may be delayed until after RTS frame/CTS frame exchange even though the embodiment of the PPDU reception suspension, described in FIG. 18, is applied.

Figures 20, 21:
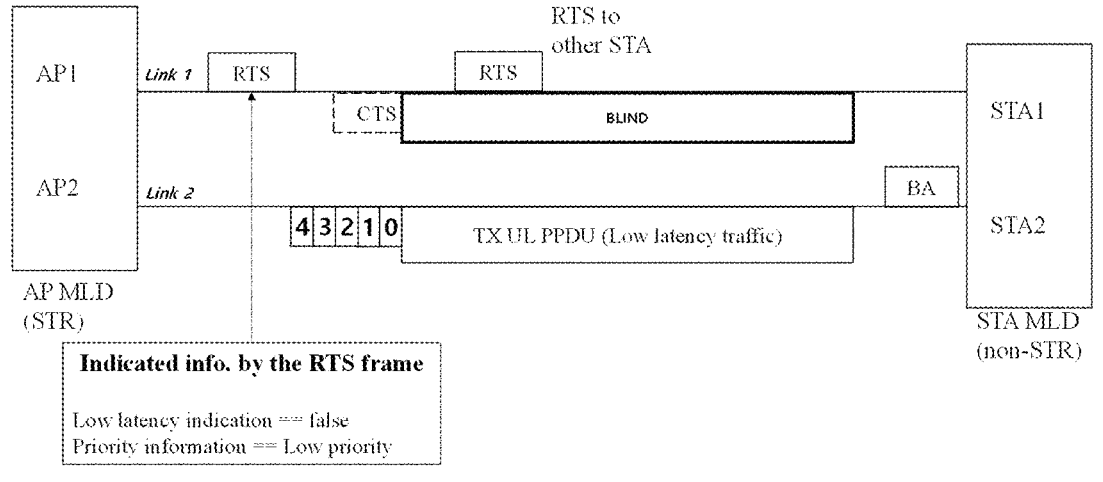
FIG. 20 illustrates that a multi-link device determines whether to transmit traffic based on a priority of traffic before frame exchange according to an embodiment of the disclosure
FIG. 21 illustrates a frame control field format of an RTS frame according to an embodiment of the disclosure.

FIG. 20 illustrates that a multi-link device determines whether to transmit traffic based on a priority of traffic before frame exchange according to an embodiment of the disclosure.

A multi-link device may suspend frame exchange in a frame exchange sequence performed in any one of a non-STR multi-link pair for transmission of low latency traffic. Specifically, the multi-link device may not transmit a frame which needs to be transmitted in the frame exchange sequence, and perform transmission of low latency traffic. In a specific embodiment, the multi-link device may not transmit a response frame in the frame exchange sequence for transmission of low latency traffic. In such embodiments, the multi-link device may resume the frame exchange sequence after performing the transmission of the low latency traffic.

In addition, the frame exchange sequence may be a frame exchange sequence for configuration of a network allocation vector (NAV). The frame exchange sequence for NAV configuration may include at least one of a request to send (RTS) frame/clear to send (CTS) frame exchange sequence and a multi-user (MU)-RTS frame/CTS frame exchange sequence. In addition, in the frame exchange sequence, an interval between the frames may be an SIFS. In this case, in the frame exchange sequence, a data frame exchange sequence may be excluded.

In addition, a frame exchanged in the frame exchange sequence may include information on the priority of traffic included in a frame to be transmitted after the frame exchange sequence. In this case, the information on the priority may correspond information indicating whether traffic included in the frame to be transmitted after the frame exchange sequence is low latency traffic. In addition, the information on the priority may correspond to a traffic identifier (TID) of traffic included in the frame to be transmitted after the frame exchange sequence. In addition, the information on the priority may indicate the priority of traffic included in the frame to be transmitted after the frame exchange sequence. In such embodiments, the multi-link device may receive a frame in the frame exchange sequence performed in any one of the non-STR multi-link pair, and may determine whether to continue the frame exchange sequence, based on additional information of the received frame. For example, when a frame received by the multi-link device indicates that low latency traffic is not to be transmitted after the frame exchange sequence, the multi-link device may suspend the frame exchange sequence. In addition, when a frame received by the multi-link device indicates that low latency traffic is to be transmitted after the frame exchange sequence, the multi-link device may continue the frame exchange sequence. In another specific embodiment, when a frame received by the multi-link device indicate that the priority of traffic to be transmitted after the frame exchange sequence is lower than the priority of traffic waiting to be transmitted in the other link of the non-STR multi-link pair, the multi-link device may suspend the frame exchange sequence. In addition, when a frame received by the multi-link device indicates that the priority of traffic to be transmitted after the frame exchange sequence is equal to or higher than the priority of traffic waiting to be transmitted in the other link of the non-STR multi-link pair, the multi-link device may continue the frame exchange sequence. A specific format of information on the priority of traffic included in the frame to be transmitted after the frame exchange sequence is described through FIGS. 21 and 22.

In the above-described embodiments, the multi-link device may determine whether to transmit a response frame to the received frame, based on additional information of the received frame. In addition, the multi-link device may determine the type of a response frame to the received frame, based on additional information of the received frame.

In addition, a station having failed to receive the response frame in the frame exchange sequence may not perform frame retransmission. This is because the frame retransmission performed by the station may cause interference to low latency traffic transmission performed instead of the frame exchange sequence. Specifically, even though a station having transmitted a frame to a non-STR multi-link device fails to receive a response frame, the station may not perform frame retransmission. Even through a station having transmitted a frame in any one of a non-STR multi-link pair fails to receive a response frame, the station may not perform frame retransmission. In another specific embodiment, a station having failed to receive a response frame in a frame exchange sequence may determine whether to perform frame retransmission, based on whether a link corresponding to a non-STR multi-link pair with a link in which a frame is transmitted has reached a service period for low latency traffic transmission. For example, a link corresponding to a non-STR multi-link pair with a link in which a frame is transmitted has received a service period for low latency traffic transmission, a station having transmitted the frame may not perform frame retransmission. The station having failed to receive a response frame in a frame exchange sequence may determine whether to perform frame retransmission, based on whether a receiver of the frame has participated in a negotiation of a service period for low latency traffic transmission. For example, when the receiver of the frame has participated in the negotiation of the service period for the low latency traffic transmission, the station having transmitted the frame may not perform frame retransmission. In the embodiments above, a service period for low latency traffic transmission may correspond to a service period of a restricted (R)-target wakeup time (TWT). The R-TWT is described through FIG. 25.

In the embodiment of FIG. 20, an AP multi-link device includes a first AP (AP 1) and a second AP (AP 2), and a non-AP station multi-link device corresponding to a non-STR multi-link device includes a first station (STA 1) and a second station (STA 2). The first AP (AP 1) and the first station (STA 1) operate in a first link (Link 1). The first AP (AP 1) transmits a request to send (RTS) frame to the first station (STA 1). The first station (STA 1) transmits a clear to send (CTS) frame to the first AP (AP 1) as a response to the RTS frame. In this case, the RTS frame includes information on the priority of traffic to be transmitted after the RTS frame/CTS frame exchange. The information on the priority may indicate that traffic rather than low latency traffic is transmitted after the RTS frame/CTS frame exchange. Alternatively, the information on the priority may indicate that traffic having the priority lower than the priority of traffic waiting to be transmitted in the second link is to be transmitted after the RTS frame/CTS frame exchange. In such a case, the first station (STA 1) refrains from transmitting the CTS frame, and the second station (STA 2) transmits low latency traffic to the second AP (AP 2).

The first AP (AP 1) fails to receive the CTS frame from the first station (STA 1), but refrains from retransmitting the RTS frame to the first station (STA 1). In addition, the first AP (AP 1) transmits the RTS frame to a station other than the first station (STA 1) in the first link (Link 1).

Figure 22:
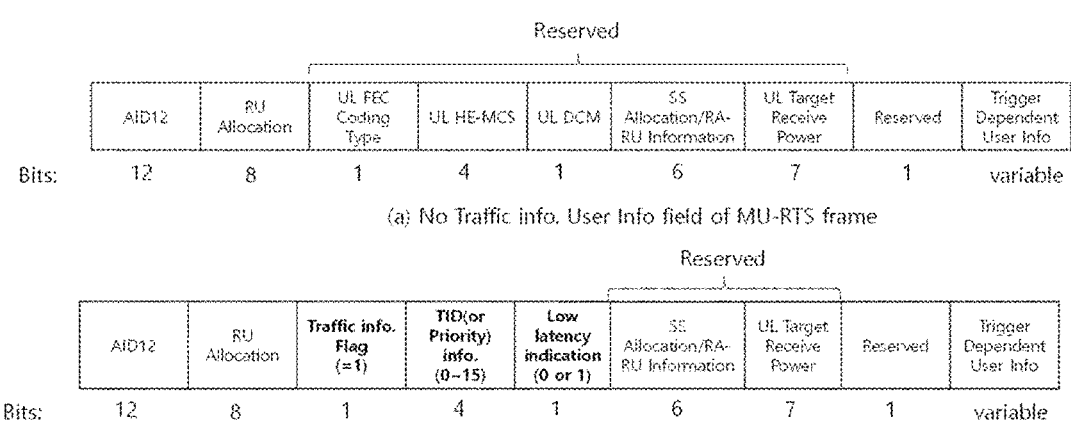
FIG. 22 illustrates a user info field format of a MU-RTS frame according to an embodiment of the disclosure.

FIG. 21 illustrates a frame control field format of an RTS frame according to an embodiment of the disclosure. In addition, FIG. 22 illustrates a user info field format of a MU-RTS frame according to an embodiment of the disclosure.

As described above, a frame exchanged in the frame exchange sequence may include information on the priority of traffic included in a frame to be transmitted after the frame exchange sequence. Specifically, an initiating frame which initiates frame exchange may include information on the priority of traffic. Specifically, when the initiating frame is a control frame, a frame control field may include the information on the priority of traffic. For example, the initiating frame may include a 1-bit field (low latency indication) indicating whether traffic included in the frame to be transmitted after the frame exchange sequence is low latency traffic. In this case, the 1-bit field may be included in the initiating frame, instead of a "more data" field. In addition, the initiating frame may include a 4-bit field (TID info) indicating a traffic identifier (TID) of traffic included in the frame to be transmitted after the frame exchange sequence. In another specific embodiment, the initiating frame may include a 4-bit field (priority info) indicating the priority of traffic to be transmitted after the frame exchange sequence. In this case, the 4-bit field may be included in the initiating frame, instead of a "to DS" field, a "from DS" field, a "more fragments" field, and a retry field. In addition, the initiating frame may include a 1-bit field (traffic info flag) indicating whether to include information on the priority of traffic included the frame to be transmitted after the frame exchange sequence. In this case, the 1-bit field may be included instead of a "protected frame" field. This is because the "more data" field, the "to DS" field, the "from DS" field, the "more fragments" field, the retry field, and the "protected frame" field do not transfer an additional meaning in the control frame.

(a) of FIG. 21 illustrates a frame control field of an RTS frame not including information on a priority of traffic. In addition, (b) of FIG. 21 illustrates a frame control field of an RTS frame including information on a priority of traffic according to an embodiment of the disclosure.

An MU-RTS frame may be a type of a trigger frame. The trigger frame may trigger transmission of one or more stations. To this end, the trigger frame may include as many user info fields as the number of stations triggering transmission. Each of the user info fields indicates information signaled to each of the stations triggering transmission of the trigger frame. A user info field of the MU-RTS frame may include information on the priority of traffic included in the frame to be transmitted after an MU-RTS frame/CTS frame exchange sequence. In this case, the user info field of the MU-RTS frame may include information on the priority of traffic by using a reserved field. Specifically, the user info field may include information on the priority of traffic by using a UL FEC coding type field, a UL HE-MCS field, a UL DCM field, an SS allocation/RA-RU information field, and a UL target receive power field.

Embodiments described through FIG. 21 are applicable to a format of information on the priority of traffic. (a) of FIG. 22 illustrates a user info field of an MU-RTS frame not including information on the priority of traffic. In addition, (b) of FIG. 22 illustrates a user info field of an MU-RTS frame including information on the priority of traffic according to an embodiment of the disclosure.

An MU-RTS frame/CTS frame exchange sequence can be performed between one AP and multiple stations, and thus even though a multi-link device does not transmit a CTS frame, the MU-RTS frame/CTS frame exchange sequence may be continued.

When the conventional wireless LAN operation is applied, a multi-link device needs to obtain a transmission opportunity to transmit low latency traffic even after suspension of the frame exchange sequence. Accordingly, the multi-link device needs to compete with other wireless communication devices, and thus low latency traffic transmission may be delayed again in this process. A low latency traffic transmission method to prevent the delay may be needed. The method is described through FIGS. 23 and 24.

Figure 23:
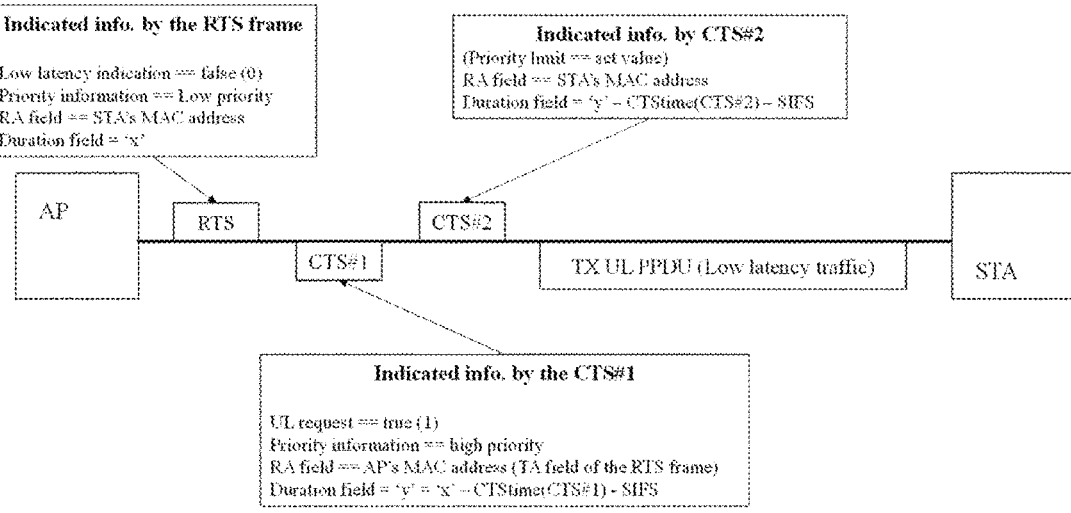
FIG. 23 illustrates that a station having received an RTS frame requests to yield a transmission opportunity from an AP having transmitted the RTS frame according to an embodiment of the disclosure.

FIG. 23 illustrates that a station having received an RTS frame requests to yield a transmission opportunity from an AP having transmitted the RTS frame according to an embodiment of the disclosure.

When a station storing low latency traffic in a buffer receives an initiating frame which initiates a frame exchange sequence, the station may insert a low latency traffic priority processing request into a response frame to the initiating frame, and transmit the response frame. The station having transmitted the initiating frame may accept or reject the low latency traffic priority processing request. A station having received a response frame including the low latency traffic priority processing request may transmit the response frame to accept the low latency traffic priority processing request. In addition, the station having received the response frame including the low latency traffic priority processing request may reject the low latency traffic priority processing request by performing transmission scheduled after the frame exchange sequence.

For example, a first station receives an RTS frame from a second station. In this case, when the first station stores low latency traffic transmission in a buffer, the first station may insert a low latency traffic priority processing request into a CTS frame and transmit the CTS frame to the second station. The second station receives the CTS frame including the low latency traffic priority processing request. In this case, when the second station accepts the low latency traffic priority processing request, the second station transmits the CTS frame to the first station. In this case, the first station receives the CTS frame and transmits a frame including low latency traffic. When the second station rejects the low latency traffic priority processing request, the second station transmits DL data to the first station. In such embodiments, an interval between frames may be an SIFS.

In another specific embodiment, when a station storing low latency traffic in a buffer receives an initiating frame which initiates a frame exchange sequence, the station may transmit an initiating frame as a response to the initiating frame to request low latency traffic priority processing. In this case, the initiating frame transmitted as a response to the initiating frame includes information non the characteristics of low latency traffic stored in the buffer by the station. For example, the first station receives an RTS frame from the second station. In this case, when the first station stores low latency traffic transmission in the buffer, the first station may transmit the RTS frame to the second station. In this case, a frame control field of the RTS frame may include information on the characteristics of low latency traffic stored in the buffer by the station. In this case, the information on the characteristics of low latency traffic may be indicated as in the embodiment described through FIG. 21.

In the embodiments above, the station having received the low latency traffic priority processing request may not accept the low latency traffic priority processing request and terminate the frame exchange sequence. For example, the station having received an RTS frame as a response to the RTS frame, or receiving a CTS frame including low latency traffic priority processing request may not transmit a DL data frame later. This is because a consecutive sequence after the frame exchange sequence of the low traffic priority processing request may be interpreted as undesirable signaling.

In addition, a station transmitting an initiating frame may include, in the initiating frame, information on the characteristics of traffic to be transmitted after a frame exchange sequence. For example, a station transmitting an RTS frame in an RTS frame/CTS frame exchange sequence may include, in the RTS frame, information on the characteristics of traffic to be transmitted after the RTS frame/CTS frame exchange sequence. The information on the characteristics of traffic may be indicated as in the embodiment described through FIG. 21. In such embodiment, the station having received the initiating frame may determine whether to request low latency traffic priority processing, based on the information on the characteristics of traffic included in the initiating frame. For example, the first station may transmit, to the second station, the RTS frame including information on the characteristics of traffic to be transmitted after the RTS frame/CST frame. The second station may determine whether to request low latency traffic priority processing from the first station, based on the information on the characteristics of traffic to be transmitted after the RTS frame/CST frame exchange. Specifically, when traffic to be transmitted after the RTS frame/CST frame exchange is not low latency traffic, the second station may request low latency traffic priority processing from the first station. In addition, when traffic to be transmitted after the RTS frame/CST frame exchange is low latency traffic, the second station may not request low latency traffic priority processing from the first station. In another specific embodiment, when the priority of traffic to be transmitted after the RTS frame/CST frame exchange is lower than the priority of low latency traffic stored in the buffer of the second station, the second station may request low latency traffic priority processing from the first station. In addition, when the priority of traffic to be transmitted after the RTS frame/CST frame exchange is higher than the priority of low latency traffic stored in the buffer of the second station, the second station may not request low latency traffic priority processing from the first station.

In the embodiment of FIG. 23, an AP transmits an RTS frame to a station. In this case, the RTS frame includes the characteristics of traffic to be transmitted after an RTS frame/CTS frame exchange. Specifically, the RTS frame indicates that the traffic to be transmitted after the RTS frame/CTS frame exchange is not low latency traffic, and may indicate the priority of the traffic to be transmitted after the RTS frame/CTS frame exchange. The traffic to be transmitted after the RTS frame/CTS frame exchange is not low latency traffic, and thus the station transmits a CTS frame (CTS #1) for requesting low latency traffic priority processing. In this case, the station configures a value of a duration field of the CTS frame (CTS #1) as a value obtained by subtracting a time (CTStime) required for CST frame transmission and an SIFS from a value of the duration field of the RTS frame. The AP receives the CTS frame (CTS #1) from the station. The AP accepts transmission of low latency traffic by transmitting a CTS frame (CTS #2) to the station. In this case, the AP configures a value of a duration field of the CST frame (CTS #2) as a value obtained by subtracting a time (CTStime) required for CST frame transmission and an SIFS from a value of the duration field of the CTS frame (CTS #1).

In the above-described embodiments, when the transmission of the low latency traffic is terminated and a TXOP configured for frame exchange is left, the station having transmitted the low latency traffic may perform signaling of completion of the transmission of the low latency traffic by transmitting a response frame. Specifically, a station having requested the low latency traffic priority processing in the RTS frame/CTS frame exchange sequence and having completed the transmission of the low latency traffic may transmit a CTS frame. In this case, the station may transmit the CTS frame by using a format other than a non-HT PPDU, e.g., an HT PPDU, a VHT PPDU, and an EHT PPDU. In a specific embodiment, a format other than the non-HT PPDU may be an EHT PPDU format. This is because the intention that the CTS frame is transmitted is not to configure a NAV but to notify that the transmission of the low latency traffic has been completed.

In the above-described embodiments, transmission to a station in the embodiments described in relation to the CTS frame/RTS frame transmission indicates that an RA field of the CTS frame/RTS frame is configured as a MAC address of the corresponding station.

Figure 24:
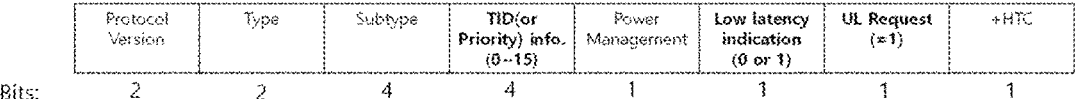
FIG. 24 illustrates a format of a frame control field of a CTS frame including a priority processing request of low latency traffic according to an embodiment of the disclosure.

FIG. 24 illustrates a format of a frame control field of a CTS frame including a priority processing request of low latency traffic according to an embodiment of the disclosure.

As described above, the CTS frame may include information on a priority processing request of low latency traffic.

The CTS frame may include a 1-bit field (low latency indication) indicating a priority processing request of low latency traffic. In addition, the CTS frame may include a 4-bit field (TID info) indicating a traffic identifier (TID) of frame low latency traffic. In another specific embodiment, the CTS frame may include a 4-bit field (priority info) indicating the priority of low latency traffic. In addition, the CTS frame may include a 1-bit field (UL request) indicating whether a station transmitting the CTS frame request uplink transmission.

Scheduling for low latency traffic transmission is described through FIGS. 25 to 30. In the conventional wireless LAN communication, it is supported that a channel access parameter is configured for each AC through an enhanced distributed channel access (EDCA), and traffic is processed according to the priority of each AC by using the configured channel access parameter. However, the conventional EDCA provided channel access probabilistically having a higher priority, and thus was insufficient to support transmission of low latency traffic. To complement this, a timer interval in which low latency traffic can be prioritized to be transmitted may be configured. For convenience of description, the time interval in which the low latency traffic is prioritized to be transmitted is referred to as a restricted service period. Most services requiring low latency traffic transmission, such as VR/AR, require periodic traffic transmission, and thus the restricted service period is highly advantageous in reducing delay in the low latency traffic transmission.

The restricted service period may be a time interval in which transmission of low latency traffic and transmission of a response to the low latency traffic are prioritized to be allowed. Specifically, the restricted service period may be a time interval in which transmission of low latency traffic and transmission of a response to the low latency traffic are only allowed. In another specific embodiment, the restricted service period may be a time interval in which transmission of low latency traffic and transmission of a response to the low latency traffic are performed and transmission of traffic other than the low latency traffic is allowed after the transmission of the low latency traffic and transmission of the response to the low latency traffic are completed.

First, a method of configuring a restricted service period is described. The restricted service period may be configured through a TWT of the conventional WLAN. The TWT configures a service period through a negotiation between an AP and a station, and supports that the AP and the station perform transmission and reception in an interval corresponding to a service period, and enter a low power mode in an interval other than the service period. A detailed description thereof will be made through FIG. 25. For convenience of description, configuration of a restricted service period through a TWT and operations of an AP and a station, which are based on the restricted service period, are referred to as a restricted TWT.

Figure 25:
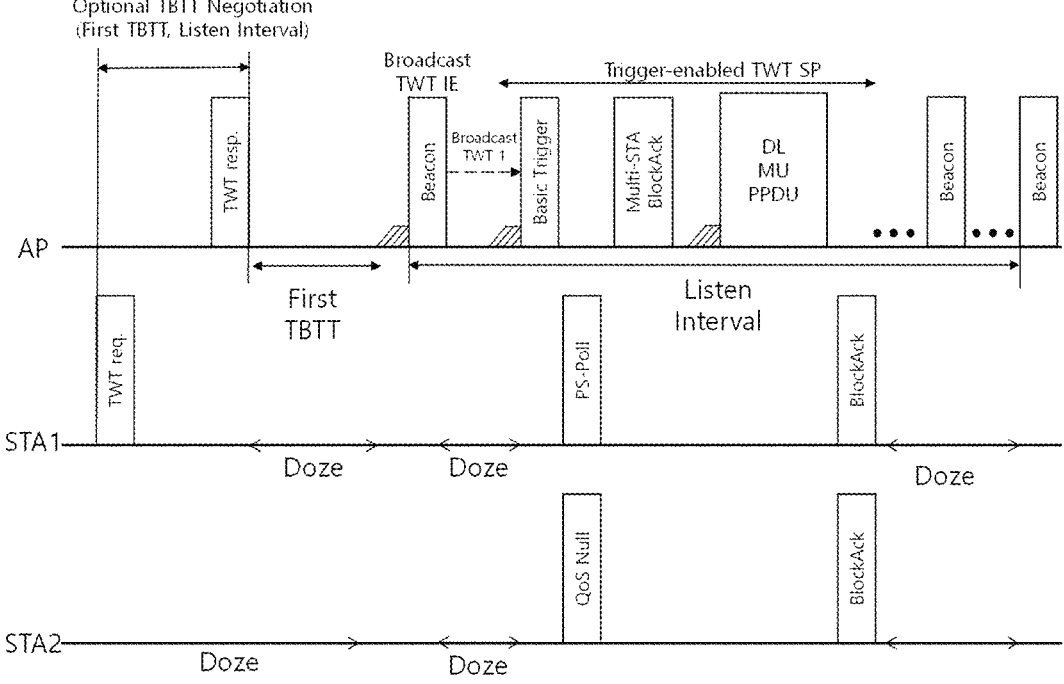
FIG. 25 illustrates a method of configuring a broadcast TWT between an AP and a station according to an embodiment of the disclosure.

FIG. 25 illustrates a method of configuring a broadcast TWT between an AP and a station according to an embodiment of the disclosure.

A service period in a TWT may be configured as follows. An AP requests a station to participated in a TWT, the station being associated with the AP. The station may participate in a broadcast TWT, or may negotiate with the AP about an individual TWT. In this case, the AP may request the station to participate in the TWT by configuring a value of a TWT required subfield of a HE operation element as 1. In addition, the AP may transmit a broadcast TWT element through a management frame, e.g., a beacon frame, to transfer information required for the participation in the broadcast TWT, to the station. In this case, the AP may perform signaling of supporting of the broadcast TWT by configuring dotllTW-TOptionActivated as "true", and configuring a broadcast TWT support field (element) of a HE capabilities element as 1. The AP may configure a restricted service interval to be similar to a service period of a TWT.

In an embodiment of FIG. 25, a first station (STA 1) requests TWT configuration from an AP. The AP and the first station (STA 1) configure a TWT parameter, for example, a first TBTT and a listen interval. Accordingly, the AP, the first station (STA 1), and a second station (STA 2) configure a broadcast TWT. The AP indicates a broadcast TWT service period by using a beacon frame. In the broadcast TWT service period, the AP may trigger uplink (UP) transmission by transmitting a downlink (DL) physical layer protocol data unit (PPDU) to the first station (STA 1) and the second station (STA 2), or transmitting a trigger frame to the first station (STA 1) and the second station (STA 2). In the broadcast TWT service period, the first station (STA 1) and the second station (STA 2) wake up to receive the beacon frame. The first station (STA 1) and the second station (STA 2) obtain information on the TWT from the received beacon frame. The AP transmits the trigger frame to the first station (STA 1) and the second station (STA 2), the first station (STA 1) transmits a PS-Poll frame to the AP, and the second station (STA 2) transmits a QoS null frame to the AP. The AP receives the PS-Poll frame and the QoS null frame transmitted by the first station (STA 1) and the second station (STA 2), and determines that the first station (STA 1) and the second station (STA 2) are in an awake state. The AP transmits a multi-STA block ACK frame to the first station (STA 1) and the second station (STA 2). The AP transmits a DL PPDU to the first station (STA 1) and the second station (STA 2).

In the conventional service period, a station not participating in the TWT is not restricted to perform channel access or perform transmission. This is because the TWT is for assisting a station participating in the TWT in entering a doze state. However, a restricted service period for preventing delay in transmission of low latency traffic needs to guarantee priority transmission of the low latency traffic, and thus a method for protecting the restricted service period is required.

During the restricted service period, a station not participating in a restricted TWT may be restricted to perform channel access. Specifically, during the restricted service period, the station not participating in the restricted TWT may fail to perform channel access. During the restricted service period, when the station not participating in the restricted TWT completes channel access, the corresponding station may restart a channel access procedure without performing transmission. In this case, the station may restart the channel access procedure when the restricted service period is terminated. In addition, channel access of the station may indicate an EDCA backoff procedure. The completion of channel access may indicate that a backoff counter of the EDCA backoff procedure reaches 0. In addition, when the station restarts the channel access procedure, the station may obtain a random integer within a CW used for the immediately preceding channel access, and use the obtained integer as a backoff counter. That is, the station may not double the size of the CW used for the immediately preceding channel access. In this case, the CW may be maintained for each AC. Such channel access restriction is applicable only to a station supporting the restricted TWT. Specifically, such channel access restriction is applicable to a station among non-legacy (EHT) stations, which has dotllRestrictedTWTOptionImplemented of an EHT capabilities element, configured as "true", and may not be applied to a station among non-legacy (EHT) stations, which has dotllRestrictedTWTOptionImplemented of the EHT capabilities element, configured as "false". In the disclosure, a non-legacy station may indicate an EHT station and a station after the EHT station. In addition, a legacy station, as a station before the EHT station, may indicate a non-HT station, an HT station, a VHT station, and a HE station.

In addition, during the restricted service period, for the non-legacy station, an NAV may be configured in traffic other than low latency traffic. Specifically, like the configuration of the NAV in traffic other than the low latency traffic, the station may suspend a channel access procedure for transmission of traffic other than the low latency traffic. In such embodiment, the NAV may be an NAV independent from the conventional NAV (basic NAV or intra-BSS NAV). In this case, the non-legacy station may be limited to a station supporting the restricted TWT. In another specific embodiment, the non-legacy station may be limited to a station participating in the restricted TWT.

The restricted service period may be included in the broadcast TWT service period. In another specific embodiment, the restricted service period may not be included in the broadcast TWT service period.

In addition, the restricted service period may be repeated according to a cycle designated by the AP. That is, the AP may designate a repetition cycle of the restricted service period. Accordingly, the AP may not always transmit a TWT element of a beacon frame to configure the restricted service period. In this case, the cycle of the service period may be configured according to the characteristics of a low latency service for which the low latency traffic is used. For example, the cycle of the low latency service period in which low latency traffic is generated every 50 ms may be 50 ms.

In addition, a quiet interval may be configured for a station not supporting the restricted TWT. In the conventional wireless LAN, the quiet interval is an interval for supporting channel sensing. When the quiet interval is configured, all stations suspend transmission. The restricted service period may be protected by using the characteristics of the quiet interval. A description thereof will be made through FIG. 26. In this case, the station not supporting the restricted TWT may be limited to the legacy station.

FIG. 26 illustrates configuring a quiet interval by an AP according to an embodiment of the disclosure.

An AP operating a restricted TWT may configure a quiet interval by transmitting a quiet element. During the quiet interval, a station suspends channel access. However, when channel access by a station participating in the restricted TWT is also limited, transmission of low latency traffic cannot be performed. Accordingly, the station participating in the restricted TWT may ignore a quiet interval corresponding to a restricted service period. In this case, the quiet interval corresponding to the restricted service period indicates a quiet interval configured to protect the restricted service period of the restricted TWT. Specifically, the station participating in the restricted TWT may consider the quiet interval corresponding to the restricted service period as a restricted service period. The AP operating the restricted TWT may not configure the quiet interval to match with the restricted service period. This is because, in the quiet element, the quiet interval is configured in units of time units (TU, 1024 us), and the TWT is configured in units of 256 us.

However, channel access is performed in a quiet interval other than the quiet interval which is not configured for the restricted service period, the quiet interval not configured for the restricted service period may be interrupted. Accordingly, a quiet interval configured for the restricted service period, that is, a quiet interval corresponding to the restricted service period, needs to be distinguished. Therefore, the station participating in the restricted TWT may fail to ignore the quiet interval not corresponding to the restricted service period. In the quiet interval not corresponding to the restricted service period, the station cannot not perform all transmissions. Specifically, the station participating in the restricted TWT may not be able to ignore the quiet interval not overlapping with the restricted service period. In a specific embodiment, the station participating in the restricted TWT may perform all transmissions in the quiet interval not overlapping with the restricted service period.

In addition, in the embodiments above, when a start time point of the restricted service period and a start time point of the quiet interval are within a predetermined time and a start time point of a service period and a start time point of the quiet interval are within a predetermined time, the station participating in the restricted service period may consider the quiet interval as a quiet interval corresponding to the restricted service period. As described above, this is because the AP operating the restricted TWT may not configure the quiet interval and the restricted service period to match.

In an embodiment of FIG. 25, an AP configures a quiet interval and a restricted service period by transmitting a beacon frame. In (a) of FIG. 25, a quiet interval and a restricted service period are configured as the same time interval. Accordingly, a station participating in a restricted TWT performs channel access in the quiet interval. In (b) of FIG. 25, a quiet interval is configured as an interval between a time point earlier than a start time point of a restricted service period and a time point later than an end time point of the restricted service period. In (b) of FIG. 25, a station participating in a restricted TWT is restricted to perform channel access in a quiet interval not overlapping with the restricted service period. The station participating in the restricted TWT performs channel access in a quiet interval overlapping with the restricted service period.

As described above, during the restricted service period, channel access may be restricted. Accordingly, such restriction is applicable to TXOP configuration. A description thereof will be made through FIG. 27.

FIG. 27 illustrates a method of configuring a TXOP by a station in consideration of a restricted service period according to an embodiment of the disclosure.

A station having obtained a TXOP before a restricted service period starts, that is, a station corresponding to a TXOP holder, may need to terminate the TXOP before the restricted service period starts. This is because even in a case where the restricted service period is started, when frame exchange of the TXOP holder is continued, transmission of low latency traffic may be interrupted. In this case, the station may be a non-legacy station. In another specific embodiment, the station may be limited to a station supporting the restricted TWT. That is, such restriction may not be applied to a station having a field value of dotllRestrictedTWTOptionImplemented configured as "false".

In a specific embodiment, when a station corresponding to a TXOP holder transmits low latency traffic, frame exchange may be continued even after the restricted service period starts.

A specific method of terminating a TXOP before a restricted service period by a station is described.

A station may configure a TXOP based on a restricted service period. Specifically, the station may configure an end time point of the TXOP as a time point before a start of the restricted service period. In this case, the station may configure duration of an initiating frame which initiates a frame exchange sequence, as duration before the start of the restricted service period. In this case, the station may configure duration of the initiating frame which initiates the frame exchange sequence, as duration before the restricted service period. For example, if a time point at which the station successfully performs channel access is 3 m before the start of the restricted service period, the station may configure the TXOP to be before 3 ms. In addition, the station may terminate the TXO by transmitting a CTS-to-Self frame. In this case, the station may transmit the CTS-to-Self frame at a basic transmission rate, 6 Mbps. This is because more legacy stations can receive the frame when the station transmits the frame at the basic transmission rate.

In another specific embodiment, the station may transmit an CF-End frame before the start of the restricted service period. Accordingly, the station may terminate the TXOP before the start of the restricted service period. In this case, the station may transmit the CF-End frame at the basic transmission rate, 6 Mbps. This is because more legacy stations can receive the frame when the station transmits the frame at the basic transmission rate.

In addition, a station not corresponding to the TXOP holder may release, at a start time point of the restricted service period, a NAV configured before the start of the restricted service period. In this case, the station may be a station supporting a restricted TWT. That is, the station may be a station having a field value of dot11RestrictedTWTOptionImplemented configured as "true". Even through the station does not correspond to the TXOP holder, the station does not support the restricted TWT, the station cannot release, at the start time point of the restricted service period, the NAV configured before the start of the restricted service period. However, when duration of the TXOP remaining after the station completes frame exchange is less than double of a sum of an SIFS and a time required to transmit the CF-End frame, the station may not transmit the CF-End frame. In this case, the station may consider that the TXOP is released at the start time point of the restricted service period. Specifically, the station may consider that a basic NAV is released at the start time point of the restricted service period.

In another specific embodiment, the station may be limited to a station participating in the restricted TWT.

In an embodiment of FIG. 27, an AP transmits a beacon frame including a TWT element to perform signaling of configuration of a restricted service period. In an embodiment of FIG. 27(a), a station configures a TXOP by transmitting an RTS frame. In this case, the station configures a value of a duration field of the RTS frame as before a restricted service period. The station performs frame exchange with the AP, and completes the frame exchange before a start of the restricted service period. In this case, the station lastly transmits a CTS-to-Self frame. In an embodiment of FIG. 27(b), a station configures a TXOP by transmitting an RTS frame. In this case, the station configures a value of a duration field of the RTS frame without considering the restricted service period. The station performs frame exchange with the AP and completes the frame exchange before a start of the restricted service period. In this case, the station releases the TXOP by lastly transmitting a CF-End frame.

In the conventional wireless LAN operation, as an exception to a TXOP rule, an operation in which transmission can be performed exceeding a TXOP limit is defined. For example, retransmission of a single MPDU, single MSDU transmission under block ack agreement (not included in an A-MSDU an A-MPDU including two or more MPDUs), and transmission of a control frame and a QoS null frame (not included in the A-MPDU including two or more MPDUs) may be performed exceeding the TXOP limit. When such an exception is admitted for the restricted service period, transmission of the low latency traffic may be delayed. Such an exception to the TXOP limit cannot be applied while invading the restricted service period.

When an end time point of the TXOP and a start time point of the restricted service period are within a predetermined time difference, the station may determine that the TXOP is a TXOP obtained before the start of the restricted service period. The predetermined time may be 100 us. In another specific embodiment, when the end time point of the TXOP is within the restricted service period, the station may determine that the TXOP is a TXOP obtained before the start of the restricted service period.

As described above, the station may need to complete the frame exchange before the restricted service period. Accordingly, the station may not be allowed to start the frame exchange when an end time point of the frame exchange is within the restricted service period. In this case, the station may complete the frame exchange before the restricted service period by performing fragmentation.

In addition, when low latency traffic is transmitted in the frame exchange performed by the station corresponding to the TXOP holder, the station may continue to perform the frame exchange even after the start of the low latency service period.

Figure 28:
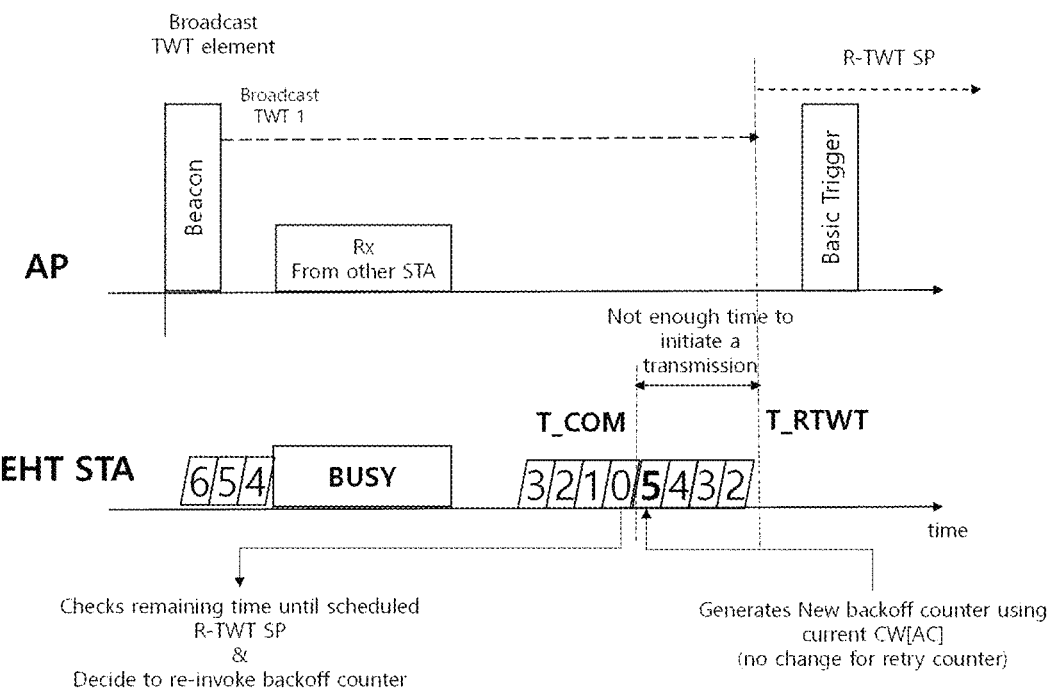
FIG. 28 illustrates re-performing a channel access procedure by a station in consideration of a restricted service period according to an embodiment of the disclosure.

A channel access procedure in consideration of the restricted service period is described through FIG. 28.

FIG. 28 illustrates re-performing a channel access procedure by a station in consideration of a restricted service period according to an embodiment of the disclosure.

As described above, even in a case where a station completes channel access before a restricted service period, when a frame exchange completion time point is after a start of the restricted service period, the station may start a channel access procedure again without performing transmission. In this case, the station may obtain a value of a backoff counter again. In this case, the station may use the size of a CW used for the immediately preceding channel access procedure without change. That is, the station may not double the size of the CW used for the immediately preceding channel access procedure, and may not initialize the size to the minimum value among values that the CW may have. In addition, the station may not increase the number of times of retry, for example, a QoS STA retry counter (QSRC).

In addition, when a time point at which the station completes the channel access is within a predetermined time from a start point of the restricted service period, the station may start the channel access procedure again without performing transmission.

In the embodiments above, the station which attempts to transmit low latency traffic may start frame exchange after the channel access even when a time point of completion of frame exchange is after the start of the restricted service period. Such an exception may be allowed only when the station which attempts to transmit low latency traffic is a station participating in the restricted TWT.

In addition, as described above, the station may operate as a NAV is configured in an AC of traffic other than low latency traffic. Accordingly, the station may determine that a CCA result for transmission of the AC of the traffic other than the low latency traffic is not idle (is busy).

In an embodiment of FIG. 28, an AP performs signaling of configuration of a restricted service period by transmitting a beacon frame including a TWT element. Before a start of the restricted service period, a value of a backoff counter of channel access of the station reaches 0. The station determines that a time point at which exchange of frames including traffic to be transmitted by the station is completed is after a start time point of the restricted service period.

Accordingly, the station obtains a backoff counter within a CW value used for the immediately preceding channel access procedure. The station performs a channel access procedure again by using the obtained backoff counter. In this case, the station does not increase a retransmission counter.

Before the restricted service period ends, all low latency traffic transmission may be completed. In such a case, it may be inefficient that transmission of traffic other than the low latency traffic is restricted due to the low latency service period. Accordingly, a method of terminating the restricted service period early may be required. A description thereof will be made through an embodiment of FIG. 29.

Figure 29:
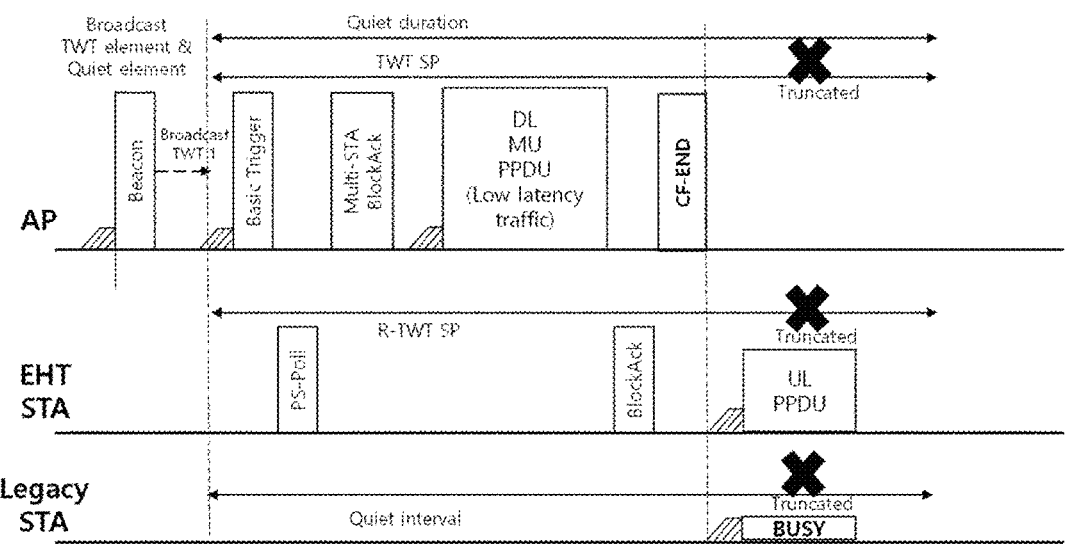
FIG. 29 illustrates an operation of terminating a restricted service period early by an AP according to an embodiment of the disclosure.

FIG. 29 illustrates an operation of terminating a restricted service period early by an AP according to an embodiment of the disclosure.

For the AP to terminate the restricted service period early, the AP needs to determine that all low latency transmission of a station participating in a restricted TWT is completed. To this end, a station participating in a restricted TWT may perform signaling of whether to additionally transmit low latency traffic, through a transmitted frame. Specifically, the station may perform signaling of whether to additionally transmit low latency traffic by configuring a value of a more data subfield of a frame control field of a frame. In this case, when the value of the more data subfield of the frame control field of the frame transmitted in the restricted service period is 1, the more data subfield may indicate that additional transmission of low latency traffic is required and may not indicate whether additional transmission of traffic other than the low latency traffic is required. For example, when the station participating in the restricted TWT stores traffic other than low latency traffic in a transmission buffer, without storing the low latency traffic, the station may configure the value of the more data subfield of the frame control field of the frame transmitted by the station in the restricted service period as 0. The AP may terminate the restricted service period early based on whether the value of the more data subfield of the frame control field of the frame transmitted in the restricted service period by the station participating in the restricted TWT is not 0. Specifically, when the transmission buffer of the AP has no low latency traffic to be transmitted and the value of the more data subfield of the frame control field of the frame transmitted in the restricted service period by the station participating in the restricted TWT is not 0, the AP may terminate the restricted service period early.

The AP may terminate the restricted service period early by transmitting a predetermined control frame. In this case, the control frame may be a CF-End frame. In this case, the AP may configure a BSSID(TA) field of the CF-End frame as a MAC address or a BSSID of the AP. In addition, the AP may configure an individual/group bit of the BSSID(TA) field of the CF-End frame as 1. In another specific embodiment, the AP may terminate the restricted service period early by transmitting a predetermined management frame.

The station having received, in the restricted service period, a predetermined frame indicating termination of the restricted service period may determine that the restricted service period has been terminated. In this case, the station having received the predetermined frame may resume channel access without restriction applied to the restricted service period. As describe above, the predetermined frame may be a CF-End frame. In this case, a value of a TA(BSSID) field of the CF-End frame received by the station in the restricted service period is a MAC address of an AP with which the station is associated, the station may determine the frame as a CF-End frame for terminating the restricted service period.

As described above, to protect the restricted service period from the legacy wireless communication terminal, a quiet interval for the restricted service period may be configured. In this case, the AP may transmit the CF-End frame to terminate the restricted service period. This is because when the AP transmits the CF-End frame, the quiet interval configured for the legacy station may be also released.

In the above-described embodiments, the CF-End frame may be a frame having the type of a frame control field, which corresponds to a control frame (type value B3 B2=01), and having the subtype corresponding to a CF-End frame (subtype value B7 B6 B4 B4=1110).

When the quiet interval is configured for the restricted service period, the station participating in the restricted TWT may not be allowed to transmit the CF-End frame in the restricted service period. In a specific embodiment, the station participating in the restricted TWT may not be allowed to transmit the CF-End frame in the quiet interval corresponding to the restricted service period. This is because a NAV configured in the legacy station is released when the station participating in the restricted TWT transmits the CF-End frame. However, as described above, when the CF-End frame is used to terminate the restricted service period early, the AP may transmit the CF-End frame within the restricted service period.

In an embodiment of FIG. 29, an AP transmits a beacon frame including a TWT element and a quiet element. A station supporting a restricted TWT determines that a restricted service period is configured, and a station not supporting the restricted TWT determines that a quiet interval is configured. When the AP determines that all low latency traffic transmission is completed within the restricted service period, the AP terminates the restricted service period early by transmitting the CF-End frame, and releases the quiet interval configured for the legacy station. In this case, the station supporting the restricted TWT determines that channel access restriction applied during the restricted service period has been removed. Specifically, as described above, when an embodiment in which a NAV is configured during the restricted service period is applied, the station supporting the restricted TWT may determine that the NAV for the restricted service period has been released. In addition, the station not supporting the restricted TWT, which has received the CF-End frame, releases the NAV.

Through FIGS. 11 to 24, an operation of a multi-link device has been described. Through FIGS. 30 to 35, a channel access operation of a multi-link device will be described.

When a first station of a non-STR multi-link device is scheduled to receive a specific frame in a first link, a second station of the non-STR multi-link device, which operates in a second link may not perform channel access or transmission at a time point of receiving the specific frame in the first link. In this case, the specific frame may be a frame periodically transmitted. Specifically, the specific frame may be a DTIM frame.

In addition, when the second station is a TXOP holder, the second station may terminate a TXOP before a time point of receiving the specific frame in the first link. In this case, the embodiment of terminating the TXOP, described through FIG. 28, is applicable as a method of terminating the TXOP. Specifically, the second station may configure the termination of the TXOP to be before the time point of receiving the specific frame in the first link. For example, when the specific frame is a DTIM, the second station may configure a termination time point of the TXOP based on a reception period of the DTIM. In addition, the second station may transmit a CF-End frame before a time point of receiving the specific frame in the first link. In addition, a TXOP limit exception may not be applicable to such embodiments.

In addition, the second station may suspend channel access before a time point of receiving the specific frame in the first link. In this case, the embodiment of channel access suspension, described through FIG. 28, is applicable. Specifically, a time difference between a time point of completion of channel access of the second station and a time point at which the specific frame is scheduled to be received in the first link is not sufficient to complete frame exchange to be performed by the second station, the second station may perform a channel access procedure again. In this case, the second station may obtain a backoff counter by using the size of a CW used for the immediately preceding channel access procedure without change. In addition, the second station may not increase a retransmission counter.

Figure 30:
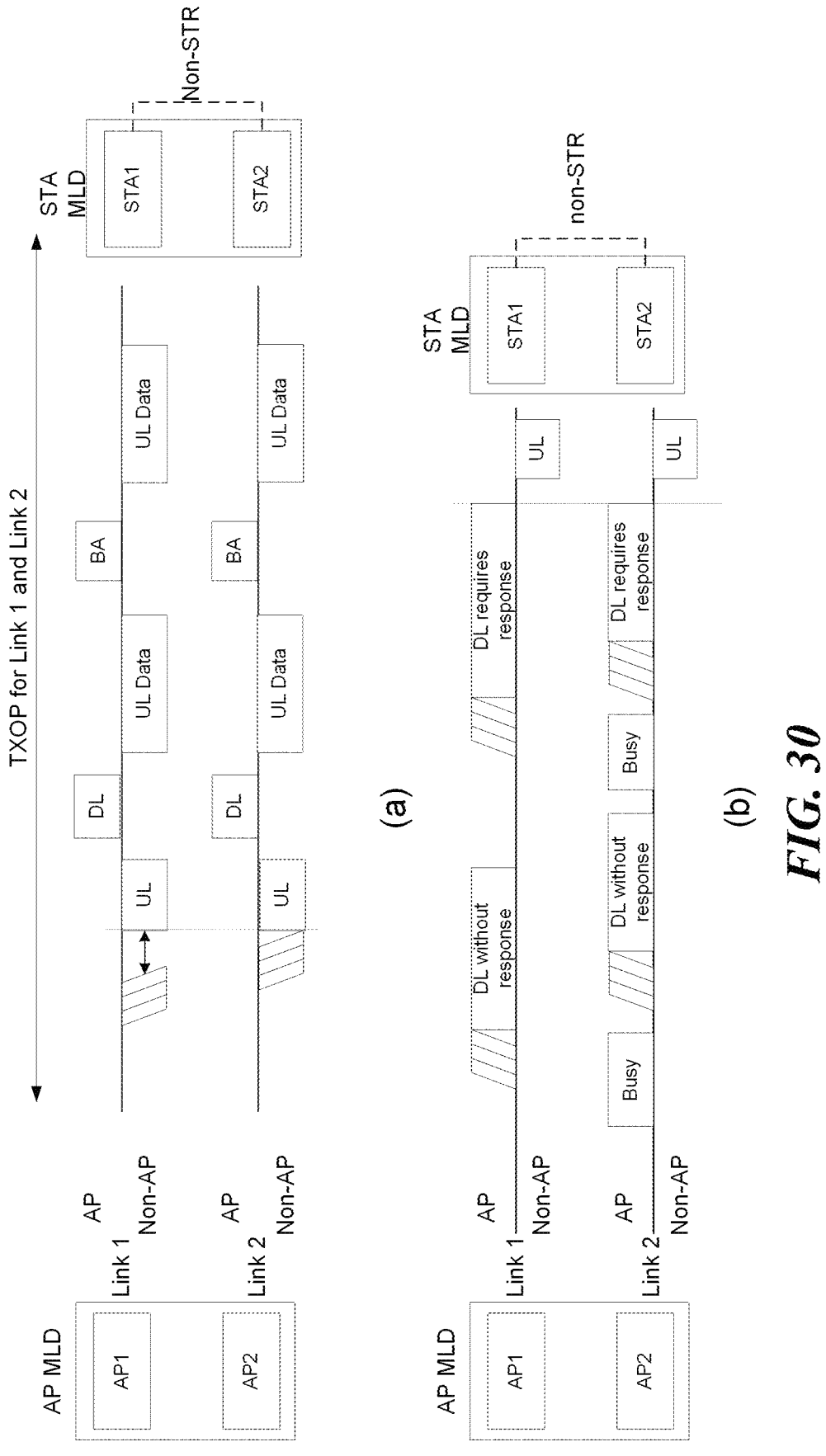
FIG. 30 illustrates transmission performed in a non-STR link pair by a multi-link device according to an embodiment of the disclosure.

FIG. 30 illustrates transmission performed in a non-STR link pair by a multi-link device according to an embodiment of the disclosure.

When a multi-link device transmits a frame in a first link among a non-STR link pair, the multi-link device may be restricted to perform frame transmission in a second link of the non-STR link pair for a predetermined time from a frame transmission completion time point. In this case, the multi-link device may be a non-STR multi-link device. In this case, the predetermined time may be referred as Medium-SyncDelay. The restriction of the frame transmission operation may indicate that the above-described channel access procedure cannot be performed for the corresponding Medium-SyncDelay. Specifically, the multi-link device may not be able to perform a distributed coordination function (DCF) or an enhanced distributed channel access function (EDCAF) operation defined in IEEE 802.11 for MediumSyncDelay in the second link. In another specific embodiment, when the multi-link device performs channel sensing for MediumSyncDelay in the second link, the multi-link device may decrease, for a channel, an energy level of a threshold value corresponding to a reference to a channel busy state. In this case, the multi-link device may configure the energy level of the threshold value as −82 dBm.

The multi-link device operating in the non-STR multi device may synchronize transmission start time points in the non-STR multi-link pair. In this case, the transmission start time point of a frame may indicate a transmission start time point of a PPDU including the frame. The multi-link device may suspend transmission while maintaining a backoff value as 0 in the channel access procedure to perform synchronization of the transmission start time points in the non-STR link pair.

In addition, when reception is consecutively performed after the transmission in the non-STR multi-link pair, the multi-link device may synchronize end time points of the transmission in the non-STR multi-link pair. To this end, the multi-link device may add a bit or a field for padding to the transmitted frame or PPDU. In addition, the multi-link device may add a packet extension (PE). In addition, when frame exchange is consecutively performed in the non-SRT multi-link pair, the multi-link device may synchronize the transmission start time points on the non-STR multi-link after the first frame exchange. In another specific embodiment, the multi-link device may synchronize the end time points of the transmission by performing fragmentation.

When TXOP start time points are identical in multiple links, TXOPs for frame transmission in the respective links may be synchronized. In this case, simultaneous transmission may be performed using the multiple links after a negotiation stage for the simultaneous transmission in the multiple links. The negotiation stage for the simultaneous transmission may include transmitting, by the multi-link device for performing the transmission, a request frame for obtaining a TXOP for simultaneous transmission, through transmission synchronized in the multiple links, and transmitting, by the multi-link device having received the request frame, a response frame at a short interframe space (SIFS) interval from the request frame. In this case, the response frame may be simultaneously transmitted in one or more links in which the request frame is received. The request frame may be a control frame. For example, the request frame may be one of an RTS frame and a multi-user (MU)-RTS frame. In this case, the response frame may be a CTS frame. When a channel of a link is busy while channel contention is performed for simultaneous transmission, the multi-link device may stand by to perform simultaneous transmission operation, or perform transmission using only a link including an idle channel. The above-described exchange of the request frame and the response frame may not be simultaneously performed in the multiple links. In addition, the synchronized frame exchange may indicate synchronization of the transmission start time points of the PPDU including the frame and synchronization of the transmission end time points of the PPDU including the frame.

When the multi-link device transmits a frame for requesting an immediate response in the first link among the non-STR link pair, the multi-link device may synchronize the transmission end time points in the first link and the second link of the non-STR link pair. In this case, the immediate response indicates that an interval between the received frame and the response frame is a predetermined interval. The predetermined interval may be an SIFS. In another specific embodiment, the predetermined interval may be a PIFS. In addition, when the multi-link device transmits a frame not requesting an immediate response in the first link of the non-STR link pair, the multi-link device may not synchronize of transmission end time points in the first link and the second link of the non-STR link pair. In this case, the multi-link device may also transmit a PPDU not requesting an immediate response in the second link, and transmitting the PPDU requesting the immediate response may not be allowed.

In the above-described embodiments, synchronization of the transmission start time points may indicate that a difference between the transmission start time points is within a predetermined time. In addition, synchronization of the transmission end time points may indicate that a difference between the transmission end time points is within a predetermined time. In this case, the predetermined time may indicate a time which prevents a channel state in the other link from being recognized as a channel busy state due to the start of frame transmission in one link when channel sensing and backoff operations are performed in links, respectively. In a specific embodiment, the predetermined time may be a reception transmission turnaround time (RxTxTurnaround-Time). For example, the predetermined time may be 8 us or 4 us.

Through such embodiments, the multi-link device may prevent failure in transmission in the other link due to transmission in one link among the non-STR link pair.

In an embodiment of FIG. 30, an AP multi-link device may include a first AP (AP 1) and a second AP (AP 2), a non-Ap station multi-link device corresponding to a non-STR multi-link device may include a first station (STA 1) and a second station (STA 2). The first AP (AP 1) and the first station (STA 1) operate in a first link (Link 1). The second AP (AP 2) and the second station (STA 2) operate in a second link (Link 2). In FIG. 30(*a*), the AP multi-link device and the station multi-link device perform synchronized transmission and synchronized reception. Accordingly, transmission in any one link among the non-STR multi-link pair is prevented from being suspended. In FIG. 30(*b*), the first AP (AP 1) transmits a DL PPDU not requesting an immediate response in the first link (Link 1). The DL PPDU not requesting the immediate response is transmitted in the first link (Link 1), and thus the second station (STA 2) transmits the DL PPDU not requesting the immediate response in the second link (Link 2) without performing synchronization with the first link transmission.

In FIG. 30, an embodiment in which frame exchange is started from the AP multi-link device corresponding to an STR multi-link device in the non-STR multi-link pair has been illustrated. The embodiment described through FIG. 30 is also applicable when frame exchange is started from a non-STR multi-link device. A description there of will be made through FIGS. 31 and 32.

Figure 31:
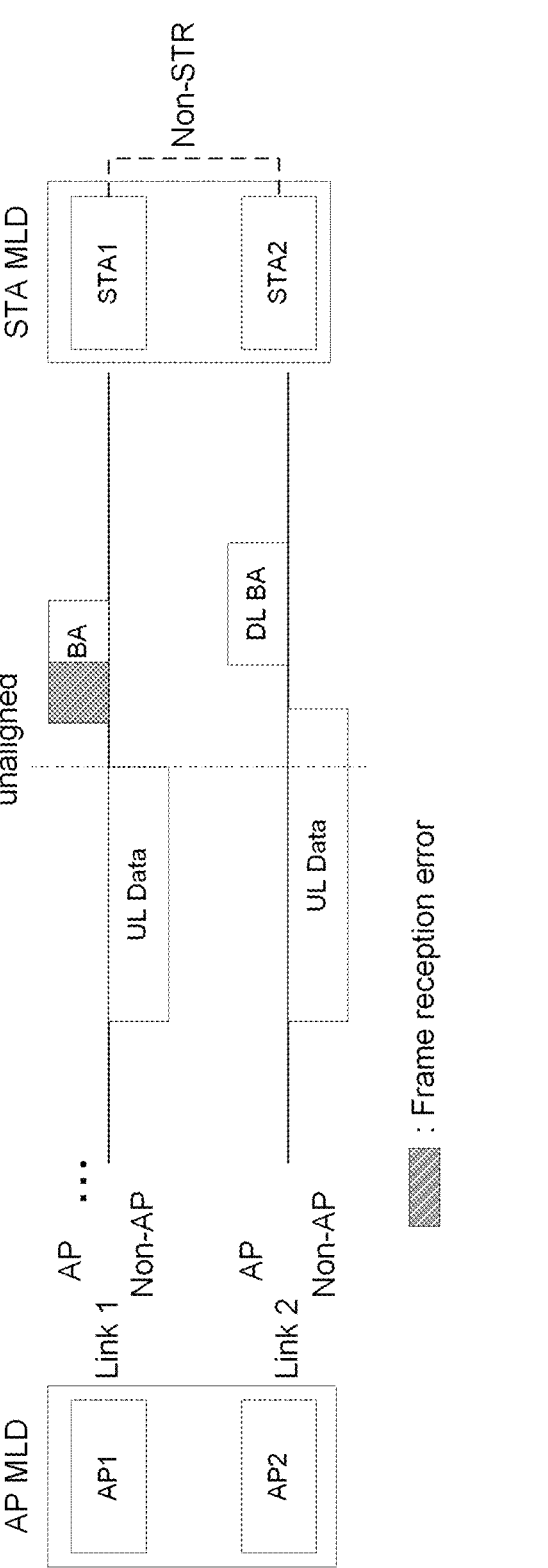
FIG. 31 illustrates frame exchange started from a non-AP station multi-link device to which an embodiment of the disclosure is not applied.
Figure 32:
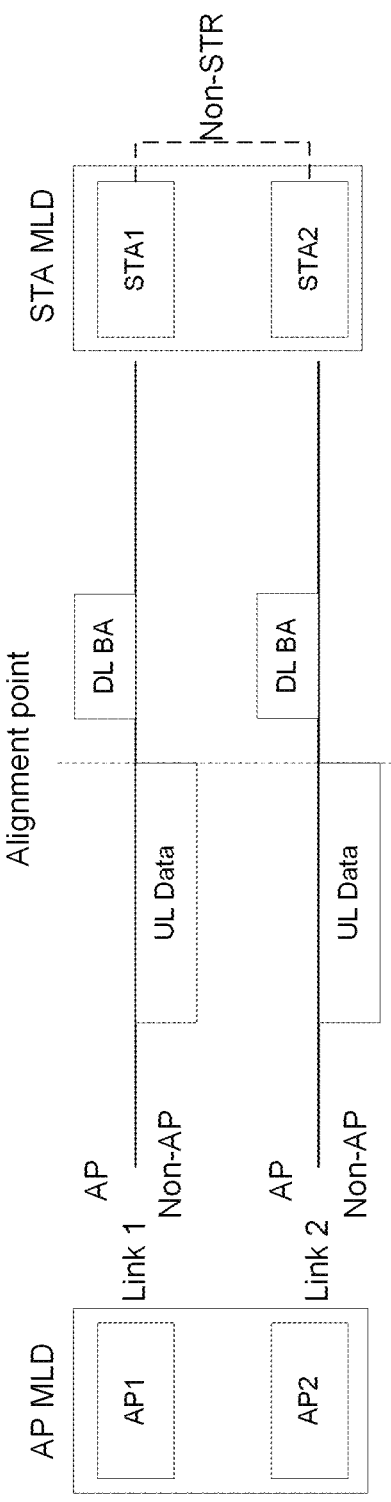
FIG. 32 illustrates frame exchange started from a non-AP station multi-link device according to an embodiment of the disclosure.

FIG. 31 illustrates frame exchange started from a non-AP station multi-link device to which an embodiment of the disclosure is not applied. FIG. 32 illustrates frame exchange started from a non-AP station multi-link device according to an embodiment of the disclosure.

In an embodiment of FIG. 31, an AP multi-link device includes a first AP (AP 1) and a second AP (AP 2), and a non-AP station multi-link device corresponding to a non-STR multi-link device includes a first station (STA 1) and a second station (STA 2). The first AP (AP 1) and the first station (STA 1) operate in a first link (Link 1). The second AP (AP 2) and the second station (STA 2) operate in a second link (Link 2). End time points of transmission of the first station (STA 1) and the second station (STA 2) are not synchronized. The transmission of the first station (STA 1) is terminated earlier than the transmission of the second station (STA 2). Accordingly, while the first AP (AP 1) transmits a BA frame to the first station (STA 1), the transmission of the second station (STA 2) is continued. Accordingly, the transmission of the first AP (AP 1) fails.

Accordingly, when the non-STR multi-link device transmits a frame requesting an immediate response in the first link among the non-STR link pair, the non-STR multi-link device may synchronize transmission end time points in the first link and the second link of the non-STR link pair. In this case, the immediate response indicates that an interval between the received frame and response frame is a predetermined interval. The predetermined interval may be an SIFS. In addition, in another specific embodiment, the predetermined interval may be a PIFS. In addition, when the non-STR multi-link device transmits a frame not requesting an immediate response in the first link among the non-STR link pair, the non-STR multi-link device may not synchronize transmission end time points in the first link and the second link of the non-STR link pair. In this case, the non-STR multi-link device may also transmit a PPDU not requesting an immediate response in the second link, and transmitting the PPDU requesting the immediate response may not be allowed.

In an embodiment of FIG. 32, an AP multi-link device includes a first AP (AP 1) and a second AP (AP 2), and a non-AP station multi-link device corresponding to a non-STR multi-link device includes a first station (STA 1) and a second station (STA 2). The first AP (AP 1) and the first station (STA 1) operate in a first link (Link 1). The second AP (AP 2) and the second station (STA 2) operate in a second link (Link 2). End time points of transmission of the first station (STA 1) and the second station (STA 2) are synchronized. Accordingly, transmission of the first AP (AP 1) and the transmission of the second AP (AP 2) are successfully completed without interruption therebetween.

Figure 33:
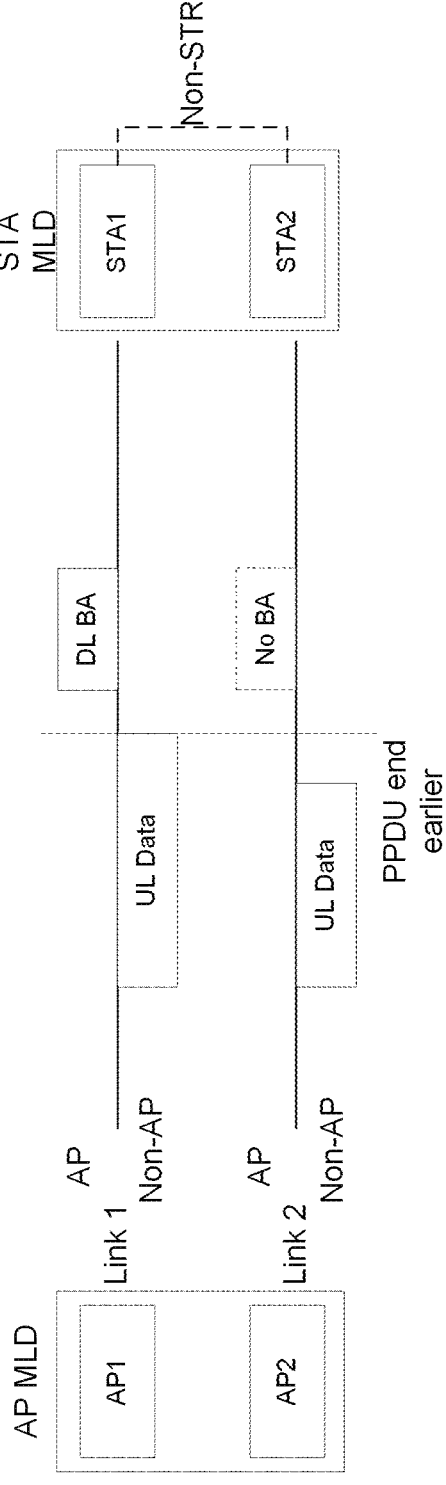
FIG. 33 illustrates performing, by a multi-link device, transmission not requesting an immediate response in a second link when transmission requesting an immediate response is performed in a first link among a non-STR link pair according to an embodiment of the disclosure.
Figure 34:
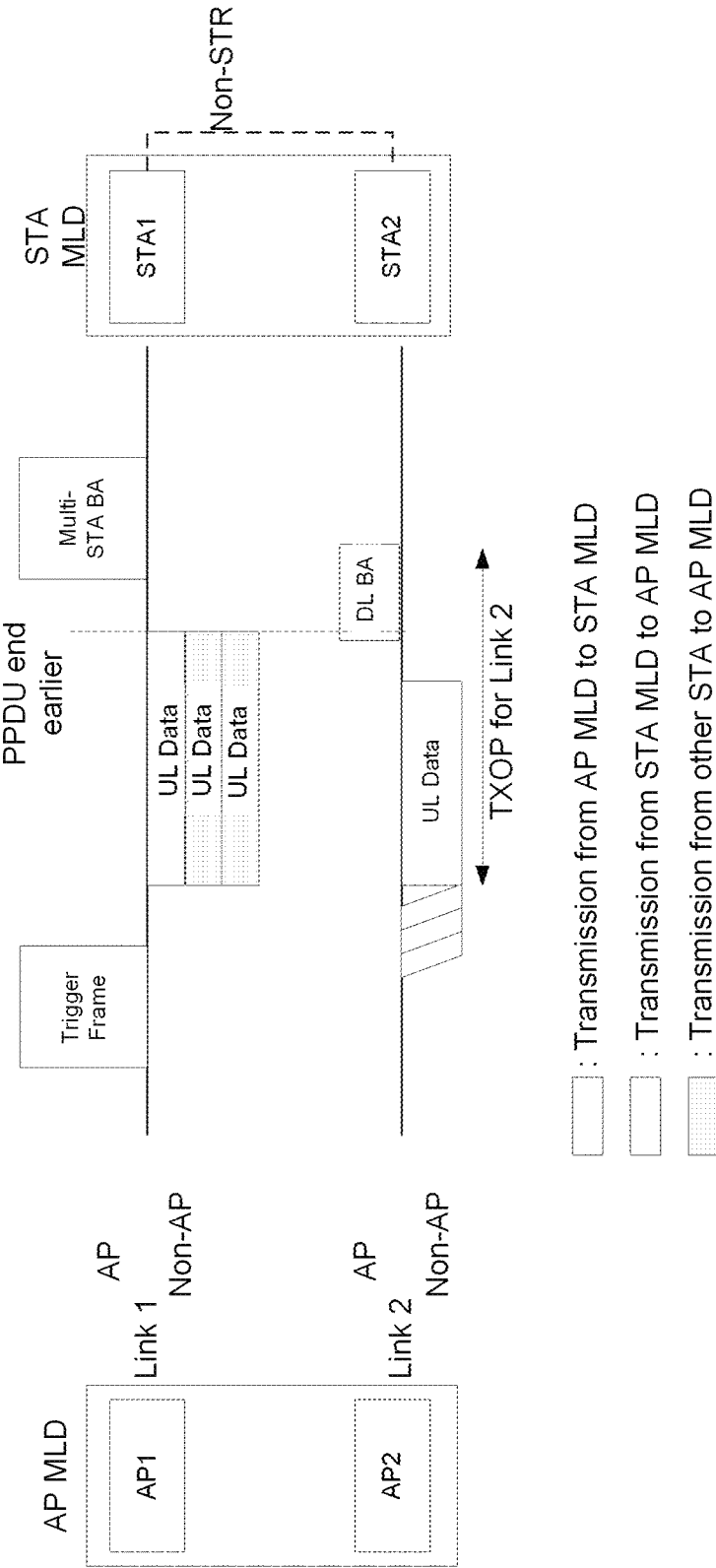
FIG. 34 illustrates an operation in which a multi-link device performs transmission in a second link when UL OFDMA transmission is performed in a first link among a non-STR link pair according to an embodiment of the disclosure.
Figure 35:
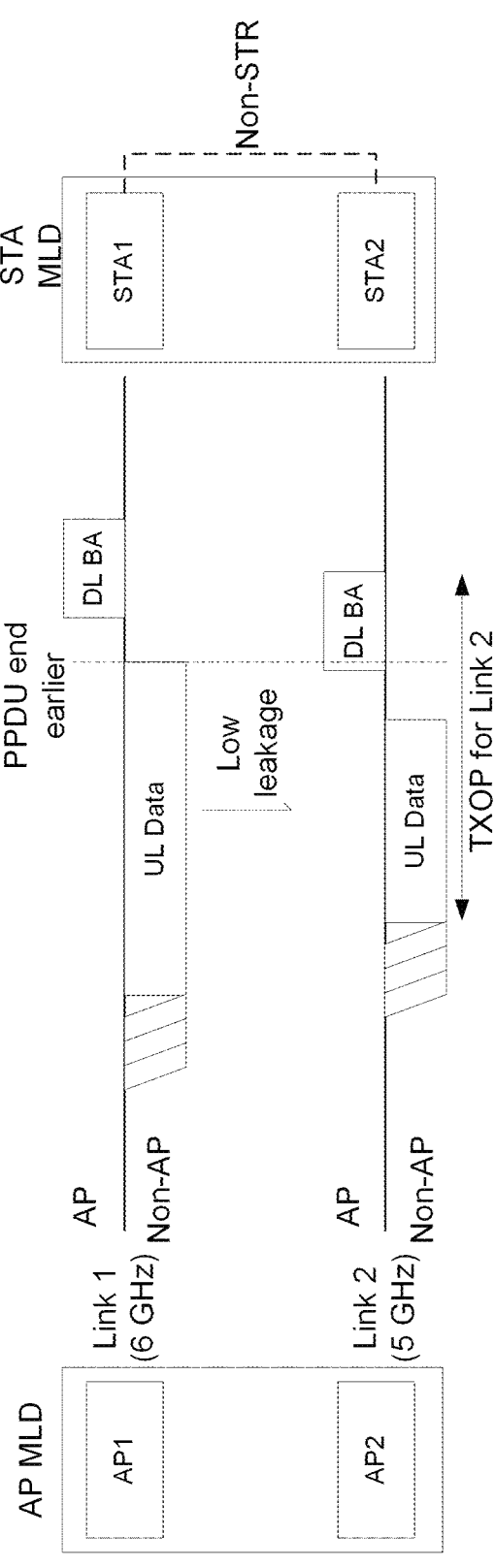
FIG. 35 illustrates a case in which whether a link pair corresponds to a non-STR link pair or an STR link pair is determined according to a transmission direction according to an embodiment of disclosure.

A case in which unsynchronized transmission is allowed in the non-STR link pair is described through FIGS. 33 to 35.

FIG. 33 illustrates performing, by a multi-link device, transmission not requesting an immediate response in a second link when transmission requesting an immediate response is performed in a first link among a non-STR link pair according to an embodiment of the disclosure.

When a multi-link device transmits a frame requesting an immediate response in a first link among a non-STR link pair, the multi-link device may perform, in a second link among the non-STR link pair, transmission which ends earlier than an end time point of the first link and request no immediate response. In such an embodiment, a response frame is not transmitted in the second link, and thus transmission of the multi-link device in the first frame and a response frame to the transmission may be prevented from being interrupted by transmission of the multi-link device in the second link. In addition, when the transmission of the multi-link device in the second link is not completed earlier than the transmission end time point of the first link, the transmission of the response frame in the first link may be interrupted due to the transmission of the multi-link device of the second link. Accordingly, the transmission of the multi-link device in the second link needs to be completed earlier than the transmission of the first link.

In an embodiment of FIG. 33, an AP multi-link device includes a first AP (AP 1) and a second AP (AP 2), and a non-AP station multi-link device corresponding to a non-STR multi-link device includes a first station (STA 1) and a second station (STA 2). The first AP (AP 1) and the first station (STA 1) operate in a first link (Link 1). The second AP (AP 2) and the second station (STA 2) operate in a second link (Link 2). When the first station (STA 1) performs, in the first link, uplink transmission requesting an immediate response, the second station (STA 2) performs, in the second link (Link 2), uplink transmission which ends before the termination of the transmission of the first station (STA 1) and request no immediate response. The uplink transmission of the first station (STA 1) and the uplink transmission of the second station (STA 2) are completed without interruption therebetween.

FIG. 34 illustrates an operation in which a multi-link device performs transmission in a second link when UL OFDMA transmission is performed in a first link among a non-STR link pair according to an embodiment of the disclosure.

In the non-STR multi-link pair, the size of an influence between links may vary according to an RU through which transmission is performed. Accordingly, even though the multi-link device performs transmission in the first link among the first link and the second link corresponding to the non-STR multi-link pair, transmission in the second link may be allowed according to the positions of an RU of the first link, through which the multi-link device performs transmission, and an RU of the second link, through which the multi-link device performs transmission. Specifically, when the multi-link device performs UL OFDMA transmission, transmission in the second link may be allowed according to an RU through which the UL OFDMA transmission is performed. In another specific embodiment, transmission in the second link may be allowed according to the size of a bandwidth used when the multi-link device performs transmission in each link. In this case, the multi-link device may perform transmission using any bandwidth among 20 MHz, 40 MHz, 80 MHz, 160 MHz, and 320 MHz bandwidths.

In an embodiment of FIG. 34, an AP multi-link device includes a first AP (AP 1) and a second AP (AP 2), and a non-AP station multi-link device corresponding to a non-STR multi-link device includes a first station (STA 1) and a second station (STA 2). The first AP (AP 1) and the first station (STA 1) operate in a first link (Link 1). The second AP (AP 2) and the second station (STA 2) operate in a second link (Link 2). The first station (STA 1) participates in UL OFDMA transmission in the first link (Link 1). In this case, when the positions of an RU through which the first station (STA 1) performs UL OFDMA transmission and an RU through which the second station (STA 2) performs transmission satisfy a predetermined condition, the second station (STA 2) performs uplink transmission. In this case, the predetermined condition may be a condition in which an interval between RUs is less than a predetermined interval. In addition, whether transmission in the second link is allowed may be determined according to an expansion direction of a bandwidth in which transmission is performed.

Whether a link pair corresponds to a non-STR link pair or an STR link pair may be determined according to a transmission direction. A description thereof is described through FIG. 35.

FIG. 35 illustrates a case in which whether a link pair corresponds to a non-STR link pair or an STR link pair is determined according to a transmission direction according to an embodiment of disclosure.

A first multi-link device cannot perform transmission in a second link in a case where reception in a first link among a link pair is performed, but may perform transmission in the first link in a case where the first multi-link device performs reception in the second link. For example, transmission power of a station in a 6 GHz band may be restricted to be less than predetermined power. Accordingly, in a case where the first link is positioned in the 6 GHz band, when performing reception in the first link among the link pair, the first multi-link device cannot perform transmission in the second link, but may perform transmission in the first link when the first multi-link device performs reception in the second link.

Accordingly, according to the transmission direction, transmission for which a transmission end time point is not synchronized with a transmission end time point of the first link may be allowed in the second link while transmission is performed in the first link. In this case, the multi-link device may terminate the transmission in the second link earlier than the transmission in the first link. To this end, the multi-link device may perform fragmentation for traffic to be transmitted in the second link.

In an embodiment of FIG. 35, an AP multi-link device includes a first AP (AP 1) and a second AP (AP 2), and a non-AP station multi-link device corresponding to a non-STR multi-link device includes a first station (STA 1) and a second station (STA 2). The first AP (AP 1) and the first station (STA 1) operate in a first link (Link 1). The second AP (AP 2) and the second station (STA 2) operate in a second link (Link 2). In this case, when reception in the first link positioned in a 6 GHz band is performed, the non-AP station cannot perform transmission in the second link, but may perform transmission in the first link (Link 1) when the non-AP station performs reception in the second link (Link 2). The second station (STA 2) starts uplink transmission in the second link (Link 2) while the first station (STA 1) performs uplink transmission in the first link (Link 1). In this case, the second station (STA 1) completes the uplink transmission before the first station (STA 1) completes the uplink transmission. Through such an operation, the uplink transmissions in the first link and the second link are completed, and a BA frame is also successfully transmitted.

While the present invention is described mainly focusing on the embodiments above, but the present invention is not limited thereto, and it will be understood by those skilled in the art to which the present invention belongs that various modifications and applications can be made without departing from the spirit and scope of the present embodiments. For example, each element specifically shown in the embodiments may be modified and implemented. It should be interpreted that differences relating to such modifications and application are included in the scope of the present invention defined in the appended claims.

The invention claimed is:

1. A wireless communication terminal for wirelessly communicating with a base wireless communication terminal, the wireless communication terminal comprising:

a transceiver; and a processor, wherein the processor is configured to:

perform a channel access procedure including obtaining a random integer within a contention window, transmit low latency traffic configured as traffic for low latency transmission or a response to the low latency traffic within a restricted service period, wherein transmission except for transmission of the low latency traffic and transmission of the response to the low latency traffic is restricted within the restricted service period, and perform the channel access procedure again when the channel access procedure is completed before a start of the restricted service period and the wireless communication terminal abandons transmission upon determination that frame exchange fails to be completed before the start of the restricted service period, wherein performing the channel access procedure again includes:

maintaining a size of the contention window used for the completed channel access procedure without change, and obtaining a new random integer within the contention window.

2. The wireless communication terminal of claim 1, wherein the processor is configured to terminate a TXOP before a start of the restricted service period.

3. The wireless communication terminal of claim 1, wherein the processor is configured not to increase a QoS STA retry counter (QSRC) corresponding to the completed channel access procedure without change when the wireless communication terminal performs the channel access again.

4. The wireless communication terminal of claim 1, wherein a quiet interval corresponding to the restricted service period is configured, all transmissions are not allowed in the quiet interval, and the processor is configured to:

transmit the low latency traffic or the response to the low latency traffic within the restricted service period by ignoring the quiet interval corresponding to the restricted service period; and refrain from transmitting a CF-End frame within the restricted service period.

5. The wireless communication terminal of claim 1, wherein a quiet interval corresponding to the restricted service period is configured, all transmissions are not allowed in the quiet interval, and the processor is configured to:

determine whether to ignore the quiet interval based on a start time point of the restricted service period and a start time point of the quiet interval; and when determining to ignore the quiet interval, transmit the low latency traffic or the response to the low latency traffic within the restricted service period by ignoring the quiet interval corresponding to the restricted service period.

6. The wireless communication terminal of claim 5, wherein the processor is configured to:

ignore the quiet interval when a condition determined based on the start time point of the restricted service period and the start time point of the quiet interval is satisfied; and refrain from performing all transmissions when the condition determined based on the start time point of the restricted service period and the start time point of the quiet interval fails to be satisfied.

7. The wireless communication terminal of claim 6, wherein the condition determined based on the start time point of the restricted service period and the start time point of the quiet interval is that the start time point of the quiet interval and the start time point of the restricted service period are within a predetermined time interval.

8. A method of operating a wireless communication terminal for wirelessly communicating with a base wireless communication terminal, the method comprising:

performing a channel access procedure including obtaining a random integer within a contention window;

transmitting low latency traffic configured as traffic for low latency transmission or a response to the low latency traffic within a restricted service period, wherein transmission except for transmission of the low latency traffic and transmission of the response to the low latency traffic is restricted within the restricted service period; and performing the channel access procedure again when the channel access procedure is completed before a start of the restricted service period and the wireless communinication terminal abandons transmission upon determination that a frame exchange fails to be completed before the start of the restricted service period, wherein performing the channel access procedure again includes:

maintaining a size of the contention window used for the completed channel access procedure without change, and obtaining a new random integer within the contention window.

9. The method of claim 8, further comprising terminating a TXOP before a start of the restricted service period.

10. The method of claim 8, wherein the performing the channel access again comprises not increasing a QoS STA retry counter (QSRC) corresponding to the completed channel access procedure without change when the wireless communication terminal performs the channel access again.

11. The method of claim 8, wherein a quiet interval corresponding to the restricted service period is configured, all transmissions are not allowed in the quiet interval, and the transmitting the low latency traffic or the response to the low latency traffic within the restricted service period comprises:

transmitting the low latency traffic or the response to the low latency traffic within the restricted service period by ignoring the quiet interval corresponding to the restricted service period; and refraining from transmitting a CF-End frame within the restricted service period.

12. The method of claim 8, wherein a quiet interval corresponding to the restricted service period is configured, all transmissions are not allowed in the quiet interval, and the transmitting the low latency traffic or the response to the low latency traffic within the restricted service period comprises:

determining whether to ignore the quiet interval based on a start time point of the restricted service period and a start time point of the quiet interval; and when determining to ignore the quiet interval, transmitting the low latency traffic or the response to the low latency traffic within the restricted service period by ignoring the quiet interval corresponding to the restricted service period.

13. The method of claim 12, wherein the determining whether to ignore the quiet interval based on the start time point of the restricted service period and the start time point of the quiet interval comprises:

ignoring the quiet interval when a condition determined based on the start time point of the restricted service period and the start time point of the quiet interval is satisfied; and refraining from performing all transmissions when the condition determined based on the start time point of the restricted service period and the start time point of the quiet interval fails to be satisfied.

14. The method of claim 13, wherein the condition determined based on the start time point of the restricted service period and the start time point of the quiet interval is that the start time point of the quiet interval and a start time point of the restricted service period are within a predetermined time interval.

\* \* \* \* \*